US012789623B2

(12) United States Patent
Wataya

(10) Patent No.: US 12,789,623 B2
(45) Date of Patent: Nov. 10, 2026

(54) OPERATING DEVICE FOR WORKING VEHICLE

(71) Applicant: KUBOTA CORPORATION, Osaka (JP)

(72) Inventor: Ryo Wataya, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 344 days.

(21) Appl. No.: 18/537,192

(22) Filed: Dec. 12, 2023

(65) Prior Publication Data

US 2024/0208327 A1 Jun. 27, 2024

(30) Foreign Application Priority Data

Dec. 27, 2022 (JP) ................................ 2022-210887
Dec. 27, 2022 (JP) ................................ 2022-210888

(51) Int. Cl.
*B60K 26/02* (2006.01)
*A01B 63/12* (2006.01)

(52) U.S. Cl.
CPC .............. *B60K 26/02* (2013.01); *A01B 63/12* (2013.01); *B60K 2026/028* (2013.01); *B60Y 2200/221* (2013.01)

(58) Field of Classification Search
CPC .. B60K 26/02; B60K 2026/028; A01B 63/12; B60Y 2200/221
USPC ........................................................... 701/50
See application file for complete search history.

(56) References Cited

U.S. PATENT DOCUMENTS 9,944,292 B2 * 4/2018 Tsuji ....................... F16H 59/54
2006/0137931 A1 * 6/2006 Berg ........................ B62D 1/22
180/333
2016/0053779 A1 * 2/2016 Komatsu ................ B60K 35/10
60/431
2018/0326845 A1 * 11/2018 Ogura .................... B60K 20/04
2020/0398780 A1 * 12/2020 Kobayashi ........... A01B 69/008
2022/0097494 A1 * 3/2022 Horai ................. B62D 49/0614
(Continued)

FOREIGN PATENT DOCUMENTS

JP S61246819 A 11/1986
JP H1042206 A 2/1998
(Continued)

OTHER PUBLICATIONS

Official Communication issued in corresponding European Patent Application No. 23215980.6, mailed on Jun. 24, 2024, 7 pages.
(Continued)

*Primary Examiner* — Yazan A Soofi
(74) *Attorney, Agent, or Firm* — Keating & Bennett, LLP

(57) ABSTRACT

An operating device for a working vehicle includes an operating lever to cause the working vehicle to perform various functions, and a selector to select an operation mode of the operating lever. The operating lever is configured such that function(s) of the working vehicle to be performed in accordance with an instruction received by the operating lever vary depending on the operation mode selected via the selector. Furthermore, the operating lever is pivotally supported and is configured such that function(s) of the working vehicle to be performed in accordance with an instruction received by the operating lever being pivoted vary depending on the operation mode selected via the selector.

19 Claims, 22 Drawing Sheets

(56) References Cited

U.S. PATENT DOCUMENTS

| | | | | |
|---|---|---|---|---|
| 2023/0091890 | A1* | 3/2023 | Saito | E02F 9/2004 |
| 2023/0192093 | A1* | 6/2023 | Stutzman | B60W 10/18<br>701/50 |
| 2023/0279641 | A1* | 9/2023 | Young | E02F 9/207<br>701/50 |
| 2024/0026642 | A1 | 1/2024 | Yonekura | |

FOREIGN PATENT DOCUMENTS

| | | | |
|---|---|---|---|
| JP | 2008135078 | A | 6/2008 |
| JP | 2012234278 | A | 11/2012 |
| JP | 2016041565 | A | 3/2016 |
| JP | 2017-091061 | A | 5/2017 |
| JP | 2017186875 | A | 10/2017 |
| JP | 2019214377 | A | 12/2019 |
| JP | 2020029193 | A | 2/2020 |
| JP | 2021155957 | A | 10/2021 |
| JP | 2022096946 | A | 6/2022 |

OTHER PUBLICATIONS

Official Communication issued in corresponding Japanese Patent Application No. 2022-210887, mailed on Dec. 2, 2025, 5 pages.
Official Communication issued in corresponding Japanese Patent Application No. 2022-210888, mailed on Dec. 2, 2025, 4 pages.
Official Communication issued in corresponding Japanese Patent Application No. 2022-210888, mailed on Mar. 3, 2026, 5 pages.

* cited by examiner

| Operation | Details | Mode | | | |
|---|---|---|---|---|---|
| | | First mode | Second mode | Third mode | Fourth mode |
| Pivoting operation | Front | Thirty-fifth function | Fourth function | Fourth function | None |
| | Rear | Thirty-sixth function | Fifth function | Fifth function | None |
| | Right | Thirty-seventh function | First function | First function | None |
| | Left | Thirty-eighth function | Fifteenth function/ sixteenth function | Fifteenth function/ sixteenth function | None |
| Operating switch | First operating switch | First function | First function | First function | First function |
| | Second operating switch | Forty-fifth function | Forty-fifth function | Forty-fifth function | Forty-fifth function |
| | Third operating switch | Ninth function | Ninth function | Ninth function | Ninth function |
| | Fourth operating switch | Seventh function | Seventh function | Seventh function | Seventh function |
| | Fifth operating switch | Forty-first function | Second function | Forty-second function (entering action) | Forty-first function |
| | Sixth operating switch | Twenty-fifth function | Twenty-fifth function | Twenty-fifth function | Twenty-fifth function |
| | Seventh operating switch | Twenty-sixth function | Twenty-sixth function | Twenty-sixth function | Twenty-sixth function |
| | Eighth operating switch | Thirty-second function/ thirty-third function (First auxiliary valve) | Thirty-second function/ thirty-third function (First auxiliary valve) | Thirty-second function/ thirty-third function (First auxiliary valve) | Thirty-second function/ thirty-third function (First auxiliary valve) |
| | Ninth operating switch | Thirty-second function/ thirty-third function (Second auxiliary valve) | Thirty-second function/ thirty-third function (Second auxiliary valve) | Thirty-second function/ thirty-third function (Second auxiliary valve) | Thirty-second function/ thirty-third function (Second auxiliary valve) |
| | Tenth operating switch | Fortieth function | Fourteenth function | Forty-third function | Fortieth function |
| | Eleventh operating switch | Fifteenth function | Fifteenth function | Fifteenth function | Fifteenth function |
| | Twelfth operating switch | Sixteenth function | Sixteenth function | Sixteenth function | Sixteenth function |
| | Thirteenth operating switch | Fourth function/fifth function | Fourth function/fifth function | Fourth function/fifth function | Fourth function/fifth function |

Fig.10

| Details | Mode | | | |
|---|---|---|---|---|
| | First mode | Second mode | Third mode | Fourth mode |
| First operating switch | Not allocated | Not allocated | Not allocated | Not allocated |
| Second operating switch | Not allocated | Not allocated | Not allocated | Not allocated |
| Third operating switch | Eleventh function | Eleventh function | Eleventh function | Eleventh function |
| Fourth operating switch | Not allocated | Not allocated | Not allocated | Not allocated |
| Fifth operating switch | Thirty-ninth function | Not allocated | Forty-second function (exiting action) | Thirty-ninth function |
| Sixth operating switch | Not allocated | Not allocated | Not allocated | Not allocated |
| Seventh operating switch | Not allocated | Not allocated | Not allocated | Not allocated |
| Eighth operating switch | Thirty-second function/ thirty-third function (Third auxiliary valve) | Thirty-second function/ thirty-third function (Third auxiliary valve) | Thirty-second function/ thirty-third function (Third auxiliary valve) | Thirty-second function/ thirty-third function (Third auxiliary valve) |
| Ninth operating switch | Thirty-second function/ thirty-third function (Fourth auxiliary valve) | Thirty-second function/ thirty-third function (Fourth auxiliary valve) | Thirty-second function/ thirty-third function (Fourth auxiliary valve) | Thirty-second function/ thirty-third function (Fourth auxiliary valve) |
| Tenth operating switch | Thirty-eighth function | Not allocated | Not allocated | Thirty-eighth function |
| Eleventh operating switch | Not allocated | Not allocated | Not allocated | Not allocated |
| Twelfth operating switch | Not allocated | Not allocated | Not allocated | Not allocated |
| Thirteenth operating switch | Not allocated | Not allocated | Not allocated | Not allocated |

Fig.11

Fig.15

| Operation actuator | Function |
|---|---|
| First operation actuator | Seventeenth function |
| Second operation actuator | Eighteenth function |
| Third operation actuator | Twentieth function |
| Fourth operation actuator | Thirteenth function |
| Fifth operation actuator | Not allocated |
| Sixth operation actuator | Seventh function |
| Seventh operation actuator | Eighth function |
| Eighth operation actuator | Twenty-fourth function |
| Ninth operation actuator | Nineteenth function |
| Tenth operation actuator | Not allocated |

OPERATING DEVICE FOR WORKING VEHICLE

CROSS REFERENCE TO RELATED APPLICATIONS

This application claims the benefit of priority to Japanese Patent Application No. 2022-210887 filed on Dec. 27, 2022 and to Japanese Patent Application No. 2022-210888 filed on Dec. 27, 2022. The entire contents of these applications are hereby incorporated herein by reference.

BACKGROUND OF THE INVENTION

1. Field of the Invention

The present disclosure relates to an operating device for a working vehicle.

2. Description of the Related Art

A working vehicle disclosed in Japanese Unexamined Patent Application Publication No. 2017-091061 is configured to transmit power from an engine mounted on a traveling machine body to a traveling unit and a working unit after speed stages are changed by a transmission, and includes a working unit operating lever for operating the working unit (loader) and a lever (sub-shift lever) for operating the transmission, and the working unit operating lever is provided with a valve operating switch and a mode switching switch.

SUMMARY OF THE INVENTION

However, if switches corresponding to functions of the working vehicle are provided on the working unit operating lever and the sub-shift lever to improve operability of the working vehicle, a large number of switches needs to be provided on the levers. This may undesirably deteriorate operability and increase sizes of the levers. Furthermore, to operate each of the working unit and the traveling unit by a lever as in the invention of Japanese Unexamined Patent Application Publication No. 2017-091061, a lever needs to be provided individually for each of the units. This undesirably requires a space where the levers are mounted, and may undesirably deteriorate operability since a lever held in hand needs to be switched from one lever to the other.

Example embodiments of the present invention provide operating devices for working vehicles each of which can improve operability of a function of the working vehicle.

An operating device for a working vehicle according to an aspect of an example embodiment of the present invention includes an operating lever to cause the working vehicle to perform various functions, and a selector to select an operation mode of the operating lever, wherein the operating lever is configured such that one or more functions of the working vehicle to be performed in accordance with an instruction received by the operating lever vary depending on the operation mode selected via the selector.

The operating lever may be pivotally supported and be configured such that one or more functions of the working vehicle to be performed in accordance with an instruction received by the operating lever being pivoted vary depending on the operation mode selected via the selector.

A plurality of the operation modes may include a first mode in which at least one or more work functions relating to work among the functions of the working vehicle are performed and a second mode in which at least one or more traveling functions relating to travel among the functions of the working vehicle are performed. The operating lever may be operable to, in the first mode, receive an instruction to perform the one or more work functions by being pivoted. The operating lever may be operable to, in the second mode, receive an instruction to perform the one or more traveling functions by being pivoted.

The operating lever may include at least one operating switch and be configured such that a function of the working vehicle to be performed in accordance with an instruction received by the operating lever by an operation of the at least one operating switch varies depending on the operation mode selected via the selector.

The plurality of operation modes may include a third mode in which the one or more traveling functions and the one or more work functions are performed. The operating lever may be operable to, in the third mode, receive an instruction to perform the one or more traveling functions by being pivoted. A function of the working vehicle to be performed in accordance with an instruction received by the operation of the at least one operating switch in the third mode may be different from a function of the working vehicle to be performed in accordance with an instruction received by the operation of the at least one operating switch in the second mode.

The plurality of operation modes may include a fourth mode. The operating lever may be operable to, in the fourth mode, not receive an instruction to perform a function of the working vehicle even when pivoted, and receive an instruction to perform a function of the working vehicle when the at least one operating switch is operated.

The operating device may further include an indicator to provide an indication differently based on the operation mode selected via the selector.

The indicator may be provided on the operating lever.

The indicator may include a lamp to change a color thereof according to the operation mode selected via the selector.

The selector may include a physical switch.

The selector may include a display image displayed on a display screen to receive an operation.

An operating device for a working vehicle includes an operating lever to cause the working vehicle to perform various functions, and an operable changeover switch, wherein the operating lever includes at least one operating switch, and is operable to receive an instruction to perform a predetermined standard function among the functions when the at least one operating switch is operated, and is operable to, when the changeover switch is operated, receive an instruction to perform an expanded function of the working vehicle that is different from the standard function instead of the standard function when the at least one operating switch is operated.

The operating lever may be operable to receive an instruction to perform the standard function when the at least one operating switch is operated during a period when the changeover switch is not operated, and receive an instruction to perform the expanded function when the at least one operating switch is operated during a period when the changeover switch is operated.

The at least one operating switch may include a light on an operation surface. The light may be operable to change a manner in which the light provides an indication depending on whether the changeover switch is operated or not.

The light may include a first light provided on one of opposite portions of the operation surface to indicate the standard function, and a second light provided on the other of opposite portions of the operation surface to indicate the expanded function. The first light may be operatable to turn on and the second light may be operable to turn off in a case that the changeover switch is not operated. The first light may be operable to turn off and the second light may be operable to turn on in a case that the changeover switch is operated.

The first light and the second light may extend along an inner periphery of the operation surface and define a portion or an entirety of a contour of the inner periphery of the operation surface.

The operating device may further include an indicator to, when the changeover switch is operated, that the changeover switch is operated.

The indicator may include a lamp to blink to indicate that the changeover switch is operated.

The operating lever may include a base portion that is pivotally supported in a vicinity of an operator's seat of the working vehicle, and a grip provided at a distal portion of the base portion. A plurality of the operating switches may be provided on a surface of the grip that faces the operator's seat. The changeover switch may be provided on another surface of the grip that is different from the surface on which the plurality of operating switches are provided.

The changeover switch may be provided on an upper surface located higher than the surface on which the plurality of operating switches are provided or on an opposite surface opposite the surface on which the plurality of operating switches are provided.

A working vehicle includes a vehicle body, an operator's seat on the vehicle body, and an operating device provided in a vicinity of the operator's seat.

The working vehicle may further include a display to, when the changeover switch is operated, display a relationship between an operation of each of the at least one operating switch and content of a corresponding expanded function to be performed in accordance with an instruction received by the operation of the each of the at least one operating switch.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 10 illustrates an example of a standard table.

FIG. 11 illustrates an example of an expansion table.

FIG. 15 illustrates an example of an operation table.

DETAILED DESCRIPTION OF THE EXAMPLE EMBODIMENTS

Figure 1:
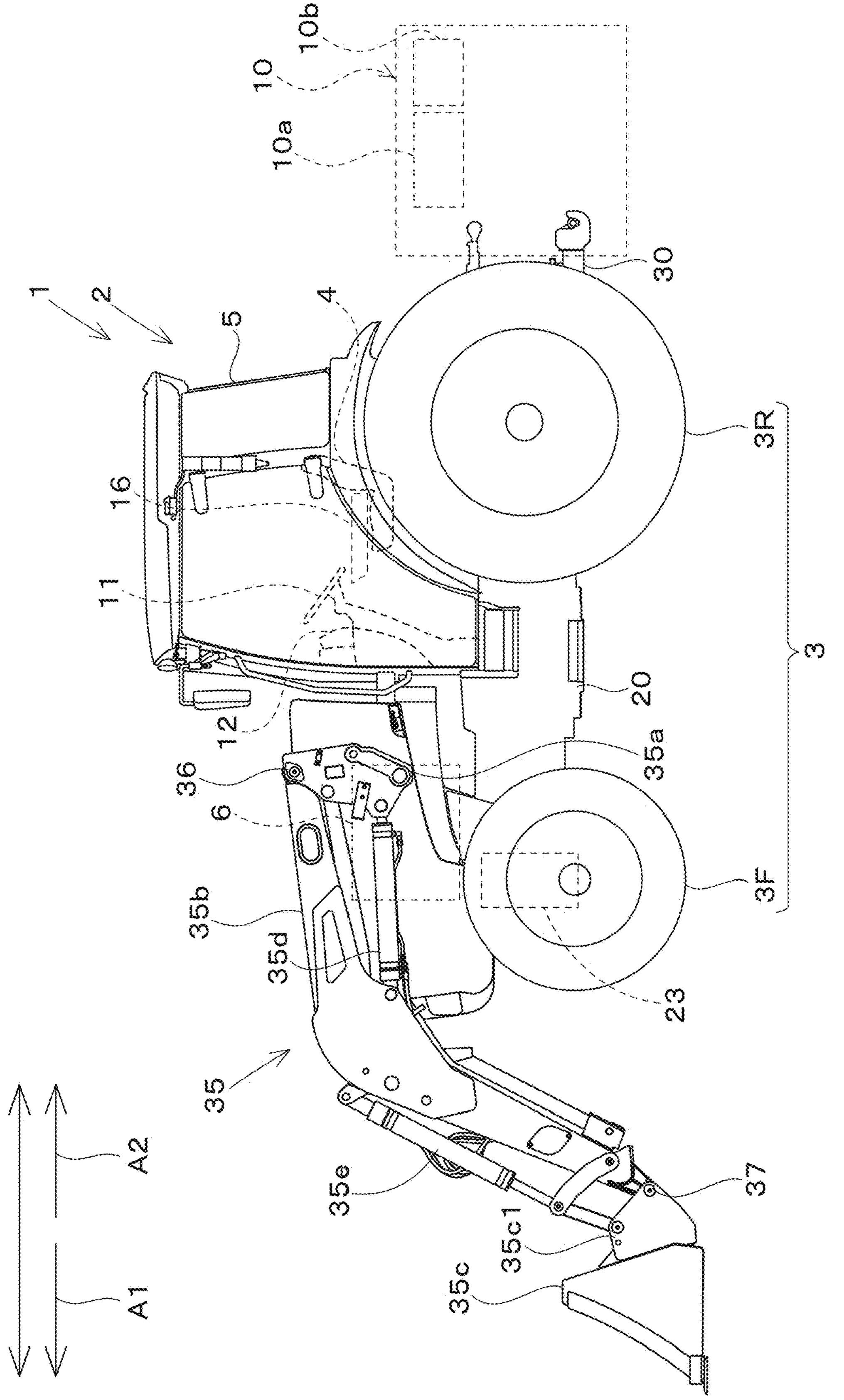
FIG. 1 is a side view of a working vehicle with a front loader attached thereto.

The example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the present invention are described below with reference to the drawings.

FIG. 1 is a side view of a working vehicle 1. The working vehicle 1 is a vehicle for agricultural work, and is a tractor in the present example embodiment. In the following description, it is assumed that the working vehicle 1 is a tractor. However, the working vehicle 1 is not limited to a tractor, and may be an agricultural machine (agricultural vehicle) such as a combine or a transplanter, a construction machine (construction vehicle) such as a loader working machine, or the like.

In the following description, a direction (a direction indicated by arrow A1 in FIGS. 1 and 3 and other drawings) which an operator sitting on an operator's seat 4 of the working vehicle 1 faces is referred to as a forward direction, and an opposite direction (a direction indicated by arrow A2 in FIGS. 1 and 3 and other drawings) is referred to as a rearward direction. Furthermore, a left side for the operator (a near side in FIG. 1, a direction indicated by arrow B1 in FIG. 3 and other drawings) is referred to as a leftward direction, and a right side for the operator (a far side in FIG. 1, a direction indicated by arrow B2 in FIG. 3 and other drawings) is referred to as a rightward direction. Furthermore, a horizontal direction perpendicular or substantially perpendicular to a front-rear direction is referred to as a vehicle body width direction (see FIGS. 3 and 4 and other drawings).

As illustrated in FIG. 1, the working vehicle 1 includes a vehicle body 2, a transmission 20, and a coupler 30.

The vehicle body 2 includes a traveling device 3 and can travel. Furthermore, the operator's seat 4 and a cabin 5 that surrounds the operator's seat 4 are mounted on the vehicle body 2. The traveling device 3 includes a front wheel 3F and a rear wheel 3R. The front wheel 3F may be a tire-type wheel or may be a crawler-type wheel. The rear wheel 3R may also be a tire-type wheel or may be a crawler-type wheel.

The vehicle body 2 is provided with a prime mover 6. The prime mover 6 is a diesel engine, an electric motor, or the like. In the present example embodiment, the prime mover 6 is a diesel engine, for example.

Figure 2:
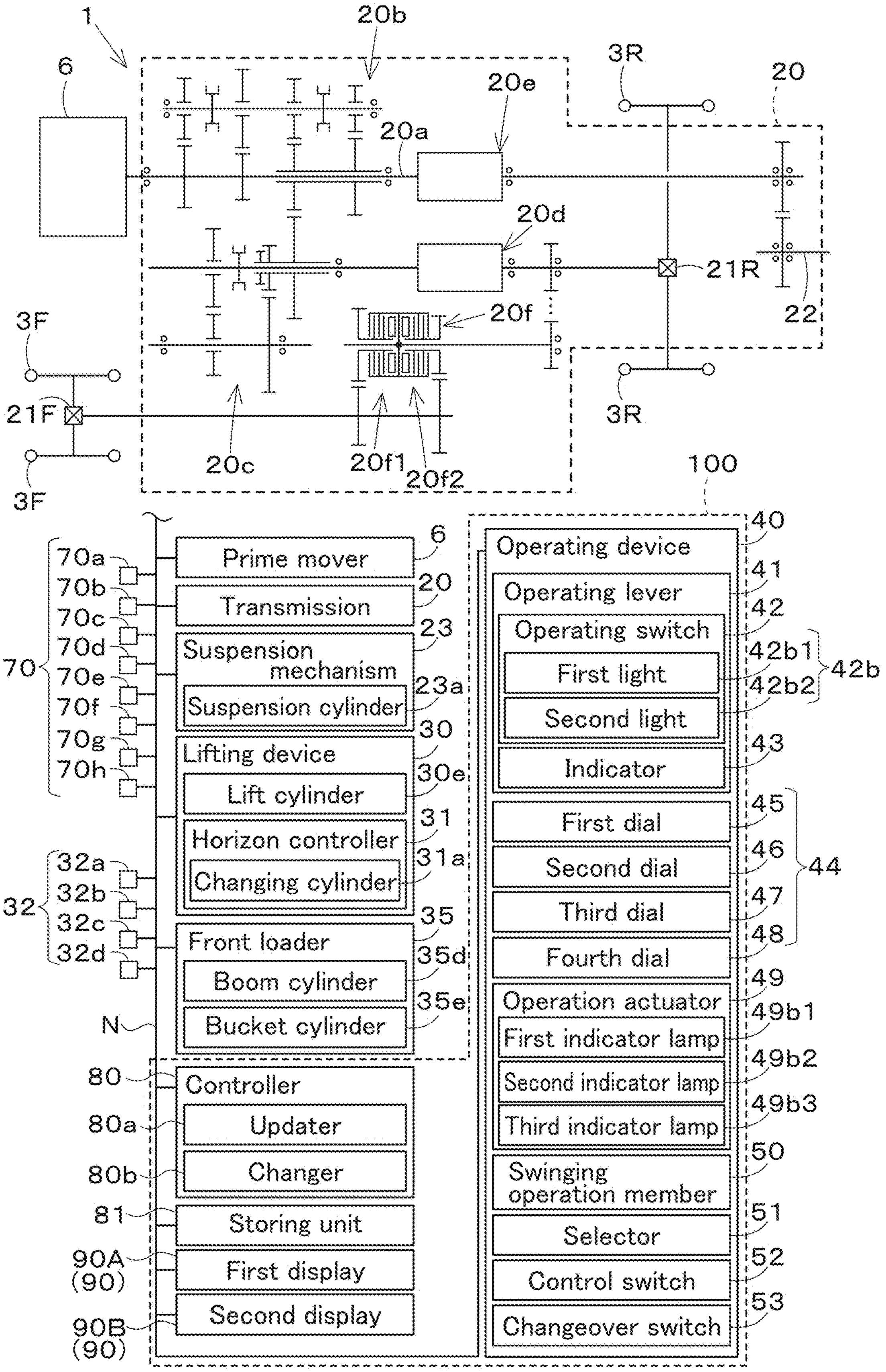
FIG. 2 illustrates a system of the working vehicle.

The transmission 20 can switch propelling force of the traveling device 3 by changing speed stages and can switch between forward traveling and rearward traveling of the traveling device 3. FIG. 2 illustrates a system of the working vehicle 1. As illustrated in FIG. 2, the transmission 20 includes a main shaft (propeller shaft) 20*a*, a main transmission unit 20*b*, an auxiliary transmission unit 20*c*, a shuttle 20*d*, a PTO power transmission unit 20*e*, and a front transmission unit 20*f*. To the propeller shaft 20*a*, power from a crankshaft of the prime mover 6 is transmitted. The main transmission unit 20*b* includes a plurality of gears and a shifter that changes connection of the gears, and changes rotation input from the propeller shaft 20*a* and outputs the changed rotation (change speed stages).

Similarly, the auxiliary transmission unit 20*c* includes a plurality of gears and a shifter that changes connection of the gears, and changes rotation input from the main transmission unit 20*b* and outputs the changed rotation (change speed stages).

The shuttle 20*d* can switch a rotation direction of power output from the auxiliary transmission unit 20*c*, that is, switch between forward traveling and rearward traveling of the traveling device 3 by switching transmission of the power by a hydraulic clutch. The shuttle 20*d* is connected to a rear wheel differential 21R that rotatably supports the rear wheel 3R. Note that the hydraulic clutch of the shuttle 20*d* can cut off transmission of power by being switched to a neutral position.

The PTO power transmission unit 20*e* switches between a state where power of the propeller shaft 20*a* is transmitted to a PTO shaft 22 and a state where power of the propeller shaft 20*a* is not transmitted to the PTO shaft 22 by switching a hydraulic clutch on and off.

The front transmission unit 20*f* includes a first clutch 20*f*1 and a second clutch 20*f*2, which are hydraulic clutches. To the front transmission unit 20*f*, power from the propeller shaft 20*a* can be transmitted, for example, power of the shuttle 20*d* is transmitted via a gear and a transmission shaft. Power from the first clutch 20*f*1 and the second clutch 20*f*2 is transmitted to a front wheel differential 21F that rotatably supports the front wheel 3F.

In a case where the first clutch 20*f*1 is in a disengaged state and the second clutch 20*f*2 is in an engaged state, power of the shuttle 20*d* is transmitted to the front wheel 3F via the second clutch 20*f*2. This creates a state (4WD equal speed state) in which the front wheel 3F and the rear wheel 3R are driven by power (four-wheel drive (4WD) and a rotational speed of the front wheel 3F and a rotational speed of the rear wheel 3R are substantially identical. On the other hand, in a case where the first clutch 20*f*1 is in an engaged state and the second clutch 20*f*2 is in a disengaged state, power of the shuttle 20*d* is transmitted to the front wheel 3F via the first clutch 20*f*1. This creates a state (4WD increased-speed state) in which four-wheel drive is performed the rotational speed of the front wheel 3F is higher than the rotational speed of the rear wheel 3R.

In a case where the first clutch 20*f*1 and the second clutch 20*f*2 are in a disengaged state, power of the shuttle 20*d* is not transmitted to the front wheel 3F. This creates a two-wheel-drive (2WD) state in which the rear wheel 3R is driven by power.

Note that a fluid passage is connected to each hydraulic clutch of the transmission 20, and the fluid passage is connected to a control valve (not illustrated) to which a hydraulic fluid delivered from a hydraulic pump (not illustrated) is supplied. The hydraulic pump delivers the hydraulic fluid by driving force generated by the prime mover 6. The control valve is, for example, a two-position switching valve including a solenoid valve and is switched to an engaged state or a disengaged state by energizing or deenergizing a solenoid of the solenoid valve based on a control signal output from a controller 80, which will be described later.

Note that although the transmission 20 uses a gear system of changing speed stages by changing connection between a plurality of gears, the transmission 20 may use a belt-type Continuously Variable Transmission (CVT) or the like, and the configuration thereof is not limited to the gear system.

Furthermore, a suspension mechanism 23 that mitigates shock, vibration, or the like from an agricultural field, a road surface, or the like and performs height adjustment, swinging, or the like of a front portion of the working vehicle 1 is provided in a front portion of the vehicle body 2. The suspension mechanism 23 defines a suspension device together with a front axle case (not illustrated) in which the front wheel differential 21F is contained and the vehicle body 2. The suspension mechanism 23 includes a pair of suspension cylinders 23*a* that are provided in the vehicle body width direction.

The pair of suspension cylinders 23*a* can be extended and retracted by supply of a hydraulic fluid. More specifically, by concurrently extending the pair of suspension cylinders 23*a*, the front axle case can be moved downward, and thus the front portion of the vehicle body 2 can be relatively raised. On the other hand, by concurrently retracting the pair of suspension cylinders 23*a*, the front axle case can be moved upward, and thus the front portion of the vehicle body 2 can be relatively lowered.

The suspension cylinders 23*a* are connected to a hydraulic pump via a control valve (not illustrated). The control valve is, for example, a two-position switching valve including a solenoid valve and extends or retracts the suspension cylinders 23*a* by energizing or deenergizing a solenoid of the solenoid valve based on a control signal output from the controller 80, which will be described later.

The coupler 30 is provided in a rear portion of the vehicle body 2. The coupler 30 is structured to couple a working device (ground working machine) 10 to perform work on an agricultural field or the like to the rear portion of the working vehicle 1. The working device 10 is, for example, driven by driving force transmitted from the PTO shaft 22. Furthermore, the working device 10 may include a hydraulic attachment 10*a*, and the hydraulic attachment 10*a* may be driven by a hydraulic fluid. Specifically, the working device 10 is a cultivator, a spreader, a seeding machine, or the like but is not limited to this.

Figure 3:
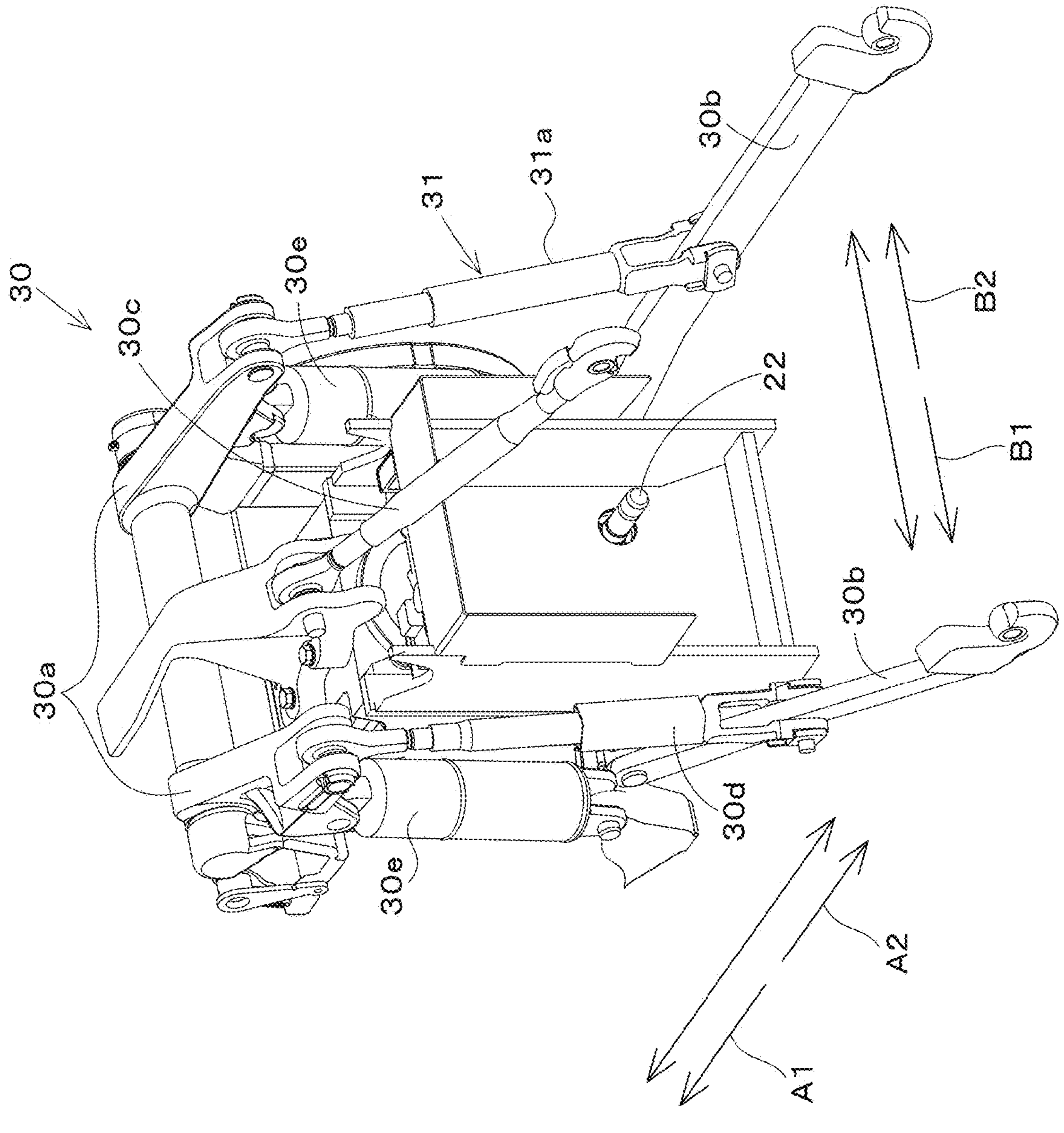
FIG. 3 is a perspective view of a coupler.

FIG. 3 is a perspective view of the coupler 30. The coupler 30 is a lifting device 30 (which hereinafter may be referred to as a "lifting device 30") that raises or lowers the working device 10 by being driven by an actuator such as a hydraulic cylinder. In the present example embodiment, the lifting device 30 includes a three-point linkage.

As illustrated in FIG. 3, the lifting device 30 includes a lift arm 30*a*, a lower link 30*b*, a top link 30*c*, a lift rod 30*d*, and a lift cylinder 30*e*. A front end portion of the lift arm 30*a* is supported by a rear upper portion of the transmission 20 so as to be swingable up or down. The lift arm 30*a* is swung (raised or lowered) by driving of the lift cylinder 30*e*. The lift cylinder 30*e* is a hydraulic cylinder. The lift cylinder 30*e* is connected to a hydraulic pump via a control valve (not illustrated). The control valve is, for example, a two-position switching valve including a solenoid valve and extends or retracts the lift cylinder 30*e* by energizing or deenergizing a solenoid of the solenoid valve based on a control signal output from the controller 80, which will be described later.

A front end portion of the lower link 30*b* is supported by a rear lower portion of the transmission 20 so as to be swingable up or down. A front end portion of the top link 30*c* is supported by a rear portion of the transmission 20 above the lower link 30*b* so as to be swingable up or down. The lift rod 30*d* couples the lift arm 30*a* and the lower link 30*b*. The working device 10 is coupled to a rear portion of the lower link 30*b* and a rear portion of the top link 30*c*.

When the lift cylinder 30*e* is driven (extends or retracts), the lift arm 30*a* is raised or lowered, and the lower link 30*b* coupled to the lift arm 30*a* by the lift rod 30*d* is raised or lowered. As a result, the working device 10 swings up or down (is lowered or raised) while being supported by a front portion of the lower link 30*b* as a fulcrum point.

Note that a horizon controller 31 for keeping the working device 10 horizontal may be provided in a rear portion of the vehicle body 2. The horizon controller 31 is operable to change a posture of the working device 10 attached to the vehicle body 2. The horizon controller 31 includes a changing cylinder 31*a*, and the changing cylinder 31*a* couples the lift arm 30*a* and the lower link 30*b* instead of one of the pair of lift rods 30*d*. The changing cylinder 31*a* may be a hydraulic cylinder, for example. The changing cylinder 31*a* is connected to a hydraulic pump via a control valve (not illustrated). The control valve is a solenoid valve or the like and extends or retracts the changing cylinder 31*a*. The changing cylinder 31*a* is connected to a hydraulic pump via a control valve. The control valve is, for example, a two-position switching valve including a solenoid valve and extends or retracts the lift cylinder 30*e* by energizing or deenergizing a solenoid of the solenoid valve based on a control signal output from the controller 80, which will be described later.

As illustrated in FIG. 2, the working vehicle 1 includes a plurality of auxiliary valves 32. Each of the plurality of auxiliary valves 32 is a two-position switching valve including a solenoid valve connected to a hydraulic pump. Each of the plurality of auxiliary valves 32 includes an output port, and a hydraulic hose or the like, which is connectable to any output port. The hydraulic hose connected to any output port of the auxiliary valve 32 is connected to the hydraulic attachment 10*a* of the working device 10, and the auxiliary valve 32 causes various hydraulic attachments 10*a* attached to the working device 10 to work by energizing or deenergizing a solenoid of the solenoid valve based on a control signal output from the controller 80, which will be described later.

Note that in the present example embodiment, the plurality of auxiliary valves 32 are located above the lifting device 30 in the vehicle body 2. In the present example embodiment, the number of auxiliary valves 32 is four, for example. Hereinafter, the plurality of auxiliary valves 32 of the working vehicle 1 are sometimes referred to as a first auxiliary valve 32*a*, a second auxiliary valve 32*b*, a third auxiliary valve 32*c*, and a fourth auxiliary valve 32*d*.

As illustrated in FIG. 1, a front loader 35 is attached to a front portion of the vehicle body 2. The front loader 35 includes an attachment frame 35*a*, a boom 35*b*, a working tool (bucket) 35*c*, a boom cylinder 35*d*, and a bucket cylinder 35*e*. Note that the front loader 35 is not limited to the present example embodiment as long as the front loader 35 includes the boom 35*b* and the working tool 35*c*. Furthermore, the working tool 35*c* is not limited to a bucket and may be a working tool of other kinds such as a pallet fork, a sweeper, a mower, or a snow blower.

As illustrated in FIG. 1, the attachment frame 35*a* is detachably attached to a left side and a right side of the vehicle body 2. The front loader 35 is attached to the vehicle body 2 with the attachment frame 35*a* interposed therebetween.

The boom 35*b* is provided on the vehicle body 2 so as to be swingable up or down. The boom 35*b* is coupled and supported so as to be swingable about a pivot shaft 36 provided in the attachment frame 35*a*.

The bucket 35*c* is attached to a front portion of the boom 35*b*. The bucket 35*c* is mainly used to scoop or push forward dirt or the like in a workplace in front of the vehicle body 2, and is coupled and supported so as to be swingable about a pivot shaft 37 provided in a front end portion of the boom 35*b* by a coupling bracket 35*cl* provided in a rear portion of the bucket 35*c*.

The boom cylinder 35*d* and the bucket cylinder 35*e* are each connected to a hydraulic pump via a control valve (not illustrated). The control valve is, for example, a two-position switching valve including a solenoid valve and extends or retracts the boom cylinder 35*d* and the bucket cylinder 35*e* by energizing or deenergizing a solenoid of the solenoid valve based on a control signal output from the controller 80, which will be described later.

The boom cylinder 35*d* is provided below the boom 35*b* and couples the attachment frame 35*a* and the boom 35*b*. One end portion of the boom cylinder 35*d* is pivotally supported rotatably by the attachment frame 35*a*. The other end portion of the boom cylinder 35*d* is pivotally supported rotatably by an intermediate portion of the boom 35*b* in the front-rear direction.

The boom cylinder 35*d* is a hydraulic cylinder. When the boom cylinder 35*d* extends, the boom 35*b* swings upward about the pivot shaft 36, and when the boom cylinder 35*d* retracts, the boom 35*b* swings downward about the pivot shaft 36.

The bucket cylinder 35*e* is provided above the boom 35*b* and couples the bucket 35*c* and the boom 35*b*. One end portion of the bucket cylinder 35*e* is pivotally supported rotatably by the coupling bracket 35*cl* in the rear portion of the bucket 35*c*. The other end portion of the bucket cylinder 35*e* is pivotally supported rotatably by an intermediate portion of the boom 35*b* in the front-rear direction.

The bucket cylinder 35*e* is a hydraulic cylinder. When the bucket cylinder 35*e* extends, the bucket 35*c* swings downward (dumping) about the pivot shaft 37, and when the bucket cylinder 35*e* retracts, the bucket 35*c* swings upward (shoveling) about the pivot shaft 37.

Note that although a state in which the front loader 35 is attached to the front portion of the vehicle body 2 is illustrated in FIG. 1, the front loader 35 need not necessarily be attached to the working vehicle 1 depending on a function of the working vehicle 1.

As illustrated in FIG. 1, a steering wheel 11 is provided in front of the operator's seat 4. The steering wheel 11 is rotatably supported by a steering shaft. The steering wheel 11 is provided on an upper portion of a manipulator base 12 located in the cabin 5.

As illustrated in FIG. 2, the working vehicle 1 includes an operating device 40, a detector 70, the controller 80, and a display 90. Note that in the following description, a configuration including the operating device 40, the controller 80, and the display 90 (a configuration including a storing unit (storage and/or memory) 81, which will be described later, in the present example embodiment) is sometimes referred to as an assistance apparatus 100 of the working vehicle 1. In the working vehicle 1, an on-board network N such as CAN, LIN, or FlexRay is constructed. Devices mounted on the working vehicle 1 including the operating device 40, the detector 70, the controller 80, and the display 90 are electrically connected over the on-board network N.

The operating device 40 is provided in a vicinity of the operator's seat 4 and is operable to cause the working vehicle to perform various functions. The operating device 40 is, for example, operated to cause the working vehicle 1 to perform traveling function(s) relating to travel and/or working function(s) relating to work among the functions of the working vehicle 1. The operating device 40 receives an instruction for operation by being operated and outputs an operation signal based on the operation.

The detector 70 is operable to detect a state of the working vehicle 1 and output the detected state as a detection signal. The detector 70 includes, for example, a prime mover rotation sensor (rotation sensor) 70*a*, an accelerator pedal sensor 70*b*, a brake pedal sensor 70*c*, a steering angle sensor 70*d*, a first angle sensor 70*e*, a second angle sensor 70*f*, a third angle sensor 70*g*, and a vehicle speed sensor 70*h*.

The prime mover rotation sensor 70*a* detects a rotational speed of the prime mover 6, and the accelerator pedal sensor 70*b* detects an amount of operation of an accelerator pedal. The brake pedal sensor 70*c* detects an operation of the brake pedal, and the steering angle sensor 70*d* detects a steering angle of the steering wheel 11. The first angle sensor 70*e* detects an angle of the lift arm 30*a*, and the second angle sensor 70*f* detects an angle of the boom 35*b*. The third angle sensor 70*g* detects an angle of the bucket 35*c*, and the vehicle speed sensor 70*h* detects a vehicle speed.

Note that the detector 70 is an example and is not limited to the above sensors only, and addition, deletion, or change may be made as appropriate depending on a function of the working vehicle 1.

The controller 80 may include an electric/electronic circuit, a CPU, and a program stored in a memory or the like, and be configured or programmed to control various devices connected to the on-board network N of the working vehicle 1. Furthermore, the controller 80 is connected to the storing unit 81 such as a solid state drive (SSD) or a hard disk drive (HDD), and the controller 80 is configured or programmed to perform predetermined control based on a program stored in the storing unit 81.

More specifically, the controller 80 is configured or programmed to control functions such as a traveling function and a work function of the working vehicle 1 based on an operation signal output from the operating device 40, a detection signal of the detector 70, and the like. For example, the controller 80 is configured or programmed to perform control such as control concerning change of speed stages (speed increase or speed-stage change) of the transmission 20 based on an operation signal output from the operating device 40, control concerning raising or lowering of the lifting device 30 based on an operation signal output from the operating device 40, control concerning action of the front loader 35, and control of the rotational speed of the prime mover 6 based on a detection signal from the accelerator pedal sensor 70*b*.

Figure 4:
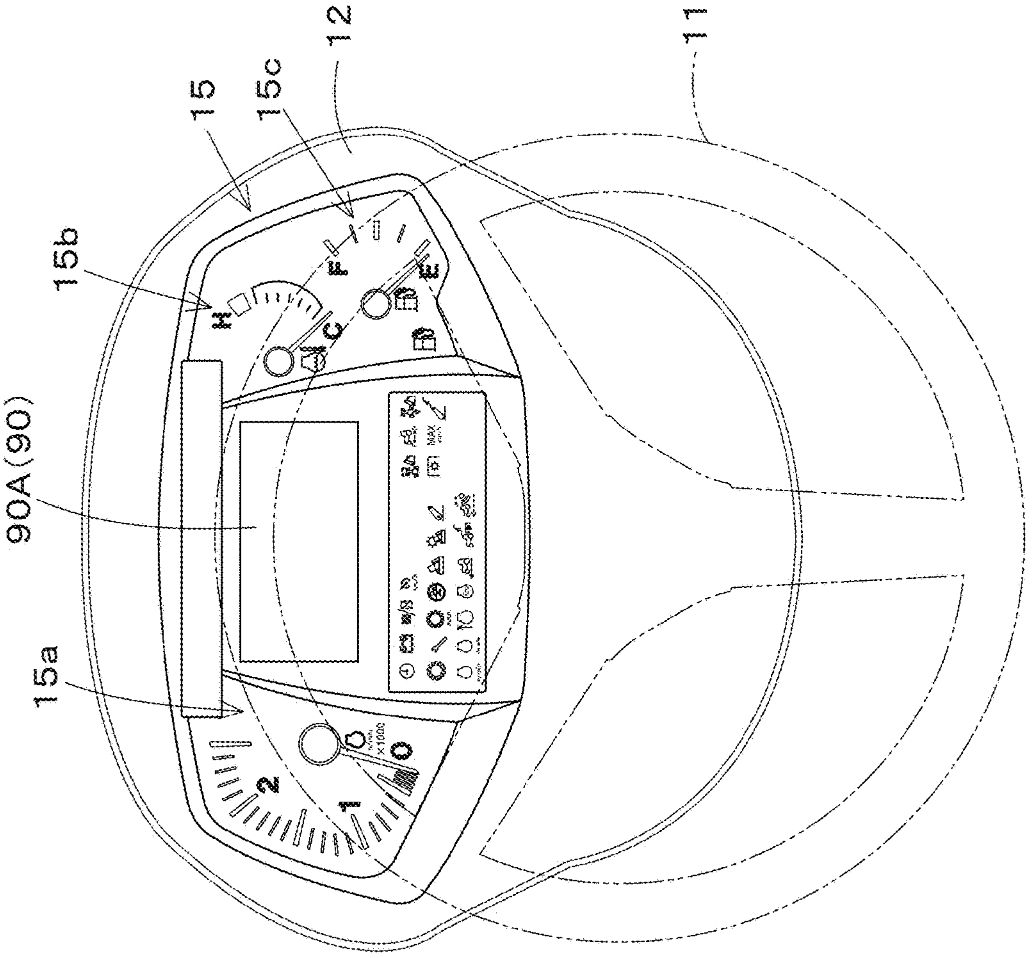
FIG. 4 illustrates a display provided within a meter panel.

The display 90 can display various kinds of information. The display 90 includes any of a liquid crystal panel, a touch panel, and other kinds of panels. For example, the display 90 is a first display (monitor) 90A provided within a meter panel 15 provided in front of the operator's seat 4. FIG. 4 illustrates the first display 90A provided within the meter panel 15. The meter panel 15 is located on an upper portion of a column cover of the manipulator base 12 in front of the steering wheel 11. In the meter panel 15, a rev counter 15*a* that displays the rotational speed of the prime mover 6, a water temperature meter 15*b*, a fuel level meter 15*c*, and the first display 90A are provided. In the example illustrated in FIG. 4, the rev counter 15*a* is located on the left of the first display 90A, and the water temperature meter 15*b* and the fuel level meter 15*c* are located on the right of the first display 90A, but the layout may be changed. The first display 90A is connected to the controller 80 and others over the on-board network N. The first display 90A can acquire various kinds of information from devices such as the controller 80 and the detector 70 connected to the on-board network N and display the information.

Note that the display 90 can be any display that can display information and is not limited to the first display 90A provided within the meter panel 15 as described above. That is, the display 90 may be a second display (terminal display) 90B provided around an operator in the working vehicle 1 or may be a mobile terminal possessed by an operator who operates the working vehicle 1 in the working vehicle 1. The mobile terminal is, for example, a PC or a smartphone (multifunctional mobile phone) having relatively high computing power. In such a case, the mobile terminal includes a device that performs either direct communication or indirect communication with the on-board network N, and can acquire various kinds of information from devices connected to the on-board network N via the device and display the information.

The controller 80 can control (perform) a plurality of functions relating to the working vehicle 1. The controller 80 controls device(s) included in the working vehicle 1 to perform various kinds of functions based on an operation signal output from the operating device 40 and/or a detection signal output from the detector 70. The plurality of functions concerning the working vehicle 1 can be classified into relevant categories under predetermined condition(s). In the present example embodiment, the plurality of functions can be classified into first to ninth categories. Note that control program(s), control parameter(s), and/or the like for use in performing the plurality of functions are stored in the storing unit 81.

The first category is a category related to changing speed stages of the transmission 20. Function(s) to control the transmission 20 is/are classified into the first category. As functions classified into the first category, the controller 80 can control first to eighth functions, which are traveling functions. The first function changes speed stages of the transmission 20 by controlling a shifter of the main transmission unit 20*b* and/or a shifter of the auxiliary transmission unit 20*c* based on the vehicle speed detected by the vehicle speed sensor 70*h* and a control map defined in advance.

The second function is a function to change object(s) to be controlled by the first function (the shifter of the main transmission unit 20*b* and/or the shifter of the auxiliary transmission unit 20*c*) and/or the control map to be referred to in the first function. As the second function, the controller 80, for example, changes object(s) to be controlled by the first function and thus switches between a mode in which the controller 80 controls the shifter of the main transmission unit 20*b* and the shifter of the auxiliary transmission unit 20*c* in the first function and another mode in which the controller 80 controls the shifter of the main transmission unit 20*b* in the first function. The storing unit 81 stores therein a plurality of control maps, and as the second function, the controller 80 selects a control map to be referred to in the first function as appropriate.

The third function is a function to change the control map of the first function based on an operator's operation. As the third function, the controller 80 changes the control map of the first function based on an operation signal output from the operating device 40 and thus changes a vehicle speed condition under which the speed stages of the transmission 20 are changed.

The fourth function is a function to increase the speed stage of the transmission 20 by controlling the shifter of the main transmission unit 20*b* and/or the shifter of the auxiliary transmission unit 20*c* based on an operator's operation. As the fourth function, the controller 80 increases the speed stage by controlling the shifter of the main transmission unit 20*b* and/or the shifter of the auxiliary transmission unit 20*c* based on an operation signal output from the operating device 40.

The fifth function is a function to lower the speed stage of the transmission 20 by controlling the shifter of the main transmission unit 20*b* and/or the shifter of the auxiliary transmission unit 20*c* based on an operator's operation. As the fifth function, the controller 80 lowers the speed stage by controlling the shifter of the main transmission unit 20*b* and/or the shifter of the auxiliary transmission unit 20*c* based on an operation signal output from the operating device 40.

The sixth function is a function to change the speed of switching of the rotation direction of power output from the auxiliary transmission unit 20*c* based on an operator's operation. As the sixth function, the controller 80 changes the speed of switching of the hydraulic clutch of the shuttle 20*d*, in other words, sensitivity of switching between forward traveling and rearward traveling of the traveling device 3 based on an operation signal output from the operating device 40.

The seventh function is a function to cut off transmission of power to the traveling device 3 by switching the hydraulic clutch of the shuttle 20*d* to a neutral position in a case where the vehicle speed becomes less than a predetermined value as a result of an operation of the brake pedal. The controller 80 determines whether or not the vehicle speed has become less than the predetermined value as a result of an operation of the brake pedal based on the operation of the brake pedal detected by the brake pedal sensor 70*c* and the vehicle speed detected by the vehicle speed sensor 70*h*, and thus controls the seventh function.

The eighth function is a function to change control of the transmission 20 based on a load of the prime mover 6. As the eighth function, the controller 80 detects, for example, a load of the prime mover 6 based on the rotational speed of the prime mover 6 detected by the prime mover rotation sensor 70*a*, and in a case where the load is high, makes the speed of switching of the hydraulic clutch of the shuttle 20*d* higher than in a case where the load is low.

Although the functions related to the transmission 20 have been described as the functions classified into the first category, addition, deletion, or change of function(s) used in the working vehicle 1 may be made depending on the type of transmission 20 or the like. For example, in a case where the transmission 20 is a continuously variable transmission, functions such as a function to control the vehicle speed to a constant vehicle speed by the controller 80 (cruise control), a function to change the vehicle speed of the cruise control, and a function to switch to a mode in which the vehicle speed is restricted (traveling mode) may be used as the functions classified into the first category. In such a case, a function to change the vehicle speed in the cruise control function may be used.

The second category relates to power transmitted to the main transmission unit 20*b* of the transmission 20. Function(s) to control the prime mover 6 and/or the shuttle 20*d* is/are classified into the second category. As functions classified into the second category, the controller 80 can control ninth to sixteenth functions, which are traveling functions. The ninth function is a function to control the rotational speed of the prime mover 6 to a first prime mover rotational speed defined in advance irrespective of the operation of the accelerator pedal. The value of the first prime mover rotational speed is stored in advance in the storing unit 81. The tenth function is a function to change the first prime mover rotational speed based on an operator's operation. As the tenth function, the controller 80 changes the value of the first prime mover rotational speed stored in the storing unit 81 based on an operation signal output from the operating device 40.

The eleventh function is a function to control the rotational speed of the prime mover 6 to a second prime mover rotational speed defined in advance irrespective of an operation of the accelerator pedal. The value of the second prime mover rotational speed is different from the first prime mover rotational speed and is stored in advance in the storing unit 81.

The twelfth function is a function to change the second prime mover rotational speed based on an operator's operation. As the twelfth function, the controller 80 changes the value of the second prime mover rotational speed stored in the storing unit 81 based on an operation signal output from the operating device 40.

The thirteenth function is a function to control the rotational speed of the prime mover 6 based on the vehicle speed and the load of the prime mover 6. As the thirteenth function, the controller 80 increases the rotational speed of the prime mover 6 in a case where the vehicle speed is constant and the load of the prime mover 6 is equal to or higher than a predetermined value based on (i) the vehicle speed detected by the vehicle speed sensor 70*h* and (ii) the load of the prime mover 6 based on the rotational speed of the prime mover 6 detected by the prime mover rotation sensor 70*a*.

The fourteenth function is a function to cut off power transmitted from the shuttle 20*d* by controlling the shuttle 20*d* based on an operator's operation. As the fourteenth function, the controller 80 switches the hydraulic clutch of the shuttle 20*d* to a neutral position based on an operation signal output from the operating device 40.

The fifteenth function is a function to switch the rotation direction of power output from the auxiliary transmission unit 20*c* to the direction corresponding to forward traveling by controlling the shuttle 20*d* based on an operator's operation. As the fifteenth function, the controller 80 switches the rotation direction of power output from the auxiliary transmission unit 20*c* to the direction corresponding to forward traveling by controlling the hydraulic clutch of the shuttle 20*d* based on an operation signal output from the operating device 40.

The sixteenth function is a function to switch the rotation direction of power output from the auxiliary transmission unit 20*c* to the direction corresponding to rearward traveling by controlling the shuttle 20*d* based on an operator's operation. As the sixteenth function, the controller 80 switches the rotation direction of power output from the auxiliary transmission unit 20*c* to the direction corresponding to rearward traveling by controlling the hydraulic clutch of the shuttle 20*d* based on an operation signal output from the operating device 40.

Note that although functions concerning power transmitted to the main transmission unit 20*b* of the transmission 20 have been described as the functions classified into the second category, the above functions are examples, and functions such as a function to change the upper limit value of the rotational speed of the prime mover 6 controlled by the controller 80 may be used as functions classified into the second category.

The third category relates to drive performance of the working vehicle 1 and function(s) to control at least one of the front transmission unit 20*f*, the rear wheel differential 21R, and the suspension mechanism 23 is/are classified into the third category. As functions classified into the third category, the controller 80 can control seventeenth to twenty-third functions, which are traveling functions. The seventeenth function is a function to switch to the 4WD equal speed state by controlling the front transmission unit 20*f* based on an operator's operation. As the seventeenth function, the controller 80 switches the first clutch 20*f*1 to a disengaged state and switches the second clutch 20*f*2 to an engaged state (4WD equal speed state) based on an operation signal output from the operating device 40.

The eighteenth function is a function to switch between 2WD and the 4WD equal speed state by controlling the front transmission unit 20*f* based on the vehicle speed and the steering angle of the steering device. As the eighteenth function, the controller 80 switches the first clutch 20*f*1 to a disengaged state and switches the second clutch 20*f*2 to an engaged state (4WD equal speed state) in a case where the vehicle speed is less than a predetermined value and the steering angle is less than a predetermined value based on the vehicle speed detected by the vehicle speed sensor 70*h* and the steering angle detected by the steering angle sensor 70*d*. On the other hand, as the fourteenth function, the controller 80 switches the first clutch 20*f*1 and the second clutch 20*f*2 of the front transmission unit 20*f* to a disengaged state (2WD) in a case where the vehicle speed is equal to or higher than the predetermined value or the steering angle is equal to or larger than the predetermined value.

The nineteenth function is a function to switch to the 4WD speed-increasing state by controlling the front transmission unit 20*f* based on an operator's operation. As the nineteenth function, the controller 80 switches the first clutch 20*f*1 to an engaged state and switches the second clutch 20*f*2 to a disengaged state based on an operation signal output from the operating device 40 (4WD speed-increasing state).

The twentieth function is a function to fix (directly couple) the rear wheel differential 21R based on an operator's operation. As the twentieth function, the controller 80 enables a differential lock by controlling the rear wheel differential 21R based on an operation signal output from the operating device 40.

The twenty-first function is a function to relatively lower the front portion of the vehicle body 2 by retracting the suspension cylinder 23*a* based on an operator's operation. As the twenty-first function, the controller 80 retracts the suspension cylinder 23*a* to lower the front portion of the vehicle body 2 by controlling a control valve based on an operation signal output from the operating device 40. Note that the controller 80 changes the suspension cylinder 23*a* back to a predetermined initial length to change the height of the front portion of the vehicle body 2 back to a predetermined initial position by controlling the control valve in a case where the vehicle speed detected by the vehicle speed sensor 70*h* is equal to or higher than a predetermined value in the twenty-first function.

The twenty-second function is a function to relatively raise the front portion of the vehicle body 2 by extending the suspension cylinder 23*a* based on an operator's operation. As the twenty-second function, the controller 80 extends the suspension cylinder 23*a* to raise the front portion of the vehicle body 2 by controlling the control valve based on an operation signal output from the operating device 40. Note that the controller 80 changes the suspension cylinder 23*a* back to a predetermined initial length to change the height of the front portion of the vehicle body 2 back to a predetermined initial position by controlling the control valve in a case where the vehicle speed detected by the vehicle speed sensor 70*h* is equal to or higher than a predetermined value in the twenty-second function.

The twenty-third function is a function to fully retract the suspension cylinder 23*a* in a case where the vehicle speed is less than a predetermined value. As the twenty-third function, the controller 80 retracts a suspension to a stroke end to lower the front portion of the vehicle body 2 by controlling the control valve in a case where the vehicle speed detected by the vehicle speed sensor 70*h* is less than a predetermined value. On the other hand, as the twenty-third function, the controller 80 changes the suspension cylinder 23*a* back to a predetermined initial length to change the height of the front portion of the vehicle body 2 back to a predetermined initial position by controlling the control valve in a case where the vehicle speed detected by the vehicle speed sensor 70*h* is equal to or higher than the predetermined value.

Note that although functions concerning drive performance of the working vehicle 1 have been described as the functions classified into the third category, the above functions are examples, and functions such as an automatic differential lock function, a function to change the vehicle speed in accordance with slip rate, and a function to change a control map for this function (a function to change slip sensitivity) may be used as the functions classified into the third category.

The fourth category relates to rotation of the PTO shaft 22. Function(s) to control the PTO power transmission unit 20*e* is/are classified into the fourth category. As a function classified into the fourth category, the controller 80 can control a twenty-fourth function, which is a work function. The twenty-fourth function is a function to switch power transmission to the PTO shaft 22 by controlling the PTO power transmission unit 20*e* in accordance with the height of the working device 10. As the twenty-fourth function, the controller 80 calculates the height of the working device 10 from a detection signal detected by the first angle sensor 70*e* and switches to a state where power of the propeller shaft 20*a* is transmitted to the PTO shaft 22 by controlling the hydraulic clutch of the PTO power transmission unit 20*e* in a case where the height of the working device 10 is less than a predetermined value. On the other hand, as the twenty-fourth function, the controller 80 calculates the height of the working device 10 from a detection signal detected by the first angle sensor 70*e* and switches to a state where power of the propeller shaft 20*a* is not transmitted to the PTO shaft 22 by controlling the hydraulic clutch of the PTO power transmission unit 20*e* in a case where the height of the working device 10 is equal to or higher than the predetermined value.

Note that although functions concerning rotation of the PTO shaft 22 have been described as the functions classified into the fourth category, the above functions are examples, and functions such as a function to switch power transmission to the PTO shaft 22 by controlling the PTO power transmission unit 20*e* by the controller 80 in response to an operator's operation may be used as functions classified into the fourth category.

The fifth category relates to the lifting device 30. Function(s) to control the lift cylinder 30*e* and/or the changing cylinder 31*a* is/are classified into the fifth category. As functions classified into the fifth category, the controller 80 can control twenty-fifth to thirty-first functions, which are work functions. The twenty-fifth function is a function to raise the working device 10 coupled to the lifting device 30 by extending the lift cylinder 30*e* based on an operator's operation. As the twenty-fifth function, the controller 80 extends the lift cylinder 30*e* and to raise the working device 10 by controlling a control valve based on an operation signal output from the operating device 40.

The twenty-sixth function is a function to lower the working device 10 coupled to the lifting device 30 by retracting the lift cylinder 30*e* based on an operator's operation. As the twenty-sixth function, the controller 80 retracts the lift cylinder 30*e* to lower the working device 10 by controlling the control valve based on an operation signal output from the operating device 40.

The twenty-seventh function is a function to change the upper limit value of the height of the working device 10 coupled to the lifting device 30 based on an operator's operation. As the twenty-seventh function, the controller 80 changes the upper limit value of the height of the working device 10 stored in the storing unit 81 based on an operation signal output from the operating device 40. Note that the controller 80 calculates the height of the working device 10 from a detection signal detected by the first angle sensor 70*e* and restricts the height of the working device 10 so that the detected height of the working device 10 does not exceed the upper limit value of the height of the working device 10 stored in the storing unit 81.

The twenty-eighth function is a function to change the lower limit value of the height of the working device 10 coupled to the lifting device 30 based on an operator's operation. As the twenty-eighth function, the controller 80 changes the lower limit value of the height of the working device 10 stored in the storing unit 81 based on an operation signal output from the operating device 40. Note that the controller 80 calculates the height of the working device 10 from a detection signal detected by the first angle sensor 70*e* and restricts the height of the working device 10 so that the detected height of the working device 10 does not become lower than the lower limit value of the height of the working device 10 stored in the storing unit 81.

The twenty-ninth function is a function to change the posture of the working device 10 coupled to the lifting device 30 by retracting the changing cylinder 31*a* based on an operator's operation. As the twenty-ninth function, the controller 80 retracts the changing cylinder 31*a* to raise a second portion which is one of opposite portions in the width direction (right portion) of the working device 10 and lowers a first portion which is the other of the opposite portions in the width direction (left portion) of the working device 10 by controlling a control valve based on an operation signal output from the operating device 40.

The thirtieth function is a function to change the posture of the working device 10 coupled to the lifting device 30 by extending the changing cylinder 31*a* based on an operator's operation. As the thirtieth function, the controller 80 extends the changing cylinder 31*a* to lower the second portion which is one of the opposite portions in the width direction (right portion) of the working device 10 and raise the first portion which is the other of the opposite portions in the width direction (left portion) of the working device 10 by controlling the control valve based on an operation signal output from the operating device 40.

The thirty-first function is a function to change the posture of the working device 10 coupled to the lifting device 30 back to a predetermined initial state by changing the changing cylinder 31*a* back to a predetermined initial length based on an operator's operation. As the thirty-first function, the controller 80 changes the changing cylinder 31*a* back to the predetermined initial length and therefore makes the posture of the working device 10 with respect to the vehicle body 2 parallel by controlling the control valve based on an operation signal output from the operating device 40.

Note that although functions concerning the lifting device 30 have been described as the functions classified into the fifth category, the above functions are examples, and functions such as a function to change the angle of the posture of the working device 10 with respect to the vehicle body 2 by controlling the changing cylinder 31*a* by the controller 80, a function to change the speed of retraction of the lift cylinder 30*e*, that is, the speed of lowering the working device 10 by controlling the control valve by the controller 80, and a function to restrict (lock) driving and free fall of the lifting device 30 may be used as the functions classified into the fifth category.

The sixth category relates to the working device 10 including the hydraulic attachment 10*a*. Function(s) to control the working device 10 is/are classified into the sixth category. As functions classified into the sixth category, the controller 80 can control thirty-second and thirty-third functions, which are work functions. The thirty-second function is a function to adjust the flow rate of hydraulic fluid supplied to the hydraulic attachment 10*a* based on an operator's operation. As the thirty-second function, the controller 80 increases the flow rate of the hydraulic fluid supplied to the hydraulic attachment 10*a* to increase the flow speed of the hydraulic fluid by controlling a predetermined auxiliary valve 32 (any of the first auxiliary valve 32*a*, the second auxiliary valve 32*b*, the third auxiliary valve 32*c*, and the fourth auxiliary valve 32*d*) among the plurality of auxiliary valves 32 based on an operation signal output from the operating device 40.

The thirty-third function is a function to adjust the flow rate of the hydraulic fluid supplied to the hydraulic attachment 10*a* based on an operator's operation. As the thirty-third function, the controller 80 decreases the flow rate of the hydraulic fluid supplied to the hydraulic attachment 10*a* to decrease the flow speed of the hydraulic fluid by controlling predetermined auxiliary valve(s) 32 (any one or more of the first auxiliary valve 32*a*, the second auxiliary valve 32*b*, the third auxiliary valve 32*c*, and the fourth auxiliary valve 32*d*) among the plurality of auxiliary valves 32 based on an operation signal output from the operating device 40.

Note that although functions to control the working device 10 including the hydraulic attachment 10*a* have been described as the functions classified into the sixth category, the above functions are examples, and functions such as a function to change the speed by controlling the auxiliary valve 32 by the controller 80 may be used as functions classified into the sixth category.

The seventh category relates to the front loader 35. Function(s) to control the boom cylinder 35*d* and/or the bucket cylinder 35*e* is/are classified into the seventh category. As functions classified into the seventh category, the controller 80 can control thirty-fourth to forty-first functions, which are work functions. The thirty-fourth function is a function to swing the boom 35*b* upward by extending the boom cylinder 35*d* based on an operator's operation. As the thirty-fourth function, the controller 80 extends the boom cylinder 35*d* and therefore swings the boom 35*b* upward by controlling a control valve based on an operation signal output from the operating device 40.

The thirty-fifth function is a function to swing the boom 35*b* downward by retracting the boom cylinder 35*d* based on an operator's operation. As the thirty-fifth function, the controller 80 retracts the boom cylinder 35*d* to swing the boom 35*b* downward by controlling the control valve based on an operation signal output from the operating device 40.

The thirty-sixth function is a function to swing the bucket 35*c* upward (perform shoveling) by retracting the bucket cylinder 35*e* based on an operator's operation. As the thirty-sixth function, the controller 80 retracts the bucket cylinder 35*e* to perform a shoveling action by controlling the control valve based on an operation signal output from the operating device 40.

The thirty-seventh function is a function to swing the bucket 35*c* downward (perform dumping) by extending the bucket cylinder 35*e* based on an operator's operation. As the thirty-seventh function, the controller 80 extends the bucket cylinder 35*e* to perform a dumping action by controlling the control valve based on an operation signal output from the operating device 40.

The thirty-eighth function is a function to get rid of an object from the bucket 35*c* by swinging the bucket 35*c*. As the thirty-eighth function, the controller 80 swings the bucket 35*c* two or more times while directing the bucket 35*c* downward by controlling the control valves connected to the boom cylinder 35*d* and the bucket cylinder 35*e*.

The thirty-ninth function is a function to calculate the mass of the object carried by the bucket 35*c*. As the thirty-ninth function, the controller 80 calculates the mass of the carried object based on the pressure of hydraulic fluid flowing through fluid passages connected to the boom cylinder 35*d* and the bucket cylinder 35*e*, an angle of the boom 35*b*, and the like and causes the mass to be displayed on the display 90. Note that the calculating method is not limited to the above method as long as the controller 80 can calculate the mass of the carried object as the thirty-ninth function.

The fortieth function is a function to change the operation speed of the front loader 35 based on an operator's operation. As the fortieth function, the controller 80 adjusts the degree of opening of the control valve of the boom cylinder 35*d* and a degree of opening of the control valve of the bucket cylinder 35*e* during action of the front loader 35 to change the flow rate of hydraulic fluid supplied to the boom cylinder 35*d* and the bucket cylinder 35*e* based on an operation signal output from the operating device 40.

The forty-first function is a function to move the action position of the front loader 35 (bucket 35*c*) to a predetermined position. As the forty-first function, the controller 80 moves the action position of the bucket 35*c* to the predetermined position by controlling the control valve of the boom cylinder 35*d* and the control valve of the bucket cylinder 35*e* based on positional information stored in the storing unit 81, the angle of the boom 35*b* detected by the second angle sensor 70*f*, the angle of the bucket 35*c* detected by the third angle sensor 70*g*, and the like.

Note that although functions concerning the front loader 35 have been described as the functions classified into the seventh category, the above functions are examples, and functions such as a function to keep the horizontal state of the bucket 35*c* (horizon control) by controlling the control valve of the boom cylinder 35*d* and the control valve of the bucket cylinder 35*e* by the controller 80 may be used as functions classified as the seventh category.

The eighth category relates to precise work of the working device 10. Function(s) to cause the working device 10 to perform precise work is/are classified into the eighth category. As functions classified into the eighth category, the controller 80 can control forty-second and forty-third functions, which are work functions. The forty-second function is a function to cause the working vehicle 1 to perform a series of actions defined in advance. Information such as content and the order of the series of actions is stored in the storing unit 81. The storing unit 81 stores therein, for example, an action (exiting action) performed in a case where the working vehicle 1 moves from a work region inside a headland to a headland region in an agricultural field and a series of actions (entering action) performed in a case where the working vehicle 1 moves from the headland region to the work region.

Specifically, as the forty-second function, when the exiting action is read from the storing unit 81, the controller 80 raises the working device 10 by controlling a control valve and switches to a state where power of the propeller shaft 20*a* is not transmitted to the PTO shaft 22 by controlling the hydraulic clutch of the PTO power transmission unit 20*e*. Furthermore, the controller 80 unlocks a differential lock by controlling the rear wheel differential 21R and switches to 2WD by controlling the front transmission unit 20*f*.

Furthermore, as the forty-second function, when the entering action is read from the storing unit 81, the controller 80 switches to the 4WD equal speed state by controlling the front transmission unit 20*f* and performs differential lock by controlling the rear wheel differential 21R. The controller 80 lowers the working device 10 by controlling the control valve and switches to a state where power of the propeller shaft 20*a* is transmitted to the PTO shaft 22 by controlling the hydraulic clutch of the PTO power transmission unit 20*e*.

Note that the series of actions performed by the working vehicle 1 in the forty-second function are not limited to the exiting action and the entering action, and the content of the actions is not limited to the above example as long as the series of actions are those which are performed by the working vehicle 1.

The forty-third function is a function to cause the working device 10 to control the working vehicle 1 by using the controller 80 in a case where the working device 10 is communicably connected to the controller 80. The controller 80 is provided in the working device 10, and controls, for example, functions such as the seventeenth to twentieth functions, the twenty-fifth function, and the twenty-sixth function based on an instruction from a control unit 10*b* including electric/electronic circuit(s) and/or program(s) stored in CPU(s) and/or the like.

Note that although functions concerning the precise work performed by the working device 10 have been described as the functions classified into the eighth category, the above functions are examples, and functions such as a function (automatic steering) performed by the controller 80 to control an automatic steering mechanism to control steering of the vehicle body 2 based on a predetermined travel line may be used as the functions classified into the eighth category.

The ninth category relates to other device(s). Functions such as a function (forty-fourth function) to adjust the sound volume of a speaker provided in the working vehicle 1 and a function (forty-fifth function) to adjust the operation sensitivity of the operating device 40 are classified into the ninth category.

Note that the above plurality of functions (the first to forty-fifth functions) and the categories (the first to ninth categories) are mere examples, and kinds of the functions and a classification method are not restrictive, and only one or some of these functions may be used, another function may be added, or a function may be changed. The controller 80 may perform a function to change a parameter of a function, such as the tenth function to change the first prime mover rotational speed of the ninth function or the twelfth function to change the second prime mover rotational speed of the eleventh function, although detailed description thereof is omitted.

Figure 5:
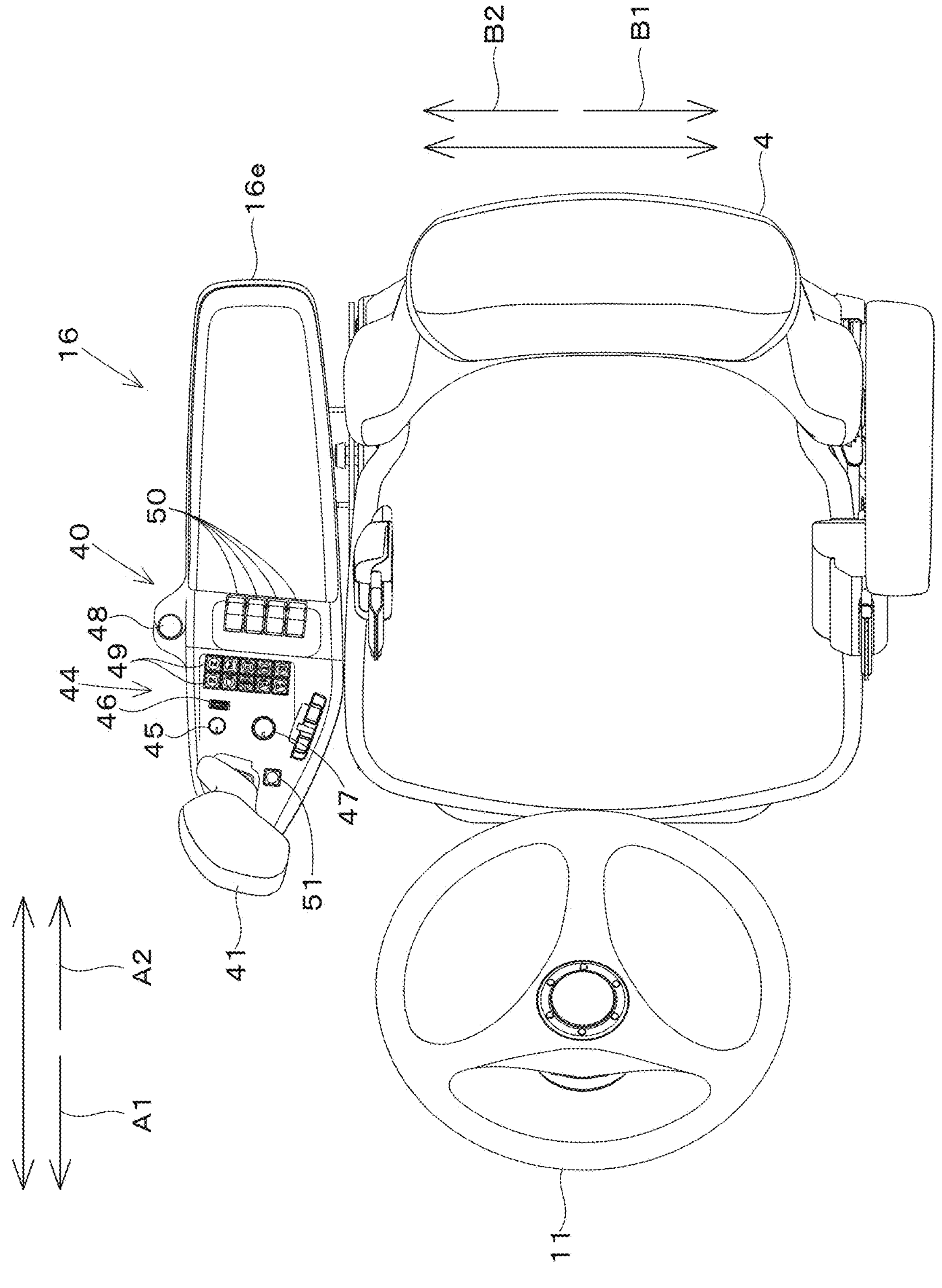
FIG. 5 is a plan view illustrating a layout of members such as an armrest around an operator's seat.
Figure 6:
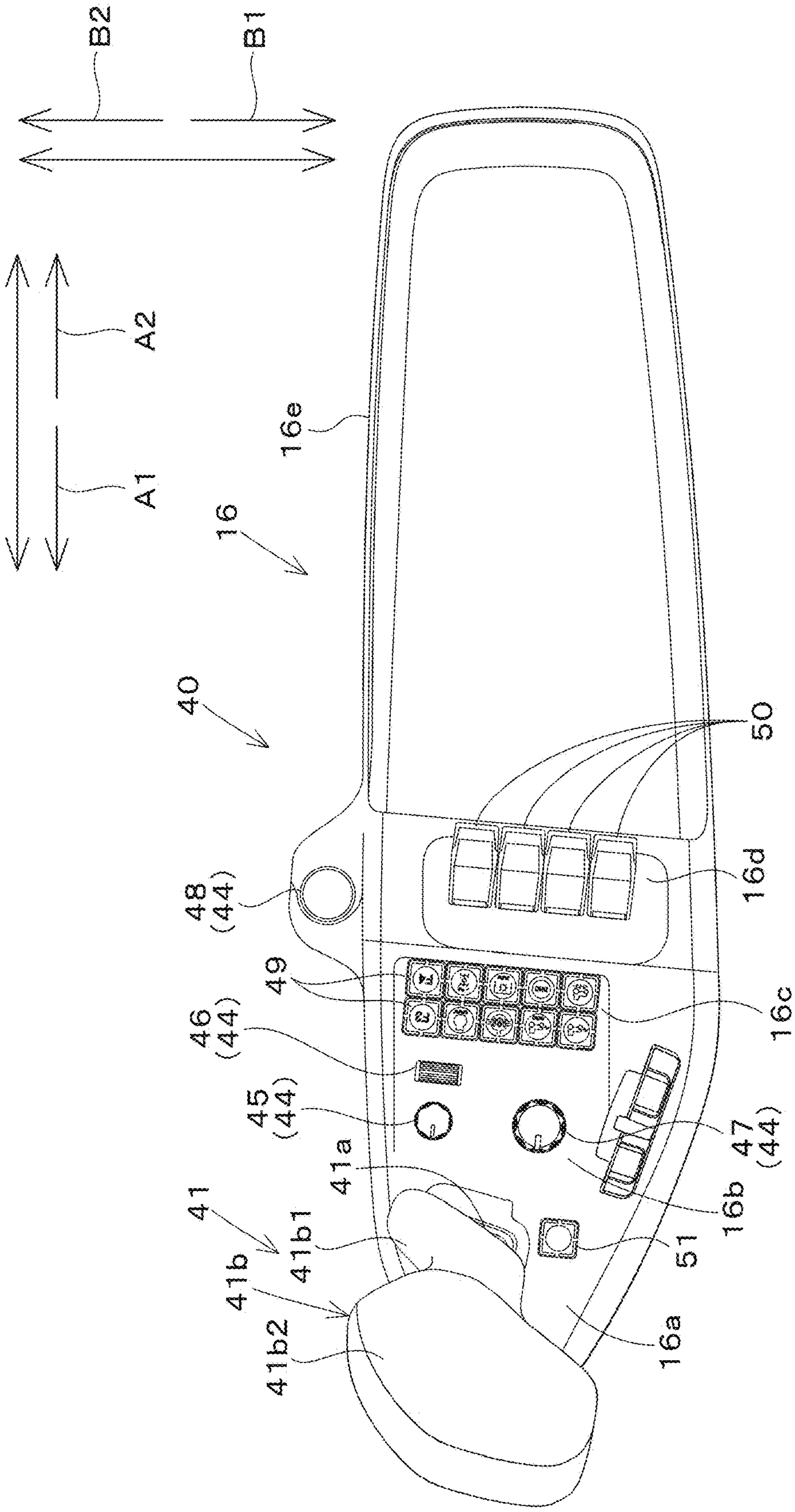
FIG. 6 is a plan view of the armrest.

As illustrated in FIG. 2, the operating device 40 includes an operating lever 41, a dial 44, and an operation actuator 49. FIG. 5 is a plan view illustrating a layout of members such as an armrest 16 around the operator's seat 4. As illustrated in FIG. 5, the armrest 16 is provided on a second side which is one of the opposite sides in the vehicle body width direction (right side) of the operator's seat 4, and the operating device 40 is provided on the armrest 16. FIG. 6 is a plan view of the armrest 16. As illustrated in FIGS. 5 and 6, the armrest 16 is positioned such that a longitudinal direction thereof matches the front-rear direction and a lateral direction thereof matches the vehicle body width direction.

The operating lever 41 is a lever to cause the working vehicle 1 to perform various functions. Furthermore, the operating lever 41 is pivotally supported and is pivotable in at least one direction. The operating lever 41 is provided in a first region 16*a* on an upper surface of a front portion of the armrest 16 so as to protrude upward. The operating device 40 includes one or more operating levers 41. In the present example embodiment, the operating device 40 includes one operating lever 41.

Note that the number of operating levers 41 included in the operating device 40 is not limited to one, and may be any number such as two or three, for example. Furthermore, an operation direction of the operating lever 41 is not limited to the front-rear direction and the vehicle body width direction, and the number of operation directions and directions thereof are not limited to the above example.

Figure 7:
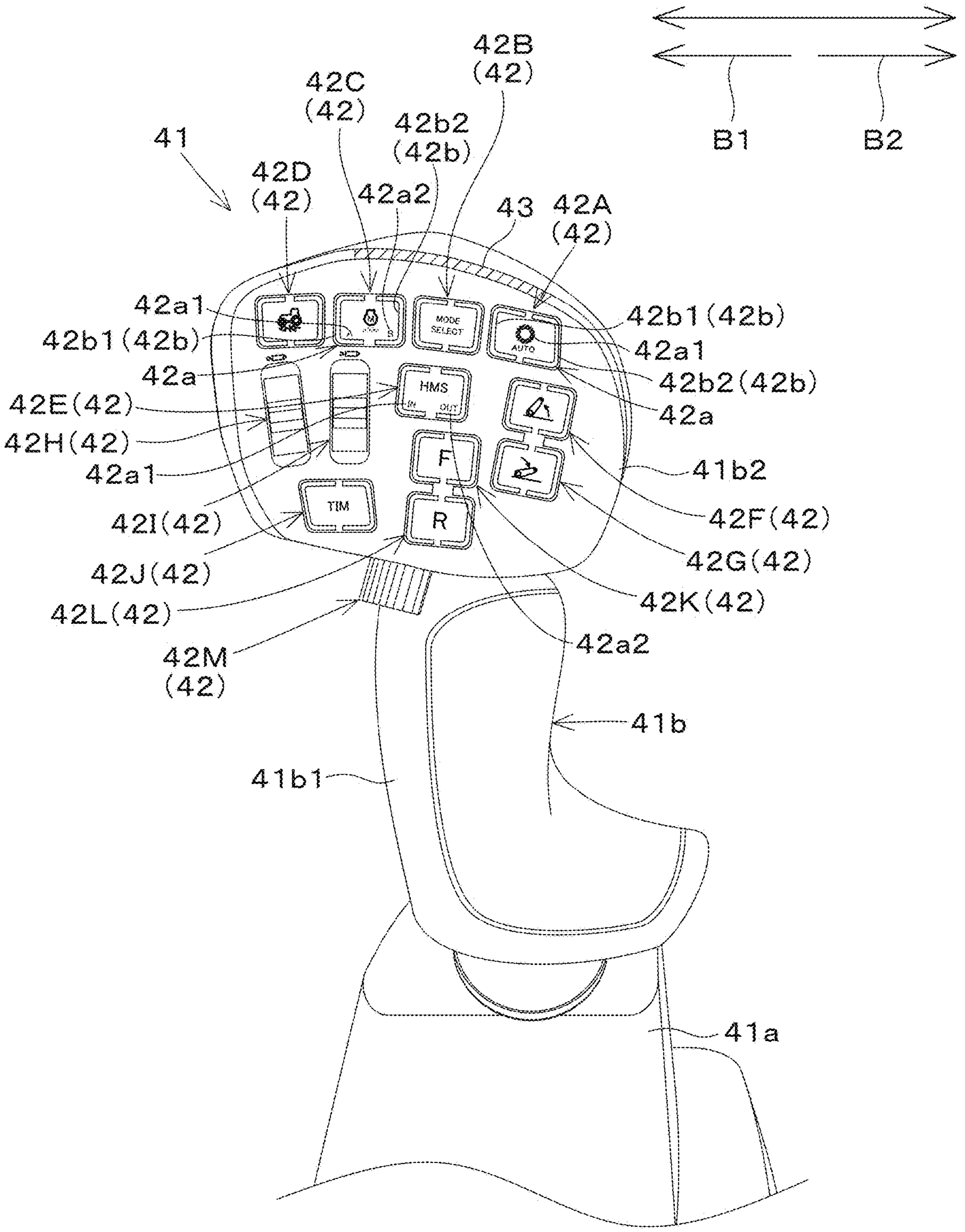
FIG. 7 is a perspective view of a grip of an operating lever and its surroundings as viewed from an upper left rear side.

FIG. 7 is a perspective view of a grip 41*b* of the operating lever 41 and its surroundings viewed from an upper left rear side. As illustrated in FIG. 7, the operating lever 41 includes a base portion (swinging body) 41*a* and the grip 41*b*. The base portion 41*a* is pivotally supported on an upper surface of the first region 16*a*, in other words, in a vicinity of the operator's seat 4 of the working vehicle 1. Specifically, the base portion 41*a* includes a shaft body inserted into the first region 16*a* and is a portion of a pivot shaft of the operating lever 41 (shaft about which the operating lever 41 is pivoted). The base portion 41*a* is, for example, pivotable in the front-rear direction and the vehicle body width direction.

As illustrated in FIG. 7, the grip 41*b* is provided on an upper portion (distal portion) of the base portion 41*a*. The grip 41*b* includes a gripping portion 41*b*1 and an operating portion 41*b*2. The gripping portion 41*b*1 and the operating portion 41*b*2 of the operating lever 41 are arranged in the up-down direction. In the present example embodiment, the operating portion 41*b*2 is located on an upper portion of the gripping portion 41*b*1.

The gripping portion 41*b*1 is gripped by one hand (right hand) of the operator sitting on the operator's seat 4. The operating portion 41*b*2 is a portion where the operator gripping the gripping portion 41*b*1 performs an operation with a stretched finger.

As illustrated in FIGS. 2 and 7, the operating lever 41 includes one or more operating switches 42. The operating switches 42 are operated to cause the working vehicle to perform various functions 1. In the present example embodiment, a plurality of operating switches 42 are provided on the operating lever 41. The operating switches 42 include a push-button switch (tactile switch) operated by pressing an operation surface 42*a*, a slide switch operated by sliding the operation surface 42*a*, a dial-like switch (dial switch) such as a selector switch having a plurality of switching positions, and/or the like. As illustrated in FIG. 7, the operating switches 42 are located on a rear surface of the operating portion 41*b*2 of the operating lever 41. That is, the plurality of operating switches 42 are located on the surface of the grip 41*b* that faces the operator's seat 4.

In the present example embodiment, the number of operating switches 42 is 13. The operating switches 42 may include a first operating switch 42A, a second operating switch 42B, a third operating switch 42C, a fourth operating switch 42D, a fifth operating switch 42E, a sixth operating switch 42F, a seventh operating switch 42G, an eighth operating switch 42H, a ninth operating switch 42I, a tenth operating switch 42J, an eleventh operating switch 42K, a twelfth operating switch 42L, and a thirteenth operating switch 42M, for example.

As illustrated in FIG. 7, in the example illustrated in the present example embodiment, the first operating switch 42A, the second operating switch 42B, the third operating switch 42C, the fourth operating switch 42D, the fifth operating switch 42E, the sixth operating switch 42F, the seventh operating switch 42G, the tenth operating switch 42J, the eleventh operating switch 42K, and the twelfth operating switch 42L are tactile switches. The eighth operating switch 42H and the ninth operating switch 42I are slide switches. The thirteenth operating switch 42M is a dial switch.

Note that the number of operating switches 42 is not limited to 13 and may be one or two, and the number and kinds of operating switches 42 are not limited.

Figure 8:
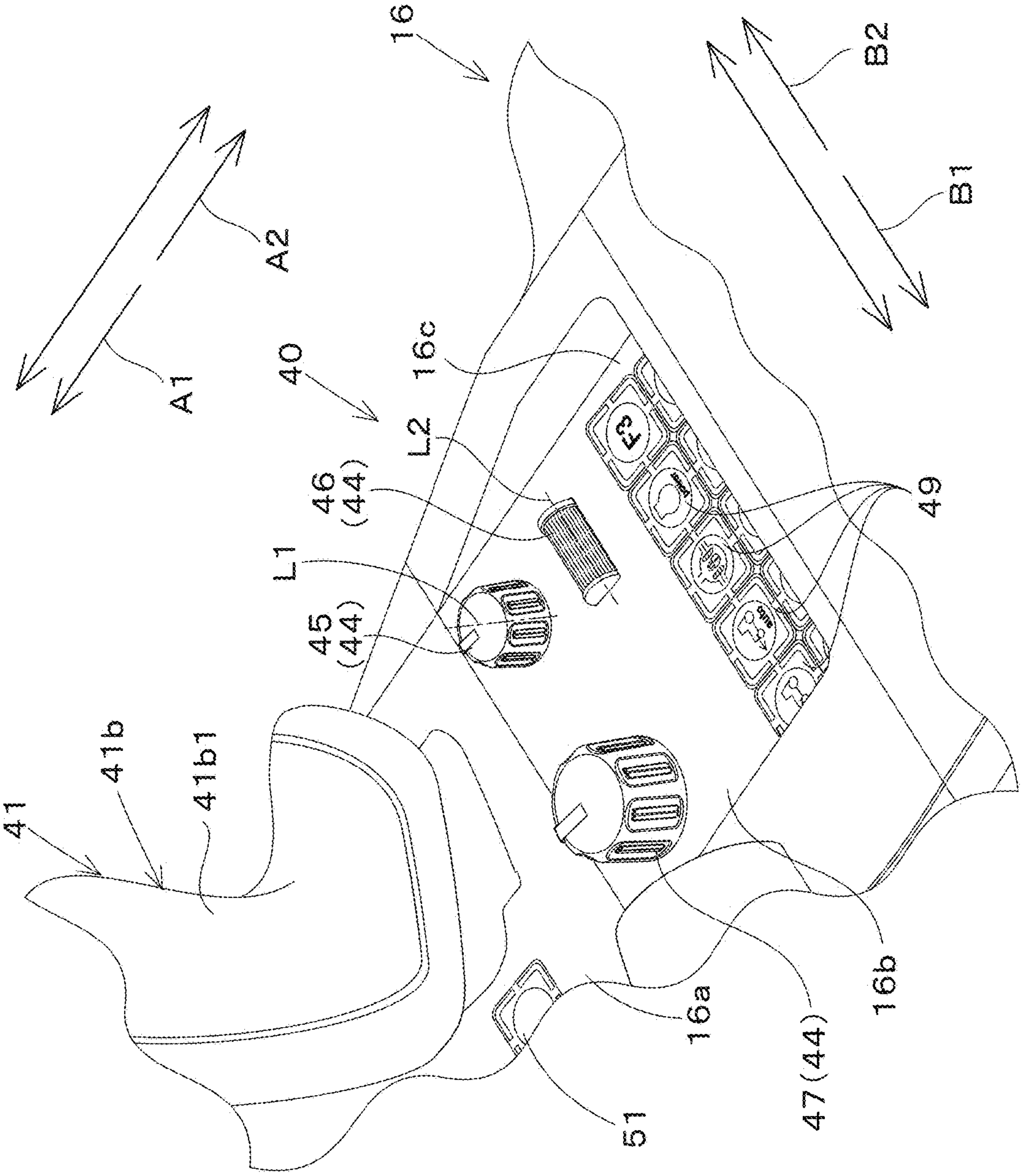
FIG. 8 is a perspective view of a first dial and a second dial as viewed from an upper left rear side.

The dial 44 is a dial switch such as a selector switch having a plurality of switching positions. As illustrated in FIGS. 2, 5, and 6, the operating device 40 includes a plurality of dials 44, and includes at least a first dial (first function operation actuator) 45 and a second dial (second function operation actuator) 46. FIG. 8 is a perspective view of the first dial 45 and the second dial 46 as viewed from an upper left rear side. As illustrated in FIGS. 5, 6, and 8, the dial 44 is provided in a second region 16*b* on the upper surface of the front portion of the armrest 16. The second region 16*b* is located rearward of the first region 16*a*, and the first region 16*a* and the second region 16*b* are arranged in the front-rear direction.

Note that the operating device 40 may include, as the dial 44, another dial(s) 44 in addition to the first dial 45 and the second dial 46. For example, the operating device 40 may include a third dial 47. The third dial 47 receives an instruction to perform the twenty-fifth function by being rotated in one direction (clockwise direction) and receives an instruction to perform the twenty-sixth function by being rotated in the other direction (counterclockwise direction).

The operating device 40 may include a fourth dial 48 to operate the display 90. The fourth dial 48 can be rotated and pressed. The fourth dial 48 receives selection of an item displayed on the display 90 by being rotated in one direction (clockwise direction) or the opposite direction (counterclockwise direction). Furthermore, the fourth dial 48 receives determination (confirmation) of the selected item by being pressed.

Figure 9:
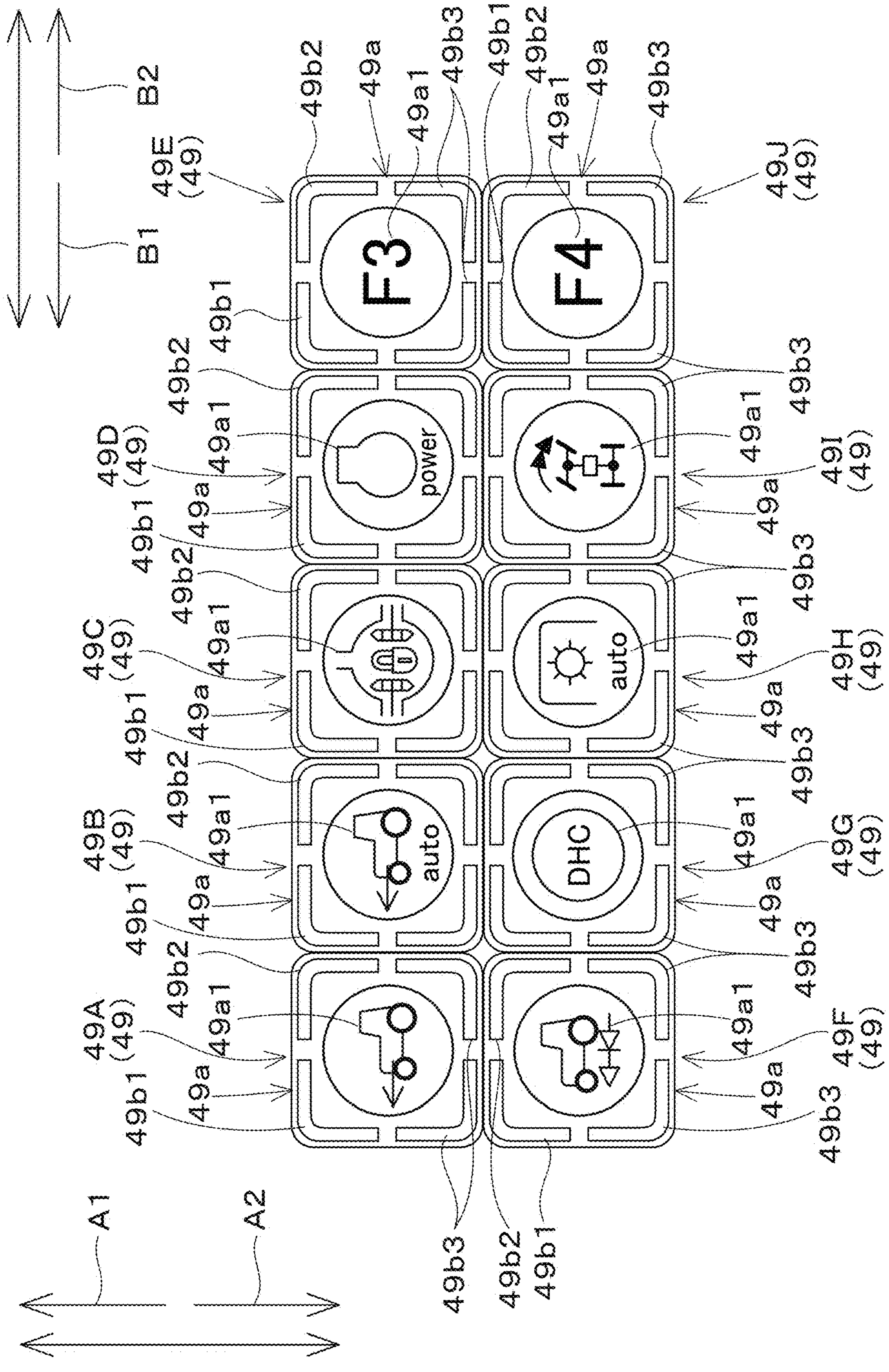
FIG. 9 is a plan view of a plurality of operation actuators.

The operation actuator 49 is a switch to operate a predetermined function among the plurality of functions. In the present example embodiment, the operating device 40 includes a plurality of the operation actuators 49. The operation actuators 49 are push-button switches (tactile switches) operated by being pressed. FIG. 9 is a plan view of the plurality of operation actuators 49. Operation surfaces 49*a* of the operation actuators 49 each have a rectangular or substantially rectangular shape in plan view. As illustrated in FIGS. 5, 6, and 9, the number of operation actuators 49 is 10. The operation actuators 49 include a first operation actuator 49A, a second operation actuator 49B, a third operation actuator 49C, a fourth operation actuator 49D, a fifth operation actuator 49E, a sixth operation actuator 49F, a seventh operation actuator 49G, an eighth operation actuator 49H, a ninth operation actuator 49I, and a tenth operation actuator 49J. In the example illustrated in FIGS. 5, 6, and 9, the first operation actuator 49A, the second operation actuator 49B, the third operation actuator 49C, the fourth operation actuator 49D, and the fifth operation actuator 49E are arranged in the vehicle body width direction to define a row (first row). The sixth operation actuator 49F, the seventh operation actuator 49G, the eighth operation actuator 49H, the ninth operation actuator 49I, and tenth operation actuator 49J are arranged in the vehicle body width direction to define a row (second row). The first row and the second row are arranged in the front-rear direction.

Note that the number of operation actuators 49 is not limited to 10, and may be any number such as 1 or 2.

As illustrated in FIGS. 5 and 6, the operation actuators 49 are provided in a third region 16*c* on the upper surface of the front portion of the armrest 16. The third region 16*c* is located rearward of the second region 16*b*, and the second region 16*b* and the third region 16*c* are arranged in the front-rear direction.

Note that although a case where the operating device 40 includes the operating lever 41, the dial(s) 44, and the operation actuator(s) 49 has been described as an example in the above example embodiment, the operating device 40 need only include at least any one of the operating lever 41, the dial(s) 44, and the operation actuator(s) 49 and may include another operation member(s) in addition to such one or more of the operating lever 41, the dial(s) 44, and the operation actuator(s) 49. For example, as illustrated in FIG. 2, the operating device 40 may include one or more swinging operation members 50 that are operated by being swung. Each swinging operation member 50 receives an instruction to perform the thirty-second function by being swung in one direction (forward) and receives an instruction to perform the thirty-third function by being swung in the other direction (rearward).

As illustrated in FIGS. 5 and 6, the swinging operation members 50 are provided in a fourth region 16*d* on the upper surface of the front portion of the armrest 16. The fourth region 16*d* is located rearward of the third region 16*c*, and the third region 16*c* and the fourth region 16*d* are arranged in the front-rear direction. More specifically, the fourth region 16*d* is provided in a rear portion of the armrest 16 and is located forward of an elbow rest 16*e* on which the operator sitting on the operator's seat 4 places their elbow.

The operating device 40 preferably includes as many swinging operation members 50 as the number of auxiliary valves 32. That is, in the present example embodiment, four auxiliary valves 32 are provided, and therefore the operating device 40 includes four swinging operation members 50. The four swinging operation members 50 are arranged adjacent in the vehicle body width direction and can be swung about an axis extending in the substantially vehicle body width direction.

As illustrated in FIGS. 2, 5, and 6, the operating device 40 includes a selector 51 to be operated to select an operation mode of the operating lever 41. The selector 51 is located in a vicinity of the operating lever 41 in the first region 16*a*. The selector 51 is, for example, a physical switch, and is a push-button switch (tactile switch) operated by being pressed, a dial-like switch such as a selector switch having a plurality of switching positions, or the like. In the present example embodiment, the selector 51 is a tactile switch. The operating lever 41 sequentially switches the operation mode in response to an operation of the tactile switch. Note that although the selector 51 is a tactile switch located in the first region 16*a* in the above example, the selector 51 is not limited to a tactile switch, and the position thereof is not limited to the first region 16*a*. For example, the selector 51 may be a display image that is displayed on a display screen of the display 90 or the like and receives an operation.

The operating lever 41 is configured such that function(s) to be performed in accordance with an instruction received by the operating lever 41 vary (varies) depending on an operation mode selected via (by the operation of) the selector 51. In this way, the operating lever 41 can be operated to operate various functions of the working vehicle 1, and the operator is less likely to operate a wrong lever or a wrong switch without the need to switch the operating lever 41 to another one every time an environment where the working vehicle 1 travels or work content changes. Furthermore, since it is unnecessary to increase the number of operating levers 41 in accordance with the kinds of functions of the working vehicle 1, it is possible to reduce the number of operation members on the operating device 40. This can not only improve operability of the entire operating device 40, but also eliminate or reduce the likelihood that the operating lever 41 will hinder a field of view of the operator.

The operating lever 41 is configured such that, for example, function(s) to be performed in accordance with an instruction received by the operating lever 41 is/are changed indirectly by changing function(s) corresponding to operation signal(s) output from the operating lever 41 by the controller 80. Specifically, the storing unit 81 stores therein a plurality of tables (standard tables) corresponding to operation modes in each of which operation signal(s) of the operating lever 41 and function(s) are associated with each other. The controller 80 acquires a standard table corresponding to an operation mode from the storing unit 81 and changes function(s) corresponding to operation signal(s) output from the operating lever 41.

Note that the operating lever 41 need only be configured such that function(s) to be performed in accordance with an instruction received by the operating lever 41 vary (varies) depending on the operation mode. The operating lever 41 itself may be operable to change the operation mode and output different operation signals depending on the operation mode, so that function(s) to be performed in accordance with an instruction received by the operating lever 41 is/are changed. In such a case, the operating lever 41 includes an operation control unit (not illustrated) including electric/electronic circuit(s) and/or program(s) stored in CPU(s) and/or the like, and causes the operation control unit to change the operation mode to change operation signal(s) corresponding to the operation(s). Furthermore, a storage medium (not illustrated) connected to the operation control unit stores therein a plurality of standard tables corresponding to operation modes in each of which operation(s) (the manner(s) in which the operating lever 41 etc. is operated) and operation signal(s) are associated with each other, and the operation control unit acquires a standard table corresponding to an operation mode from the storage medium and causes an operation signal corresponding to each operation to differ.

The operating lever 41 is configured such that function(s) to be performed in accordance with an instruction received by the operating lever 41 being pivoted vary (varies) depending on an operation mode selected via the selector 51. In other words, the operating lever 41 receives an instruction to perform a function that varies depending on the operation mode when pivoted. Additionally or alternatively, the operating lever 41 may receive an instruction to perform a function when an operating switch 42 is operated, based on the operation mode. In other words, the operating lever 41 may receive an instruction to perform a function that varies depending on the operation mode when the operating switch 42 is operated.

There are a plurality of such operation modes of the operating lever 41. In the present example embodiment, the operation modes include first to fourth modes. That is, in the present example embodiment, the storing unit 81 stores therein four standard tables (which may be hereinafter referred to as first to fourth standard tables) corresponding to the first to fourth modes. FIG. 10 illustrates an example of a standard table. The following describes a relationship among the first to fourth modes, kinds of operations of the operating lever 41 in each of the operation modes, and instructions to operate functions received by the operations with reference to FIG. 10.

The first mode is a mode in which at least work function (s) relating to work among the functions of the working vehicle 1 is/are performed. In the first mode, the operating lever 41 receives an instruction to perform a work function by being pivoted. In the first standard table, each operation signal which the operating lever 41 outputs when pivoted and a corresponding work function are associated. In other words, in the first mode, the operating lever 41 does not receive an instruction to perform a traveling function even when pivoted.

Specifically, in the first mode, the operating lever 41 receives an instruction to perform the thirty-fifth function when pivoted forward. That is, in the first standard table, an operation signal which the operating lever 41 outputs when pivoted forward and the thirty-fifth function are associated. Therefore, in the first mode, when the operating lever 41 is pivoted forward, the controller 80 retracts the boom cylinder 35*d* to swing the boom 35*b* downward by controlling a control valve.

In the first mode, the operating lever 41 receives an instruction to perform the thirty-sixth function when pivoted rearward. That is, in the first standard table, an operation signal which the operating lever 41 outputs when pivoted rearward and the thirty-sixth function are associated. Therefore, in the first mode, when the operating lever 41 is pivoted rearward, the controller 80 extends the boom cylinder 35*d* to swing the boom 35*b* upward by controlling a control valve.

In the first mode, the operating lever 41 receives an instruction to perform the thirty-seventh function when pivoted rightward. That is, in the first standard table, an operation signal which the operating lever 41 outputs when pivoted rightward and the thirty-seventh function are associated. Therefore, in the first mode, when the operating lever 41 is pivoted rightward, the controller 80 extends the bucket cylinder 35*e* so that the bucket 35*c* performs a dumping action by controlling a control valve.

In the first mode, the operating lever 41 receives an instruction to perform the thirty-eighth function when pivoted leftward. That is, in the first standard table, an operation signal which the operating lever 41 outputs when pivoted leftward and the thirty-eighth function are associated. Therefore, in the first mode, when the operating lever 41 is pivoted leftward, the controller 80 retracts the bucket cylinder 35*e* so that the bucket 35*c* performs a shoveling action by controlling a control valve.

In the first mode, the operating lever 41 receives instructions to operate a plurality of functions including work function(s) upon operation of the plurality of operating switches 42. That is, in the first standard table, at least one work function is associated with operation signal(s) output by the operating lever 41 upon operation of the operating switch(es) 42.

Specifically, in the first mode, the operating lever 41 receives an instruction to perform the first function when the first operating switch 42A is operated. That is, in the first standard table, an operation signal output by the operating lever 41 when the first operating switch 42A is operated and the first function are associated. Therefore, in the first mode, when the first operating switch 42A is operated, the controller 80 enables or disables the first function in response to the operation, and in a case where the first function is enabled, the controller 80 changes the speed stage of the transmission 20 by controlling the shifter of the main transmission unit 20*b* and/or the shifter of the auxiliary transmission unit 20*c* based on the vehicle speed detected by the vehicle speed sensor 70*h* and a control map defined in advance.

In the first mode, the operating lever 41 receives an instruction to perform the forty-fifth function when the second operating switch 42B is operated. That is, in the first standard table, an operation signal output by the operating lever 41 when the second operating switch 42B is operated and the forty-fifth function are associated. Therefore, in the first mode, when the second operating switch 42B is operated, the controller 80 adjusts operation sensitivity of the operating device 40 in response to the operation of the second operating switch 42B. In the present example embodiment, the controller 80 adjusts operation sensitivity of a swinging operation of the operating lever 41, for example, adjusts a dead zone. The controller 80 selects one of a plurality of operation sensitivities (levels) from a low operation sensitivity to a high operation sensitivity in response to the operation of the second operating switch 42B.

In the first mode, the operating lever 41 receives an instruction to perform the ninth function when the third operating switch 42C is operated. That is, in the first standard table, an operation signal output by the operating lever 41 when the third operating switch 42C is operated and the ninth function are associated. Therefore, in the first mode, when the third operating switch 42C is operated, the controller 80 enables or disables the ninth function in response to the operation, and in a case where the ninth function is enabled, the controller 80 controls the rotational speed of the prime mover 6 to the first prime mover rotational speed irrespective of an operation of the accelerator pedal.

In the first mode, the operating lever 41 receives an instruction to perform the seventh function when the fourth operating switch 42D is operated. That is, in the first standard table, an operation signal output by the operating lever 41 when the fourth operating switch 42D is operated and the seventh function are associated. Therefore, in the first mode, when the fourth operating switch 42D is operated, the controller 80 enables or disables the seventh function in response to the operation, and in a case where the seventh function is enabled, the controller 80 switches the hydraulic clutch of the shuttle 20*d* to a neutral position to shut off transmission of power to the traveling device 3 in a case where the vehicle speed becomes less than a predetermined value as a result of an operation of the brake pedal.

In the first mode, the operating lever 41 receives an instruction to perform the forty-first function when the fifth operating switch 42E is operated. That is, in the first standard table, an operation signal output by the operating lever 41 when the fifth operating switch 42E is operated and the forty-first function are associated. Therefore, in the first mode, when the fifth operating switch 42E is operated, the controller 80 moves the action position of the front loader 35 (bucket 35*c*) to a predetermined position in response to the operation.

In the first mode, the operating lever 41 receives an instruction to perform the twenty-fifth function when the sixth operating switch 42F is operated. That is, in the first standard table, an operation signal output by the operating lever 41 when the sixth operating switch 42F is operated and the twenty-fifth function are associated. Therefore, in the first mode, when the sixth operating switch 42F is operated, the controller 80 extends the lift cylinder 30*e* to raise the working device 10 coupled to the lifting device 30 in response to the operation.

In the first mode, the operating lever 41 receives an instruction to perform the twenty-sixth function when the seventh operating switch 42G is operated. That is, in the first standard table, an operation signal output by the operating lever 41 when the seventh operating switch 42G is operated and the twenty-sixth function are associated. Therefore, in the first mode, when the seventh operating switch 42G is operated, the controller 80 retracts the lift cylinder 30*e* to lower the working device 10 coupled to the lifting device 30 in response to the operation.

In the first mode, the operating lever 41 receives an instruction to perform the thirty-second function or the thirty-third function when the eighth operating switch 42H is operated. That is, in the first standard table, an operation signal output by the operating lever 41 when the eighth operating switch 42H is slid in one direction and the thirty-second function are associated, and an operation signal output by the operating lever 41 when the eighth operating switch 42H is slid in the opposite direction and the thirty-third function are associated. Note that in the present example embodiment, in the first mode, when the eighth operating switch 42H is operated, the controller 80 adjusts the flow rate of hydraulic fluid supplied to the hydraulic attachment 10*a* by controlling the first auxiliary valve 32*a* in response to the operation.

In the first mode, the operating lever 41 receives an instruction to perform the thirty-second function or the thirty-third function when the ninth operating switch 42I is operated. That is, in the first standard table, an operation signal output by the operating lever 41 when the ninth operating switch 42I is slid in one direction and the thirty-second function are associated, and an operation signal output by the operating lever 41 when the ninth operating switch 42I is slid in the opposite direction and the thirty-third function are associated. Note that in the present example embodiment, in the first mode, when the ninth operating switch 42I is operated, the controller 80 adjusts the flow rate of hydraulic fluid supplied to the hydraulic attachment 10*a* by controlling the second auxiliary valve 32*b* in response to the operation.

In the first mode, the operating lever 41 receives an instruction to perform the fortieth function when the tenth operating switch 42J is operated. That is, in the first standard table, an operation signal output by the operating lever 41 when the tenth operating switch 42J is operated and the fortieth function are associated. Therefore, in the first mode, when the tenth operating switch 42J is operated, the controller 80 changes the action speed of the front loader 35. In the present example embodiment, the controller 80 selects the action speed of the front loader 35 from a plurality of action speeds (levels) from a low action speed to a high action speed in response to the operation of the tenth operating switch 42J.

In the first mode, the operating lever 41 receives an instruction to perform the fifteenth function when the eleventh operating switch 42K is operated. That is, in the first standard table, an operation signal output by the operating lever 41 when the eleventh operating switch 42K is operated and the fifteenth function are associated. Therefore, in the first mode, when the eleventh operating switch 42K is operated, the controller 80 switches the rotation direction of power output from the auxiliary transmission unit 20*c* to forward rotation by controlling the shuttle 20*d*.

In the first mode, the operating lever 41 receives an instruction to perform the sixteenth function when the twelfth operating switch 42L is operated. That is, in the first standard table, an operation signal output by the operating lever 41 when the twelfth operating switch 42L is operated and the sixteenth function are associated. Therefore, in the first mode, when the twelfth operating switch 42L is operated, the controller 80 switches the rotation direction of power output from the auxiliary transmission unit 20*c* to rearward rotation by controlling the shuttle 20*d*.

In the first mode, the operating lever 41 receives an instruction to perform the fourth function or the fifth function when the thirteenth operating switch 42M is operated. That is, in the first standard table, an operation signal output by the operating lever 41 when the thirteenth operating switch 42M is rotated in one direction and the fourth function are associated, and an operation signal output by the operating lever 41 when the thirteenth operating switch 42M is rotated in the opposite direction and the fifth function are associated. Therefore, in the first mode, when the thirteenth operating switch 42M is rotated in one direction, the controller 80 increases the speed stage of the transmission 20 by controlling the shifter of the main transmission unit 20*b* and/or the shifter of the auxiliary transmission unit 20*c*. Furthermore, in the first mode, when the thirteenth operating switch 42M is rotated in the opposite direction, the controller 80 lowers the speed stage of the transmission 20 by controlling the shifter of the main transmission unit 20*b* and/or the shifter of the auxiliary transmission unit 20*c*.

Thus, the number of work functions to be performed in accordance with an instruction that is received by the operating lever 41 in the first mode by the pivoting of the operating lever 41 or the operations of the plurality of operating switches 42 is larger than the number of traveling functions to be performed in accordance with an instruction that is received by the operating lever 41 in the first mode by the pivoting of the operating lever 41 or the operation of the plurality of operating switches 42. That is, the operating lever 41 in the first mode receives instructions to operate work functions preferentially over traveling functions.

The second mode is a mode in which at least traveling function(s) relating to travel among the functions of the working vehicle 1 is/are performed. In the second mode, the operating lever 41 receives an instruction to perform a traveling function by being pivoted. In the second standard table, each operation signal which the operating lever 41 outputs when pivoted and a corresponding traveling function are associated. In other words, in the second mode, the operating lever 41 does not receive an instruction to perform a work function even when pivoted.

Specifically, in the second mode, the operating lever 41 receives an instruction to perform the fourth function when pivoted forward. That is, in the second standard table, an operation signal which the operating lever 41 outputs when pivoted forward and the fourth function are associated. Therefore, in the second mode, when the operating lever 41 is pivoted forward, the controller 80 increases the speed stage of the transmission 20 by controlling the shifter of the main transmission unit 20*b* and/or the shifter of the auxiliary transmission unit 20*c*.

In the second mode, the operating lever 41 receives an instruction to perform the fifth function when pivoted rearward. That is, in the second standard table, an operation signal which the operating lever 41 outputs when pivoted rearward and the fifth function are associated. Therefore, in the second mode, when the operating lever 41 is pivoted rearward, the controller 80 lowers the speed stage of the transmission 20 by controlling the shifter of the main transmission unit 20*b* and/or the shifter of the auxiliary transmission unit 20*c*.

Note that as illustrated in FIG. 2 and other drawings, in a case where a control switch 52 is provided on the operating lever 41, in a state where the control switch 52 is not being operated, the operating lever 41 receives an instruction to increase the speed stage of the main transmission unit 20*b* when the operating lever 41 is pivoted forward and receives an instruction to lower the speed stage of the main transmission unit 20*b* when the operating lever 41 is pivoted rearward. On the other hand, in a state where the control switch 52 is being operated, the operating lever 41 receives an instruction to increase the speed stage of the auxiliary transmission unit 20*c* when the operating lever 41 is pivoted forward and receives an instruction to lower the speed stage of the auxiliary transmission unit 20*c* when the operating lever 41 is pivoted rearward.

In the second mode, the operating lever 41 receives an instruction to perform the first function when pivoted rightward. That is, in the second standard table, an operation signal which the operating lever 41 outputs when swung rightward and the first function are associated. Therefore, in the second mode, when the operating lever 41 is pivoted rightward, the controller 80 enables or disables the first function in accordance with the pivoting operation, and in a case where the first function is enabled, the controller 80 changes the speed stage of the transmission 20 by controlling the shifter of the main transmission unit 20*b* and/or the shifter of the auxiliary transmission unit 20*c* based on the vehicle speed detected by the vehicle speed sensor 70*h* and a control map defined in advance.

In the second mode, the operating lever 41 receives an instruction to perform the fifteenth function or the sixteenth function when pivoted leftward. That is, in the second standard table, an operation signal which the operating lever 41 outputs when pivoted leftward and the fifteenth function or the sixteenth function are associated. Therefore, in the second mode, when the operating lever 41 is pivoted leftward, the controller 80 switches between the fifteenth function and the sixteenth function and switches the rotation direction of power output from the auxiliary transmission unit 20*c* between forward traveling and rearward traveling every time the operating lever 41 is pivoted.

Furthermore, in the second mode, the operating lever 41 receives instructions to operate functions including traveling function(s) upon operation of the plurality of operating switches 42. That is, in the second standard table, at least one traveling function is associated with operation signal(s) output by the operating lever 41 when operating switch(s) 42 is/are operated.

Note that in the present example embodiment, in a case that operating switches 42 other than the fifth operating switch 42E and the tenth operating switch 42J are operated in the second mode, the operating lever 41 receives instructions to operate the same functions as those of the instructions received in a case that the same operating switches 42 are operated in the first mode. In other words, the functions allocated to the operations of the operating switches 42 other than the fifth operating switch 42E and the tenth operating switch 42J are the same between the first mode and the second mode.

Therefore, in the following description, instructions to perform functions received by the operating lever 41 in a case where the operating switches 42 other than the fifth operating switch 42E and the tenth operating switch 42J are operated in the second mode are not described here.

In the second mode, the operating lever 41 receives an instruction to perform the second function when the fifth operating switch 42E is operated. That is, in the second standard table, an operation signal output by the operating lever 41 when the fifth operating switch 42E is operated and the second function are associated. Therefore, in the second mode, when the fifth operating switch 42E is operated, the controller 80 switches modes of the second function and changes a to-be-controlled object or the like of the first function in response to the operation.

In the second mode, the operating lever 41 receives an instruction to perform the fourteenth function when the tenth operating switch 42J is operated. That is, in the second standard table, an operation signal output by the operating lever 41 when the tenth operating switch 42J is operated and the fourteenth function are associated. Therefore, in the second mode, when the tenth operating switch 42J is operated, the controller 80 switches the shuttle 20*d* to a neutral position by controlling the shuttle 20*d* to shut off power transmission in response to the operation.

Thus, the number of traveling functions to be performed in accordance with an instruction that is received by the operating lever 41 in the second mode by the pivoting of the operating lever 41 or the operation of the plurality of operating switches 42 is larger than the number of work functions to be performed in accordance with an instruction that is received by the operating lever 41 in the second mode by the pivoting of the operating lever 41 or the operation of the plurality of operating switches 42. That is, the operating lever 41 in the second mode receives instructions to operate traveling functions preferentially over work functions.

The third mode is a mode in which traveling function(s) and work function(s) are performed. In the third mode, the operating lever 41 receives an instruction to perform a traveling function by being pivoted. In other words, in the third mode, the operating lever 41 does not receive an instruction to perform a work function even when pivoted.

Specifically, in a case where the operating lever 41 is pivoted in a predetermined direction in the third mode, the operating lever 41 receives an instruction to perform a function identical to an instruction to perform a function received in a case where the operating lever 41 is pivoted in the identical direction in the second mode. In other words, the functions allocated to the pivoting operations are the same between the second mode and the third mode.

Therefore, in the third mode, the operating lever 41 receives an instruction to perform the fourth function when the operating lever 41 is pivoted forward and receives an instruction to perform the fifth function when the operating lever 41 is pivoted rearward. Furthermore, in the third mode, the operating lever 41 receives an instruction to perform the first function when the operating lever 41 is pivoted rightward and alternately receives an instruction to perform the fifteenth function and an instruction to perform the sixteenth function every time the operating lever 41 is pivoted leftward.

Furthermore, in the third mode, the operating lever 41 receives instructions to operate a plurality of functions including traveling function(s) upon operation of the plurality of operating switches 42. That is, in the third standard table, at least one traveling function or work function and operation signal(s) output by the operating lever 41 when the operating switch(es) 42 is/are operated are associated.

Functions of the working vehicle 1 to be performed in accordance with an instruction received by the operating lever 41 upon operation of the operating switches 42 in the third mode are different from functions of the working vehicle 1 to be performed in accordance with an instruction received by the operating lever 41 upon operation of the operating switches 42 in the second mode. Therefore, even when the switching between the second mode and the third mode is performed, it is possible to continuously perform control relating to travel by pivoting the operating lever 41. On the other hand, the switching between the second mode and the third mode makes it possible to operate different functions using the same operating switch 42.

In the present example embodiment, in a case where operating switches 42 other than the fifth operating switch 42E and the tenth operating switch 42J are operated in the third mode, the operating lever 41 receives instructions to perform functions identical to instructions to perform functions received in a case where the identical operating switches 42 are operated in the first mode and the second mode. In other words, the functions allocated to the operations of the operating switches 42 other than the fifth operating switch 42E and the tenth operating switch 42J are the same between the first and second modes and the third mode.

Therefore, in the following description, instructions to perform functions received by the operating lever 41 in a case where the operating switches 42 other than the fifth operating switch 42E and the tenth operating switch 42J are operated in the third mode are not described here.

Specifically, in the third mode, the operating lever 41 receives an instruction to perform the forty-second function when the fifth operating switch 42E is operated. That is, in the third standard table, an operation signal output by the operating lever 41 when the fifth operating switch 42E is operated and the forty-second function are associated. Therefore, in the third mode, when the fifth operating switch 42E is operated, the controller 80 controls the working vehicle 1 to perform a series of actions defined in advance in response to the operation. In particular, in the present example embodiment, in the third mode, when the fifth operating switch 42E is operated, the controller 80 performs the entering action in response to the operation.

In the third mode, the operating lever 41 receives an instruction to perform the forty-third function when the tenth operating switch 42J is operated. That is, in the third standard table, an operation signal output by the operating lever 41 when the tenth operating switch 42J is operated and the forty-third function are associated. Therefore, in the third mode, when the tenth operating switch 42J is operated, the controller 80 enables or disables the forty-third function in response to the operation, and in a case where the forty-third function is enabled, the controller 80 controls the working vehicle 1 based on an instruction signal output from the working device 10.

Thus, the number of traveling functions to be performed in accordance with an instruction that is received by the operating lever 41 in the third mode by the pivoting of the operating lever 41 or the operation of the plurality of operating switches 42 is larger than the number of work functions to be performed in accordance with an instruction that is received by the operating lever 41 in the third mode by the pivoting of the operating lever 41 or the operation of the plurality of operating switches 42. That is, the operating lever 41 in the third mode receives instructions to operate traveling functions preferentially over work functions.

The fourth mode is a mode in which instructions to cause the working vehicle 1 to perform various functions are not received by the pivoting of the operating lever 41 and instructions to cause the working vehicle to perform various functions 1 are received by the operation of the operating switches 42. That is, in a case where the operating lever 41 is pivoted in the fourth mode, the operating lever 41 does not receive instructions irrespective of operation direction and operation amount thereof. That is, in the fourth standard table, no functions are associated with the pivoting operations of the operating lever 41.

Accordingly, in a case where the operating lever 41 is in the fourth mode, the controller 80 does not control (perform) a function based on an operation signal output from the operating lever 41. Therefore, it is possible to eliminate or reduce the likelihood that the working vehicle 1 will unintentionally perform traveling and/or work, for example, even if the operator accidentally makes contact with the operating lever 41 and pivots the operating lever 41 when leaving the operator's seat 4 or sitting down on the operator's seat 4.

Note that in a case where the operating lever 41 itself changes the operation mode, the operating lever 41 in the fourth mode may be configured not to output an operation signal to the controller 80 when pivoted.

Furthermore, in a case where the operating switches 42 are operated in the fourth mode, the operating lever 41 receives instructions to perform functions identical to instructions to perform functions received in a case where the identical operating switches 42 are operated in the first mode. In other words, the functions allocated to the operations of the operating switches 42 are the same between the first mode and the fourth mode.

As described above, the operating lever 41 makes it possible to operate work function(s) and traveling function (s) successively using a single operating lever 41 without having to change operating levers 41, by performing switching between the first to fourth modes.

Note that associations between pivoting operations of the operating lever 41 and functions and associations between operations of the operating switches 42 and functions in the above operation modes (the first to fourth modes) are examples, and are not limited to the above associations. For example, in a case where the transmission 20 is a continuously variable transmission, the operating lever 41 may receive an instruction to perform a cruise control when the fourth operating switch 42D is operated.

Furthermore, new mode(s) may be added to the above first to fourth modes. In such a case, the operator registers the new mode(s) by operating the display 90 (the second display 90B).

When an operation mode of the operating lever 41 is selected via the selector 51, the controller 80 notifies the operator of the selected operation mode. As illustrated in FIGS. 2 and 7, the operating device 40 includes an indicator 43. The indicator 43 is provided on the operating lever 41. The indicator 43 changes the manner in which the indicator 43 provides an indication depending on the operation mode selected by the operation of the selector 51. In this way, the indicator 43 can notify the operator of the operation mode.

The indicator 43 is a lamp that changes a color of emitted light depending on the operation mode. The lamp is a light emitting device that emits light. The lamp includes one or more light sources (e.g., LEDs). In the present example embodiment, the indicator 43 is a bar-shaped lamp located at an end portion of the operating portion 41*b*2. The indicator 43 is located in an upper portion of the operating portion 41*b*2 to extend in or substantially in the vehicle body width direction.

The indicator 43 is communicably connected to the controller 80 and can be turned on and off or can be lit in different colors based on a control signal output from the controller 80. The indicator 43 can emit, for example, light of blue, orange, green, and red of the Ostwald color system based on a control signal output from the controller 80. Note that any color mentioned in the following description is described as a color defined in the Ostwald color system. Alternatively, the indicator 43 can blink in different colors based on a control signal output from the controller 80.

When the first mode is selected via the selector 51, the controller 80 changes the color of light emitted by the indicator 43 to blue by outputting a control signal to the indicator 43. When the second mode is selected, the controller 80 changes the color of light emitted by the indicator 43 to orange by outputting a control signal to the indicator 43. When the third mode is selected by the selector 51, the controller 80 changes the color of light emitted by the indicator 43 to green by outputting a control signal to the indicator 43. When the fourth mode is selected by the selector 51, the controller 80 changes the color of light emitted by the indicator 43 to red by outputting a control signal to the indicator 43. In this way, the operator can easily know the current operation mode selected by the operation of the selector 51.

Note that the combinations of the operation modes and colors of light generated by the indicator 43 are examples and are not limited to the above combinations. Although the indicator 43 is a lamp that changes a color of emitted light depending on the operation mode in the above example embodiment, the indicator 43 need only change the manner in which the indicator 43 provides an indication depending on the operation mode selected by the operation of the selector 51 and, may change the manner in which the indicator 43 provides an indication by changing the number of light sources that are turned on and the number of light sources that are turned off.

Furthermore, although the indicator 43 is located at an end portion of the operating portion 41*b*2 in the above example embodiment, the indicator 43 need only be provided in a vicinity of the operator's seat 4 (at a position where the indicator 43 can be viewed by the operator sitting on the operator's seat 4), and the position thereof is not limited to the operating lever 41. For example, the indicator 43 may be provided in the first region 16*a* of the armrest 16 or may be provided in the meter panel 15 or the like instead of the armrest 16.

When an operation mode of the operating lever 41 is selected via the selector 51, the controller 80 may control (perform) a predetermined function among the plurality of functions concerning the working vehicle 1 or may enable or disable a function. When the first mode or the fourth mode is selected via the selector 51, the controller 80 may optimize a control map of the transmission 20, for example, by performing the second function.

When the second mode is selected via the selector 51, the controller 80 optimizes the control map of the transmission 20, for example, by performing the second function, performs the thirty-first function and the forty-first function, and/or disables the thirteenth function and the nineteenth function. When the third mode is selected via the selector 51, the controller 80 may disable the receipt of instructions to operate functions such as the thirteenth function, the nineteenth function, the twenty-fifth function, the twenty-sixth function, the twenty-ninth function, the thirtieth function, and/or the thirty-fourth to thirty-seventh functions.

When the third mode is selected via the selector 51, the controller 80 may optimize the control map of the transmission 20, for example, by performing the second function or may enable functions such as the thirteenth function and/or the nineteenth function.

In this way, operability of the working vehicle 1 itself can be improved in accordance with change of the operation mode of the operating lever 41.

Figure 12A:
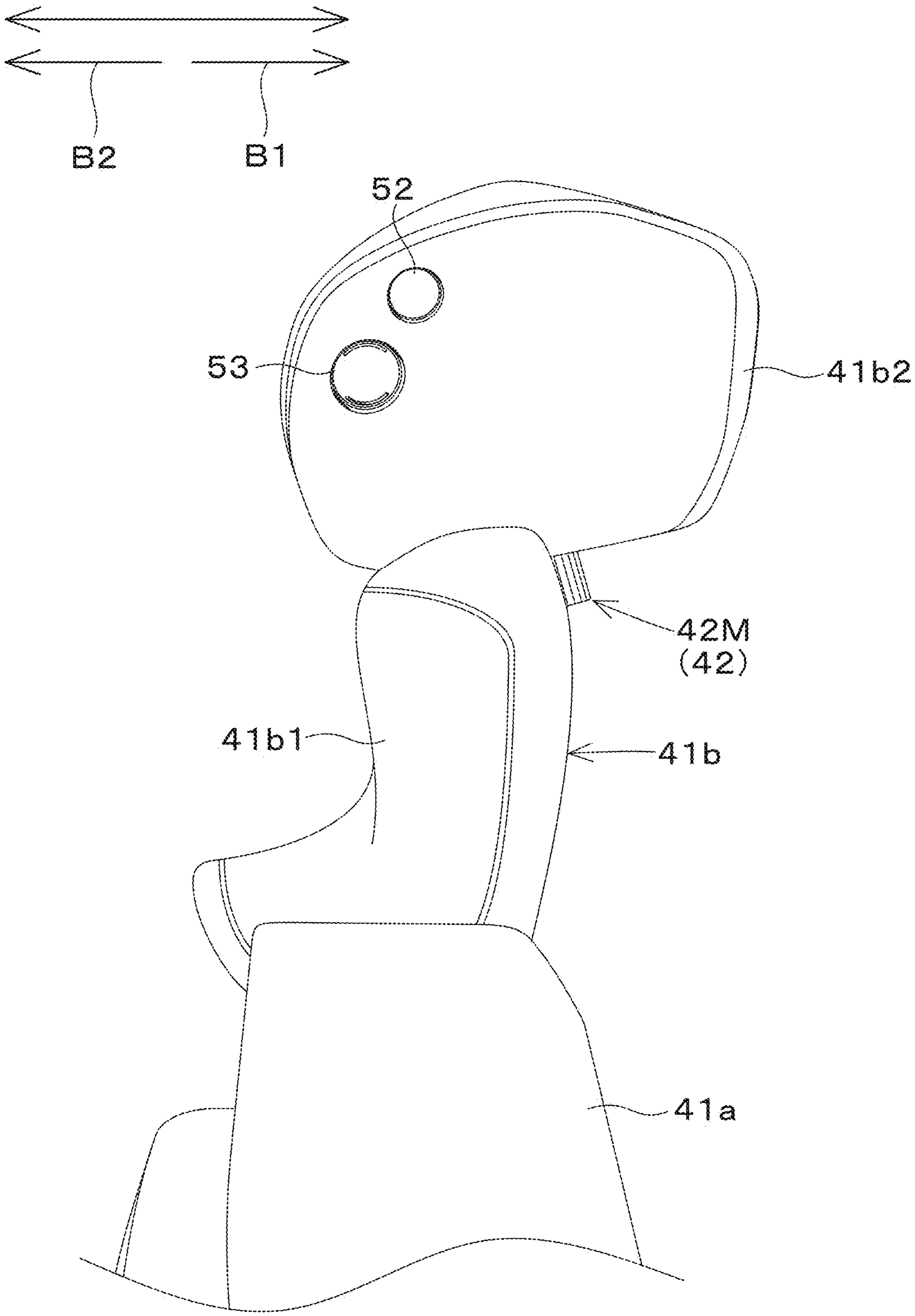
FIG. 12A is a perspective view of the grip of the operating lever and its surroundings as viewed from an upper right front side.

As illustrated in FIG. 2, the operating device 40 includes an operable changeover switch 53. The changeover switch 53 is, for example, a push-button switch (tactile switch) that is operated by being pressed. FIG. 12A is a perspective view of the grip 41*b* of the operating lever 41 and its surroundings as viewed from an upper right front side. As illustrated in FIGS. 7 and 12A, the changeover switch 53 is provided on a surface of the grip 41*b* that is different from a surface on which the operating switches 42 are provided, for example, on a surface opposite the surface on which the plurality of operating switches 42 are provided.

Figure 12B:
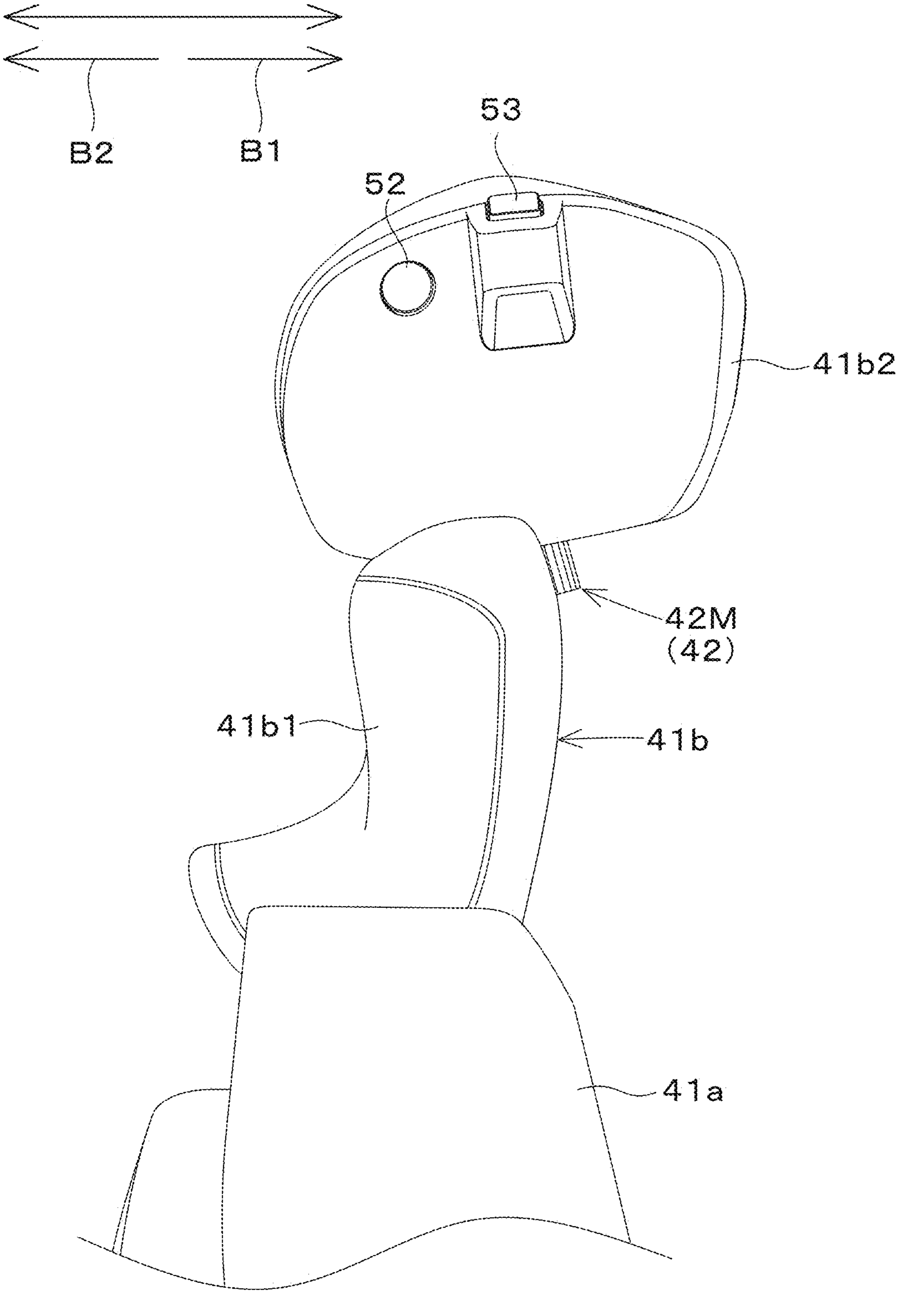
FIG. 12B is a perspective view of a grip of an operating lever and its surroundings according to a variation as viewed from an upper right front side.

In the present example embodiment, the changeover switch 53 is provided on a rear surface of the operating portion 41*b*2 of the grip 41*b*. Accordingly, the operator gripping the gripping portion 41*b*1 operates the changeover switch 53 with a stretched index finger, middle finger, or the like. Therefore, the operator is less likely to mistake the changeover switch 53 for the operating switch 42. Note that the changeover switch 53 need only be located on a surface of the grip 41*b* that is different from the surface on which the operating switches 42 are located, and the changeover switch 53 may be located on a side surface instead of the rear surface opposite the surface where the plurality of operating switches 42 are located. In such a case, the changeover switch 53 is preferably located on an upper surface (side surface) of the grip 41*b*, as illustrated in FIG. 12B.

Assume that functions to be performed in accordance with an instruction that is received by the operating lever 41 by the operation of the operating switch 42, based on the standard tables (the first to fourth standard tables) corresponding to the operation modes (the first to fourth modes), are each referred to as a "standard function". The operating lever 41 can receive instruction(s) to operate function(s) (expanded function(s)) of the working vehicle 1 different from the standard functions upon operation of the operating switch(s) 42 instead of the standard function(s), in accordance with the operation of the changeover switch 53.

That is, the operating lever 41 receives an instruction to perform a predetermined standard function among the functions by the operation of the operating switch 42 and, after the operation of the changeover switch 53, receives an instruction to perform an expanded (additional) function of the working vehicle 1 different from the standard function by the operation of the operating switch 42 instead of the standard function. In this way, a single operating switch 42 can receive instructions to operate a plurality of functions in accordance with the operation of the changeover switch 53. This makes it unnecessary to provide as many operating switches 42 as the number of functions of the working vehicle 1 on the operating lever 41. This can make operations of the operating switches 42 less complicated, thus further improving operability of the operating lever 41.

Specifically, the operating lever 41 receives an instruction to perform a standard function by the operation of the operating switch 42 during a period where the changeover switch 53 is not being operated, and receives an instruction to perform an expanded function by the operation of the operating switch 42 during a period in which the changeover switch 53 is being operated. Since the operating switch 42 receives an instruction to perform an expanded function only in a period where the changeover switch 53 is being operated, the operator is less likely to mistakenly operate an expanded function.

Note that in a case where the changeover switch 53 is being operated, the indicator 43 indicates that the changeover switch 53 is being operated. In the present example embodiment, the indicator (lamp) 43 indicates that the changeover switch 53 is being operated, by blinking during a period where the changeover switch 53 is being operated and indicates that the changeover switch 53 is not operated by being lighted up during a period where the changeover switch 53 is not being operated. This allows the operator to easily know whether a current function to be performed in accordance with an instruction received by the operating switch 42 is a standard function or an expanded function. This can eliminate or reduce the likelihood that a standard function or an expanded function will be unintentionally operated, for example, in a case where the operator mistakenly operates the changeover switch 53.

As illustrated in FIGS. 2 and 7, the operating switches 42 may include a light 42*b* provided on the operation surface 42*a*. The light 42*b* is provided on the operation surface 42*a* of each of the operating switches 42 that are tactile switches (in the present example embodiment, the first operating switch 42A, the second operating switch 42B, the third operating switch 42C, the fourth operating switch 42D, the fifth operating switch 42E, the sixth operating switch 42F, the seventh operating switch 42G, the tenth operating switch 42J, the eleventh operating switch 42K, and the twelfth operating switch 42L) among the operating switches 42. The light 42*b* changes the manner in which the light 42*b* provides an indication depending on whether or not the changeover switch 53 is being operated. This allows the operator to easily know whether a current function to be performed in accordance with an instruction received by the operating switch 42 is a standard function or an expanded function by checking the light 42*b*. This can eliminate or reduce the likelihood that a standard function or an expanded function will be unintentionally operated, for example, in a case where the operator mistakenly operates the changeover switch 53.

Specifically, the light 42*b* includes a first light 42*b*1 and a second light 42*b*2. The first light 42*b*1 and the second light 42*b*2 are light emitting devices that emit light. The first light 42*b*1 and the second light 42*b*2 each include one or more light sources (LEDs). The first light 42*b*1 is provided in one of opposite portions of the operation surface 42*a* (a left portion of the operation surface 42*a*) and indicates a standard function. The first light 42*b*1 is turned on in a case where the changeover switch 53 is not being operated and is turned off in a case where the changeover switch 53 is being operated.

The second light 42*b*2 is provided in the other of the opposite portions of the operation surface 42*a* (a right portion of the operation surface 42*a*) and indicates an expanded function. The second light 42*b*2 is positioned apart from the first light 42*b*1 in the left-right direction of the operation surface 42*a*. The second light 42*b*2 is turned off in a case where the changeover switch 53 is not being operated and is turned on in a case where the changeover switch 53 is being operated. That is, in a case where the changeover switch 53 is not being operated, the first light 42*b*1 is on and the second light 42*b*2 is off, and in a case where the changeover switch 53 is being operated, the first light 42*b*1 is off and the second light 42*b*2 is on.

Therefore, in a case where a transition occurs from a state where the changeover switch 53 is not being operated to a state where the changeover switch 53 is being operated, the light source that is on in the light 42*b* changes from the first light 42*b*1 to the second light 42*b*2, and therefore the operator recognizes as if the shining portion of the first light 42*b*1 and the second light 42*b*2 moved from the one of the opposite portions (left portion) to the other of the opposite portions (right portion) of the operation surface 42*a*.

Furthermore, in a case where a transition occurs from a state where the changeover switch 53 is being operated to a state where the changeover switch 53 is not being operated, the light source that is on changes from the second light 42*b*2 to the first light 42*b*1, and therefore the operator recognizes as if the shining portion of the first light 42*b*1 and the second light 42*b*2 moved from the other of the opposite portions (right portion) to the one of the opposite portions (left portion) of the operation surface 42*a*.

As illustrated in FIG. 7, the first light 42*b*1 and the second light 42*b*2 extend along the inner periphery of the operation surface 42*a* and define a portion or an entirety of the contour of the inner periphery of the operation surface 42*a*. The first light 42*b*1 extends leftward from the central portion in the left-right direction of an upper edge of the operation surface 42*a*, extends downward along the left edge of the operation surface 42*a*, and then extends to the central portion in the left-right direction of the lower edge of the operation surface 42*a*. That is, the first light 42*b*1 has a substantially C shape.

The second light 42*b*2 extends rightward from the central portion in the left-right direction of the upper edge of the operation surface 42*a*, extends downward along the right edge of the operation surface 42*a*, and then extends to the central portion in the left-right direction of the lower edge of the operation surface 42*a*. That is, the second light 42*b*2 has a substantially inverse C shape.

The first light 42*b*1 and the second light 42*b*2 are, for example, lit in white. Note that the first light 42*b*1 and the second light 42*b*2 may be lit in a color other than white. For example, the first light 42*b*1 and the second light 42*b*2 may be lit in a color such as orange, yellow, blue, purple, or green in addition to or instead of white.

Note that an icon (standard icon) 42*al* that is a simple graphical representation of a function (standard function) defined in a predetermined standard table of those corresponding to the first to fourth modes may be provided on each of the operation surfaces 42*a* of the operating switches 42 that are tactile switches, as illustrated in FIG. 7. In the present example embodiment, the standard icon 42*al* corresponding to at least the third mode is provided on each of the operation surfaces 42*a* of the operating switches 42.

Furthermore, an icon (expanded icon) 42*a*2 that is a simple graphical representation of an expanded function in the third mode may be provided on the operation surface(s) 42*a* of the operating switch(es) 42 such as the third operating switch 42C and/or the fifth operating switch 42E in addition to the standard icon 42*a*1. In such a case, it is preferable that the standard icon 42*al* be provided in the one of the opposite portions of the operation surface 42*a* and the expanded icon 42*a*2 be provided in the other of the opposite portions of the operation surface 42*a*. Furthermore, it is preferable that the standard icon 42*al* be surrounded by the first light 42*b*1 and the expanded icon 42*a*2 be surrounded by the second light 42*b*2.

Although a case where the light 42*b* is provided on each of the operating switches 42 that are tactile switches has been described as an example in the above example embodiment, the light 42*b* may be provided on one or more of the operating switches 42 (the eighth operating switch 42H, the ninth operating switch 42I, and the twelfth operating switch 42L) that are not tactile switches.

The storing unit 81 stores therein a plurality of expansion tables (first to fourth expansion tables) corresponding to the operation modes in each of which an operation signal and a corresponding function (expanded function) are associated. In each of the expansion tables, an expanded function is allocated to an operation of at least one operating switch 42. In other words, the expansion table may include an operation of the operating switch 42 to which no expanded function is allocated.

In the present example embodiment, an expanded function is mainly allocated to operations of the third operating switch 42C, the fifth operating switch 42E, the eighth operating switch 42H, the ninth operating switch 42I, and the tenth operating switch 42J in the expansion table.

The controller 80 acquires a standard table corresponding to the operation mode of the operating lever 41 from the storing unit 81 during a period where the changeover switch 53 is not being operated and acquires an expansion table corresponding to the operation mode of the operating lever 41 from the storing unit 81 during a period where the changeover switch 53 is being operated.

That is, the operating lever 41 receives an instruction to perform an expanded function instead of a standard function in a case where the third operating switch 42C, the fifth operating switch 42E, the eighth operating switch 42H, the ninth operating switch 42I, or the tenth operating switch 42J is operated during a period in which the changeover switch 53 is being operated.

Note that the operating lever 41 does not receive an instruction to perform an expanded function in a case where the operating switch 42 to which no expanded function is allocated is operated (e.g., in a case where the first operating switch 42A, the second operating switch 42B, the fourth operating switch 42D, the sixth operating switch 42F, the seventh operating switch 42G, the eleventh operating switch 42K, the twelfth operating switch 42L, or the thirteenth operating switch 42M is operated) during a period where the changeover switch 53 is being operated. Accordingly, the controller 80 does not control (perform) a function even if an operating switch 42 to which no expanded function is allocated is operated during a period where the changeover switch 53 is being operated.

The following describes a case where the changeover switch 53 is being operated and the operating lever 41 receives an instruction to perform an expanded function upon operation of an operating switch 42.

In a case where the operating lever 41 is in any one of the first to fourth modes, the controller 80 acquires an expansion table corresponding to the operation mode and controls (performs) a function corresponding to an operation signal output from the operating lever 41 during a period where the changeover switch 53 is being operated. Specifically, the operating lever 41 in any one of the first to fourth modes receives an instruction to perform the eleventh function as an expanded function instead of the ninth function (standard function) when the third operating switch 42C is operated during a period where the changeover switch 53 is being operated. That is, in the first to fourth expansion tables, an operation signal output by the operating lever 41 when the third operating switch 42C is operated and the eleventh function are associated. Therefore, when the third operating switch 42C is operated during a period where the changeover switch 53 is being operated in any one of the first to fourth modes, the controller 80 enables or disables the eleventh function in response to the operation, and in a case where the eleventh function is enabled, the controller 80 controls the rotational speed of the prime mover 6 to the second prime mover rotational speed irrespective of an operation of the accelerator pedal.

The operating lever 41 in any one of the first to fourth modes receives an instruction to perform the thirty-second function or the thirty-third function of the third auxiliary valve 32*c* as an expanded function instead of the thirty-second function or the thirty-third function (standard function) of the first auxiliary valve 32*a* when the eighth operating switch 42H is operated during a period where the changeover switch 53 is being operated. That is, in the first to fourth expansion tables, an operation signal output by the operating lever 41 when the eighth operating switch 42H is slid in one direction and the thirty-second function of the third auxiliary valve 32*c* are associated, and an operation signal output by the operating lever 41 when the eighth operating switch 42H is slid in the opposite direction and the thirty-third function of the third auxiliary valve 32*c* are associated.

The operating lever 41 in any one of the first to fourth modes receives an instruction to perform the thirty-second function or the thirty-third function of the fourth auxiliary valve 32*d* as an expanded function instead of the thirty-second function or the thirty-third function (standard function) of the second auxiliary valve 32*b* when the ninth operating switch 42I is operated during a period where the changeover switch 53 is being operated. That is, in the first to fourth expansion tables, an operation signal output by the operating lever 41 when the ninth operating switch 42I is slid in one direction and the thirty-second function of the fourth auxiliary valve 32*d* are associated, and an operation signal output by the operating lever 41 when the ninth operating switch 42I is slid in the opposite direction and the thirty-third function of the fourth auxiliary valve 32*d* are associated.

The operating lever 41 in the first mode or the fourth mode receives an instruction to perform the thirty-ninth function as an expanded function instead of the forty-first function (standard function) when the fifth operating switch 42E is operated during a period where the changeover switch 53 is being operated. That is, in the first expansion table and the fourth expansion table, an operation signal output by the operating lever 41 when the fifth operating switch 42E is operated and the thirty-ninth function are associated. Therefore, in the first mode and the fourth mode, when the fifth operating switch 42E is operated during a period where the changeover switch 53 is being operated, the controller 80 calculates the mass of an object carried by the bucket 35*c* in response to the operation.

The operating lever 41 in the first mode or the fourth mode receives an instruction to perform the thirty-eighth function as an expanded function instead of the fortieth function (standard function) when the tenth operating switch 42J is operated during a period where the changeover switch 53 is being operated. That is, in the first expansion table and the fourth expansion table, an operation signal output by the operating lever 41 when the tenth operating switch 42J is operated and the thirty-eighth function are associated. Therefore, in the first mode and the fourth mode, when the tenth operating switch 42J is operated during a period where the changeover switch 53 is being operated, the controller 80 gets rid of the carried object from the bucket 35*c* by shaking the bucket 35*c*.

The operating lever 41 in the third mode receives an instruction to perform the forty-second function to perform the exiting action as an expanded function instead of the forty-second function (standard function) to perform the entering action when the fifth operating switch 42E is operated during a period where the changeover switch 53 is being operated. That is, in the third expansion table, an operation signal output by the operating lever 41 when the fifth operating switch 42E is operated and the forty-second function of executing the exiting action are associated. Therefore, in the third mode, when the fifth operating switch 42E is operated during a period where the changeover switch 53 is being operated, the controller 80 performs the exiting action in response to the operation.

Note that the combinations of operations of the operating switch 42 and instructions to operate an expanded function in each of the operation modes are merely examples and may be other combinations. For example, the operating lever 41 in the third mode may receive an instruction to enable or disable automatic steering as an expanded function instead of the forty-third function (standard function) when the fifth operating switch 42E is operated during a period where the changeover switch 53 is being operated.

Accordingly, the number of expanded work functions to be performed in accordance with an instruction that is received by the operating lever 41 in the first to fourth modes upon operation of the plurality of operating switches 42 is larger than the number of expanded traveling functions to be performed in accordance with an instruction that is received by the operating lever 41 in the first to fourth modes upon the operation of the plurality of operating switches 42. That is, the operating lever 41 in any one the first to fourth modes receives instructions to operate work functions preferentially over traveling functions during a period where the changeover switch 53 is being operated.

Although a case where the indicator 43 indicates that the changeover switch 53 is operated or the light 42*b* changes the manner in which it provides an indication in a case where the changeover switch 53 is being operated has been described in the above example embodiment, the display 90 (first display 90A in the present example embodiment) may display a relationship between an operation of the operating switch 42 and the content of a corresponding expanded function to be performed in accordance with an instruction that is received by the operation of the operating switch 42 in a case where the changeover switch 53 is being operated. This allows the operator to easily know the content of the expanded function and to easily know whether a function of an operation instruction currently received by the operating switch 42 is a standard function or an expanded function.

Specifically, in a case where the changeover switch 53 is being operated, the first display 90A acquires an expansion table corresponding to the operation mode from the storing unit 81 and displays an operation display screen M1.

Figure 13:
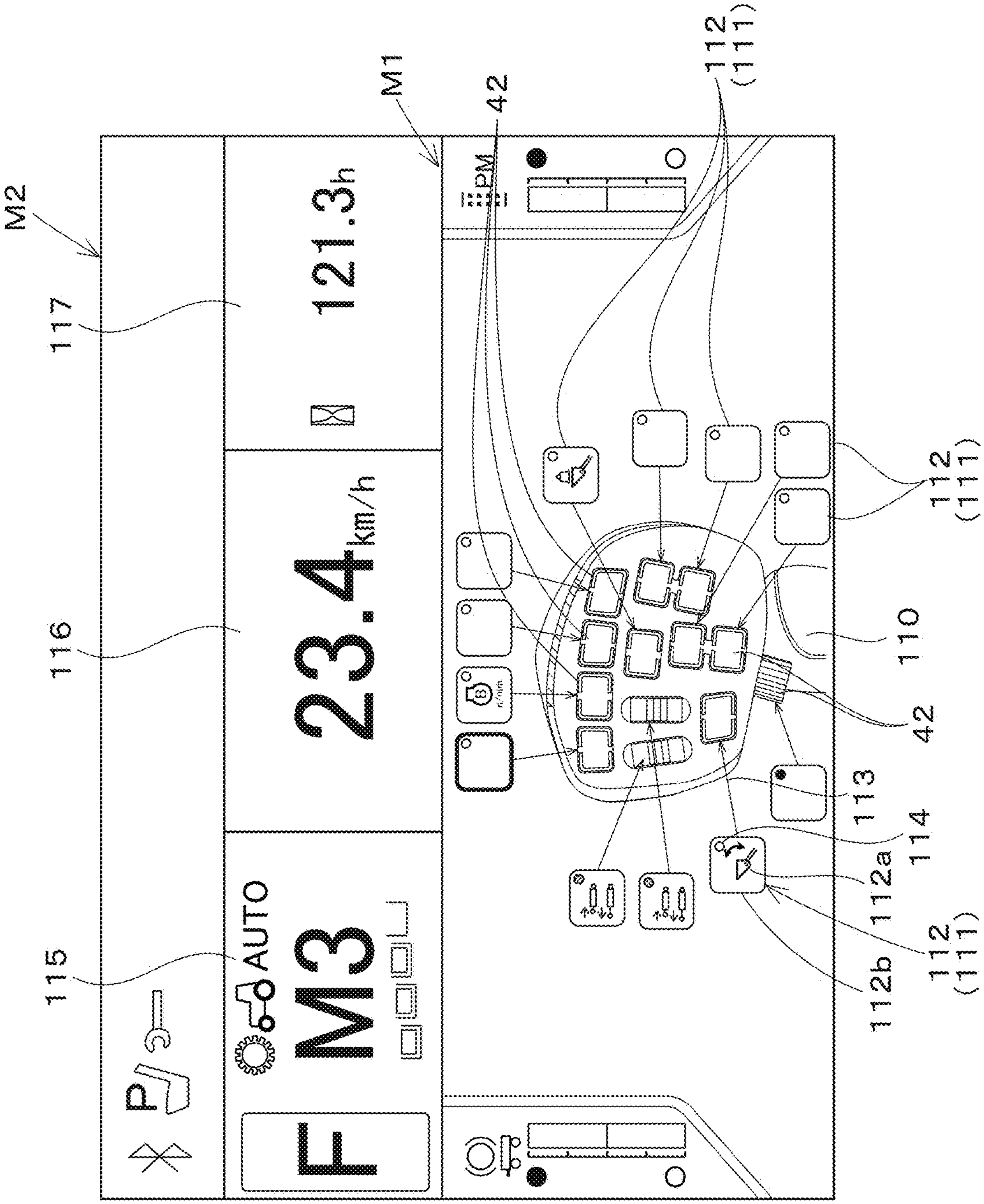
FIG. 13 illustrates an example of an operation display screen and an information display screen.

FIG. 13 illustrates an example of the operation display screen M1 and an information display screen M2. As illustrated in FIG. 13, the operation display screen M1 displays a schematic view 110 of the operating lever 41 including the operating switches 42 and first allocation display portion(s) 111. Each first allocation display portion 111 is a display image that represents a function (a standard function and/or an expanded function) allocated to the operating switch 42 as an icon that is a simple graphical representation of the function. In the example illustrated in FIG. 13, the first allocation display portion 111 includes a rectangular or substantially rectangular image (first icon display portion 112) where an icon 112*a* is displayed and a first arrow portion 113 indicating the operating switch 42 corresponding to the icon 112*a*. An outer frame (a first category display frame 112*b*) that indicates the outer shape of the first icon display portion 112 and surrounds the icon 112*a* is displayed in a color that varies depending on the category to which a function corresponding to the icon 112*a* of the first icon display portion 112 belongs.

Specifically, the first category display frame 112*b* can be displayed in a color such as orange, yellow, blue, purple, or green. The first category display frame 112*b* is displayed in orange in a case where the function corresponding to the icon 112*a* is any of the first to third categories. The first category display frame 112*b* is displayed in yellow in a case where the function corresponding to the icon 112*a* is the fourth category. The first category display frame 112*b* is displayed in blue in a case where the function corresponding to the icon 112*a* is any of the fifth to seventh categories. The first category display frame 112*b* is displayed in purple in a case where the function corresponding to the icon 112*a* is the eighth category. The first category display frame 112*b* is displayed in green in a case where the function corresponding to the icon 112*a* is the ninth category.

Although a case where the first category display frame 112*b* is displayed in a color that varies depending on the category into which the function corresponding to the icon 112*a* is classified has been described as an example, the first arrow portion 113 may also be displayed in a color that varies depending on the category additionally or alternatively.

Furthermore, the first icon display portion 112 includes a first type indicator portion 114 indicating the type of the corresponding operating switch 42, such as a tactile switch, a slide switch, or a dial switch. In the present example embodiment, the first type indicator portion 114 is a circular figure and is displayed in an upper right portion of the first icon display portion 112. The first type indicator portion 114 is displayed in green in a case where the corresponding operating switch 42 is a tactile switch, is displayed in blue in a case where the corresponding operating switch 42 is a slide switch, and is displayed in yellow in a case where the corresponding operating switch 42 is a dial switch.

Note that the icon 112*a* is not displayed in the first allocation display portion 111 of the operating switch 42 to which no expanded function is allocated.

Although the first display 90A displays the operation display screen M1 during a period where the changeover switch 53 is being operated in the above example embodiment, the operation display screen M1 may be displayed as needed when a predetermined operation is performed.

Furthermore, although the operation display screen M1 is displayed in one display region of a screen displayed by the first display 90A and a speed stage display portion 115 that displays the speed stage of the transmission 20, a vehicle speed display portion 116 that displays vehicle speed, an hour meter 117 that indicates the operating period of the working vehicle 1, and the like are displayed in another display region in the example illustrated in FIG. 13, the display form is not limited to the example illustrated in FIG. 13. Note that in the following description, a screen including the speed stage display portion 115, the vehicle speed display portion 116, and the hour meter 117 displayed in the other display region may be referred to as the information display screen M2. That is, the first display 90A displays the operation display screen M1 and the information display screen M2 together.

Figure 14:
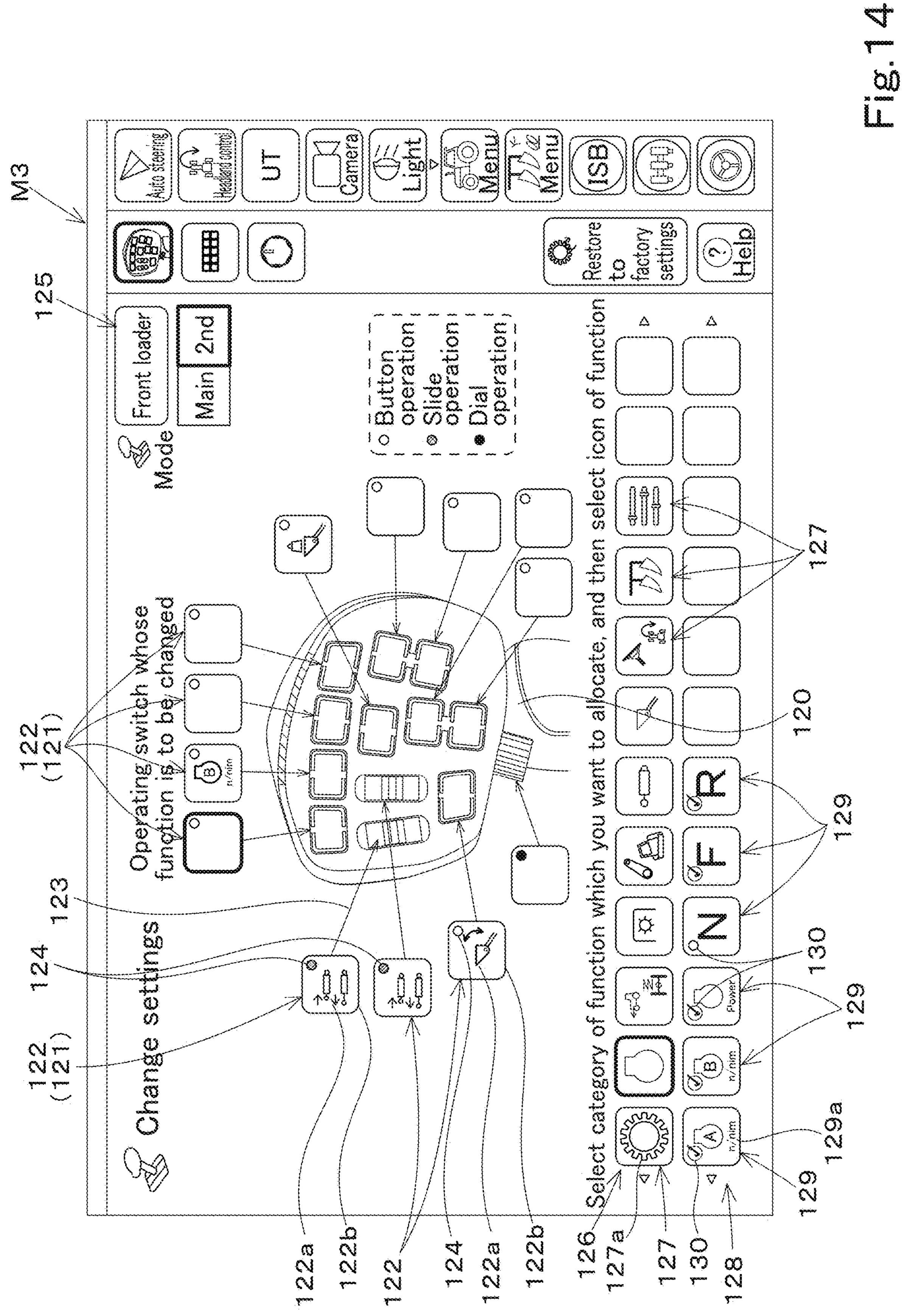
FIG. 14 illustrates an example of a first changing screen.

In the expansion table, any expanded function may be allocated to an operating switch 42 to which no expanded function has been allocated in advance. Furthermore, in the expansion table, another expanded function may be allocated to the operating switch 42 to which an expanded function has been allocated. In such a case, the display 90 (the second display 90B in the present example embodiment) displays a first changing screen M3 such as the one illustrated in FIG. 14 and receives input of allocation of an expanded function. FIG. 14 illustrates an example of the first changing screen M3.

As illustrated in FIG. 2, the controller 80 includes an updater 80*a*. The updater 80*a* includes electric/electronic circuit(s) provided in the controller 80 and/or program(s) stored in CPU(s) and/or the like. The updater 80*a* (the controller 80) updates (overwrites) an expansion table stored in the storing unit 81 based on an expanded function received on the first changing screen M3 by the second display 90B.

As illustrated in FIG. 14, the first changing screen M3 displays a schematic view 12A0 of the operating lever 41 including the operating switches 42, second allocation display portion(s) 121, a target switcher 125, a first category selector 126, and a first function selector 128. Each second allocation display portion 121 is a display image that represents a function allocated to the operating switch 42 as an icon that is a simple graphical representation of the function.

In the example illustrated in FIG. 14, the second allocation display portion 121 includes a rectangular or substantially rectangular image (second icon display portion 122) where an icon 122*a* is displayed and a second arrow portion 123 indicating the operating switch 42 corresponding to the icon 122*a*. An outer frame (a second category display frame 122*b*) that indicates the outer shape of the second icon display portion 122 and surrounds the icon 122*a* may be displayed in a color that varies depending on the category into which a function corresponding to the icon 122*a* of the second icon display portion 122 is classified, as with the first category display frame 112*b*. The second arrow portion 123 may also be displayed in a color that varies depending on the category in addition to or instead of this.

Furthermore, the second icon display portion 122 includes a second type indicator portion 124 indicating the type of the corresponding operating switch 42, such as a tactile switch, a slide switch, or a dial switch. In the present example embodiment, the second type indicator portion 124 is a circular figure and is displayed in an upper right portion of the second icon display portion 122. The second type indicator portion 124 is displayed in green in a case where the corresponding operating switch 42 is a tactile switch, is displayed in blue in a case where the corresponding operating switch 42 is a slide switch, and is displayed in yellow in a case where the corresponding operating switch 42 is a dial switch.

Note that the icon 122*a* is not displayed in the second allocation display portion 121 of the operating switch 42 to which no expanded function is allocated. The operator selects the operating switch 42 to which the operator wants to allocate a new expanded function by selecting any second icon display portion 122 (for example, by operating the fourth dial 48). In this way, the second display 90B receives selection of a predetermined operating switch 42 among the plurality of operating switches 42.

The target switcher 125 receives selection of the operation mode of an expansion table to be updated by the updater 80*a*. In the present example embodiment, the target switcher 125 receives selection of any one of the first to fourth modes. When the target switcher 125 receives selection of any one of the first to fourth modes, the second display 90B acquires an expansion table corresponding to the selected operation mode from the storing unit 81 and changes display of the second allocation display portion 121 based on the expansion table.

The first category selector 126 is a display image that receives selection of a category (any one of the first to ninth categories) into which the plurality of functions concerning the working vehicle 1 are classified. The first category selector 126 displays a plurality of rectangular or substantially rectangular images (category display portions 127) that indicate the categories as icons 127*a*. As illustrated in FIG. 14, in the present example embodiment, the first category selector 126 displays the plurality of category display portions 127 such that the plurality of category display portions 127 are arranged in the left-right direction on the screen.

The operator selects a category into which a function which the operator wants to allocate is classified by selecting any category display portion 127 (for example, by operating the fourth dial 48). In this way, the second display 90B receives selection of a predetermined category among the plurality of categories.

The first function selector 128 is a display image that receives selection of a predetermined function among a plurality of functions classified into the category selected by the first category selector 126. The first function selector 128 displays a plurality of rectangular or substantially rectangular images (third icon display portions 129) that indicate the functions as icons 129*a* that are simple graphical representation of the functions.

As illustrated in FIG. 14, in the present example embodiment, the first function selector 128 displays the plurality of third icon display portions 129 such that the plurality of third icon display portions 129 are arranged in the left-right direction on the screen. This allows the operator to select a function which the operator wants to allocate by selecting any third icon display portion 129 (for example, by operating the fourth dial 48). In this way, the second display 90B receives selection of a predetermined function among the plurality of functions as an expanded function. The updater 80*a* updates (overwrites) the expansion table stored in the storing unit 81 by allocating, as an expanded function, a function corresponding to the selected third icon display portion 129 to the operating switch 42 corresponding to selected second icon display portion 122.

Note that the third icon display portion 129 includes a third type indicator portion 130 indicating the type of an operating switch 42, such as a tactile switch, a slide switch, or a dial switch, which is to be used to operate its corresponding function. In the present example embodiment, the third type indicator portion 130 is a circular figure and is displayed in an upper right portion of the third icon display portion 129. As with the second type indicator portion 124, the third type indicator portion 130 is displayed in green in a case where the corresponding function can be operated by a tactile switch, is displayed in blue in a case where the corresponding function can be operated by a slide switch, and is displayed in yellow in a case where the corresponding function can be operated by a dial switch.

Furthermore, a check mark is added to the third type indicator portion 130 of the third icon display portion 129 indicative of a function that has been already allocated to an operation of any one of the operating switches 42, that is, a function that has been already allocated as an expanded function in the expansion table corresponding to the mode selected by the target switcher 125.

Although a case where allocation of functions (expanded functions) to operations of the operating switches 42 is changed by updating the expansion table by the updater 80*a* has been described as an example in the above example embodiment, the updater 80*a* may change allocation of functions (standard functions) to operations of the operating switches 42 by updating a standard table. Note that in a case where the controller 80 changes a standard table, the target switcher 125 receives selection as to whether an expansion table is to be updated or a standard table is to be updated.

Note that the first changing screen M3 illustrated in FIG. 14 is merely an example, and the screen and a method of allocation of an expanded function in an expansion table and allocation of a standard function in a standard table are not limited to the above example.

In a case where a standard table corresponding to the operation mode has been updated, a color in which the first light 42*b*1 is lit is changed depending on the category into which a function whose allocation has been changed is classified. Furthermore, in a case where an expansion table corresponding to the operation mode has been updated, a color in which the second light 42*b*2 is changed depending on the category into which a function whose allocation has been changed is classified.

Specifically, a color in which the first light 42*b*1 is lit is white in a case where the standard table corresponding to the operation mode has not been updated from initial settings (a state defined at a time of factory shipment). When the standard table corresponding to the operation mode is updated from the initial settings, the controller 80 changes a control signal output to the first light 42*b*1 based on the acquired standard table, and in a case where the changeover switch 53 is not being operated and the first light 42*b*1 is lit, the first light 42*b*1 is lit in a color corresponding to the category into which an updated standard function is classified.

Specifically, the controller 80 causes the first light 42*b*1 to be lit in orange in a case where a function corresponding to the operating switch 42 in which the first light 42*b*1 is provided is any one of the first to third categories in the updated standard table and the changeover switch 53 is not being operated. The controller 80 causes the first light 42*b*1 to be lit in yellow in a case where a function corresponding to the operating switch 42 in which the first light 42*b*1 is provided is the fourth category in the updated standard table and the changeover switch 53 is not being operated. The controller 80 causes the first light 42*b*1 to be lit in blue in a case where a function corresponding to the operating switch 42 in which the first light 42*b*1 is provided is any one of the fifth to seventh categories in the updated standard table and the changeover switch 53 is not being operated. The controller 80 causes the first light 42*b*1 to be lit in purple in a case where a function corresponding to the operating switch 42 in which the first light 42*b*1 is provided is the eighth category in the updated standard table and the changeover switch 53 is not being operated. The controller 80 causes the first light 42*b*1 to be lit in green in a case where a function corresponding to the operating switch 42 in which the first light 42*b*1 is provided is the ninth category in the updated standard table and the changeover switch 53 is not being operated.

In a case where the expansion table corresponding to the operation mode has not been updated from the initial settings, a color in which the second light 42*b*2 is lit is white. When the expansion table corresponding to the operation mode is updated from the initial settings, the controller 80 changes a control signal output to the second light 42*b*2 based on the acquired expansion table, and in a case where the changeover switch 53 is not being operated and the second light 42*b*2 is lit, the second light 42*b*2 is lit in a color corresponding to the category into which an updated expanded function is classified.

Specifically, the controller 80 causes the second light 42*b*2 to be lit in orange in a case where a function corresponding to the operating switch 42 in which the second light 42*b*2 is provided is any one of the first to third categories in the updated expansion table and the changeover switch 53 is being operated. The controller 80 causes the second light 42*b*2 to be lit in yellow in a case where a function corresponding to the operating switch 42 in which the second light 42*b*2 is provided is the fourth category in the updated expansion table and the changeover switch 53 is being operated. The controller 80 causes the second light 42*b*2 to be lit in blue in a case where a function corresponding to the operating switch 42 in which the second light 42*b*2 is provided is any one of the fifth to seventh categories in the updated expansion table and the changeover switch 53 is being operated. The controller 80 causes the second light 42*b*2 to be lit in purple in a case where a function corresponding to the operating switch 42 in which the second light 42*b*2 is provided is the eighth category in the updated expansion table and the changeover switch 53 is being operated. The controller 80 causes the second light 42*b*2 to be lit in green in a case where a function corresponding to the operating switch 42 in which the second light 42*b*2 is provided is the ninth category in the updated expansion table and the changeover switch 53 is being operated.

The updater 80*a* can update functions allocated to the operation actuators 49 to different functions. Specifically, as illustrated in FIG. 15, the storing unit 81 stores therein a table (operation table) in which operation signals of the operation actuators 49 and functions are associated, as with the standard table and the expansion table of the operating switches 42. The controller 80 acquires the operation table from the storing unit 81 and controls (performs) a function based on an operation signal output from the operation actuator 49 and the operation table. FIG. 15 illustrates an example of the operation table. Furthermore, the updater 80*a* (the controller 80) updates (overwrites) the operation table stored in the storing unit 81 based on a function whose update has been received by the second display 90B.

First, allocation of functions to operations of the operation actuators 49 in the operation table that has not been updated by the updater 80*a*, that is, the default operation table (initial table) is described with reference to FIG. 15. In the following description, functions allocated to operation signals output by the operation actuators 49 in the initial table are referred to as "initial functions", and functions updated from the initial functions in the operation table updated by the updater 80*a* are referred to as "updated functions". That is, predetermined initial functions among the plurality of functions are allocated to the operation actuators 49, and the updater 80*a* updates the functions allocated to the operation actuators 49 to updated functions different from the initial functions among the plurality of functions.

Specifically, in the initial table, an operation signal output by the first operation actuator 49A when the first operation actuator 49A is operated and the seventeenth function are associated, and the first operation actuator 49A receives an instruction to perform the seventeenth function when operated. Accordingly, in a case where the updater 80*a* has not updated the initial table, when the first operation actuator 49A is operated, the controller 80 switches to the 4WD equal speed state by controlling the front transmission unit 20*f* in response to the operation.

In the initial table, an operation signal output by the second operation actuator 49B when the second operation actuator 49B is operated and the eighteenth function are associated, and the second operation actuator 49B receives an instruction to perform the eighteenth function when operated. Accordingly, in a case where the updater 80*a* has not updated the initial table, when the second operation actuator 49B is operated, the controller 80 enables or disables the eighteenth function in response to the operation, and in a case where the eighteenth function is enabled, the controller 80 switches between 2WD and the 4WD equal speed state by controlling the front transmission unit 20*f* based on the vehicle speed and the steering angle of the steering device.

In the initial table, an operation signal output by the third operation actuator 49C when the third operation actuator 49C is operated and the twentieth function are associated, the third operation actuator 49C receives an instruction to perform the twentieth function when operated. Accordingly, in a case where the updater 80*a* has not updated the initial table, when the third operation actuator 49C is operated, the controller 80 fixes (directly couples) the rear wheel differential 21R based on an operator's operation in response to the operation.

In the initial table, an operation signal output by the fourth operation actuator 49D when the fourth operation actuator 49D is operated and the thirteenth function are associated, the fourth operation actuator 49D receives an instruction to perform the thirteenth function when operated. Accordingly, in a case where the updater 80*a* has not updated the initial table, when the fourth operation actuator 49D is operated, the controller 80 enables or disables the thirteenth function in response to the operation, and in a case where the thirteenth function is enabled, the controller 80 controls the rotational speed of the prime mover 6 based on the vehicle speed and the load of the prime mover 6.

In the initial table, no function is associated with an operation signal output by the fifth operation actuator 49E when the fifth operation actuator 49E is operated, and the fifth operation actuator 49E does not receive an instruction to perform a function even when operated until a function is associated with the operation signal output by the fifth operation actuator 49E by updating the operation table by the updater 80*a*. In a case where a function is associated with the operation signal output by the fifth operation actuator 49E by updating the operation table by the updater 80*a*, the fifth operation actuator 49E receives an instruction to perform the associated function when operated.

In the initial table, an operation signal output by the sixth operation actuator 49F when the sixth operation actuator 49F is operated and the seventh function are associated, and the sixth operation actuator 49F receives an instruction to perform the seventh function when operated. Accordingly, in a case where the updater 80*a* has not updated the initial table, when the sixth operation actuator 49F is operated, the controller 80 enables or disables the seventh function in response to the operation, and in a case where the seventh function is enabled, the controller 80 shuts off transmission of power to the traveling device 3 by switching the hydraulic clutch of the shuttle 20*d* to a neutral position when the vehicle speed becomes less than a predetermined value as a result of an operation of the brake pedal.

In the initial table, an operation signal output by the seventh operation actuator 49G when the seventh operation actuator 49G is operated and the eighth function are associated, and the seventh operation actuator 49G receives an instruction to perform the eighth function when operated. Accordingly, in a case where the updater 80*a* has not updated the initial table, when the seventh operation actuator 49G is operated, the controller 80 enables or disables the eighth function in response to the operation, and in a case where the eighth function is enabled, the controller 80 changes control of the transmission 20 based on the load of the prime mover 6.

In the initial table, an operation signal output by the eighth operation actuator 49H when the eighth operation actuator 49H is operated and the twenty-fourth function are associated, and the eighth operation actuator 49H receives an instruction to perform the twenty-fourth function when operated. Accordingly, in a case where the updater 80*a* has not updated the initial table, when the eighth operation actuator 49H is operated, the controller 80 enables or disables the twenty-fourth function in response to the operation, and in a case where the twenty-fourth function is enabled, the controller 80 switches power transmission to the PTO shaft 22 by controlling the PTO power transmission unit 20*e* in accordance with the height of the working device 10.

In the initial table, an operation signal output by the ninth operation actuator 49I when the ninth operation actuator 49I is operated and the nineteenth function are associated, and the ninth operation actuator 49I receives an instruction to perform the nineteenth function when operated. Accordingly, in a case where the updater 80*a* has not updated the initial table, when the ninth operation actuator 49I is operated, the controller 80 switches to the 4WD speed-increasing state by controlling the front transmission unit 20*f* in response to the operation.

In the initial table, no function is associated with an operation signal output by the tenth operation actuator 49J when the tenth operation actuator 49J is operated, and the tenth operation actuator 49J does not receive an instruction to perform a function even when operated until a function is associated with the operation signal output by the tenth operation actuator 49J by updating the operation table by the updater 80*a*. In a case where a function is associated with the operation signal output by the tenth operation actuator 49J by updating the operation table by the updater 80*a*, the tenth operation actuator 49J receives an instruction to perform the associated function when operated.

Figure 16:
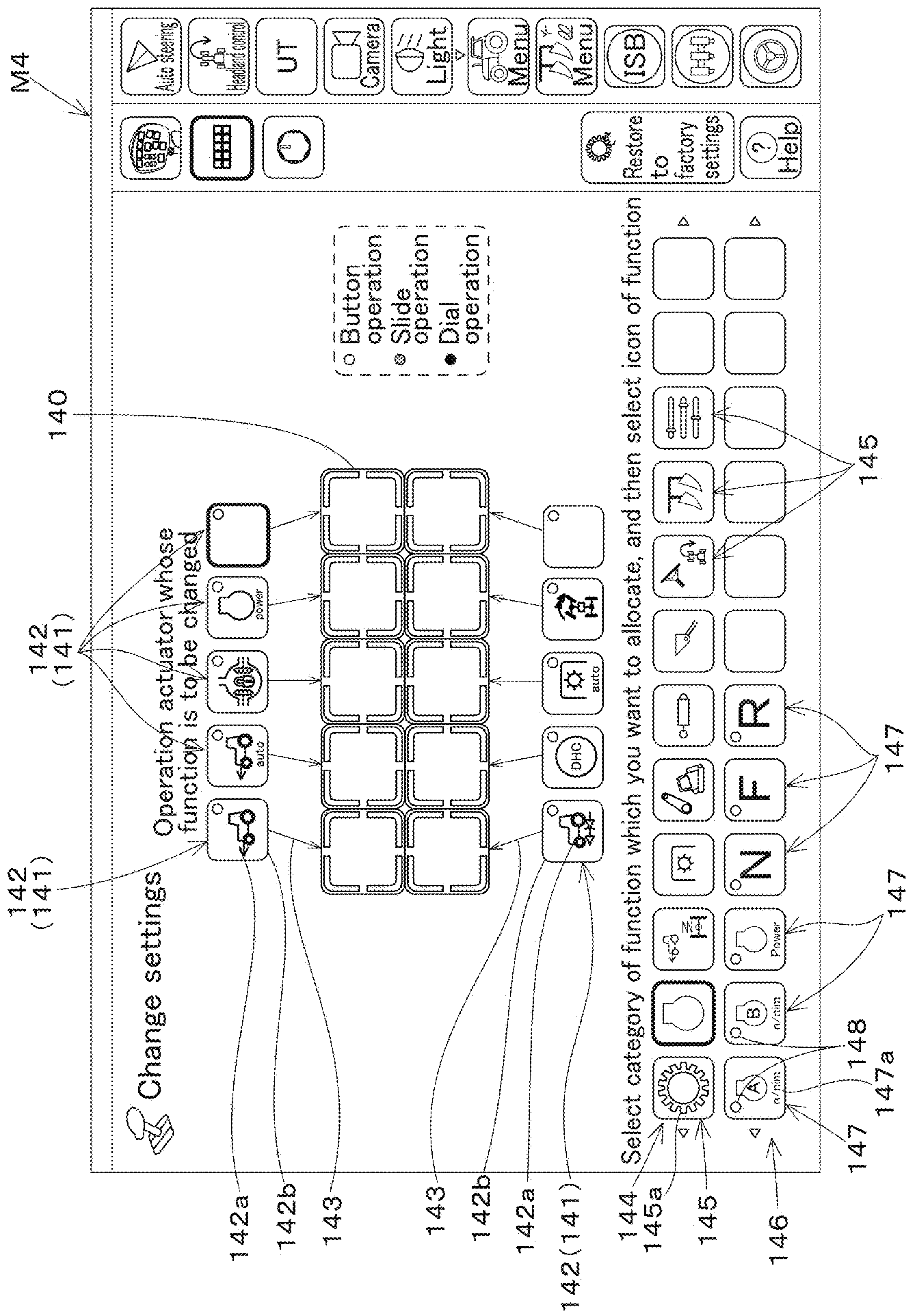
FIG. 16 illustrates an example of a second changing screen.

When a predetermined operation is performed on the display 90 (the second display 90B in the present example embodiment), the second display 90B displays the second changing screen M4 such as the one illustrated in FIG. 16 and receives input of allocation of an updated function. FIG. 16 illustrates an example of the second changing screen M4. As illustrated in FIG. 16, the second changing screen M4 displays a schematic view 140 of the operation actuators 49, third allocation display portion(s) 141, a second category selector 144, and a second function selector 146. Each third allocation display portion 141 is a display image that displays a function allocated to the operation actuator 49 as an icon that is a simple graphical representation of the function. In the example illustrated in FIG. 16, the third allocation display portion 141 includes a rectangular or substantially rectangular image (the fourth icon display portion 142) where an icon 142*a* is displayed and a third arrow portion 143 indicating an operation actuator 49 corresponding to the icon 142*a*. An outer frame (a third category display frame 142*b*) that indicates the outer frame of the fourth icon display portion 142 and surrounds the icon 142*a* may be displayed in a color that varies depending on the category into which a function corresponding to the icon 142*a* of the fourth icon display portion 142 is classified, as with the first category display frame 112*b*. The third arrow portion 143 may also be displayed in a color that varies depending on the category in addition or instead of this.

Note that the icon 142*a* is not displayed in the third allocation display portion 141 of the operation actuator 49 (e.g., the fifth operation actuator 49E and the tenth operation actuator 49J) to which no function is allocated. The operator selects the operation actuator 49 to which the operator wants to allocate a new function (updated function) by selecting any fourth icon display portion 142 (for example, by operating the fourth dial 48). In this way, the second display 90B receives selection of a predetermined operation actuator 49 among the plurality of operation actuators 49.

The second category selector 144 is a display image that receives selection of the category (any one of the first to ninth categories) into which the plurality of functions concerning the working vehicle 1 are classified. The second category selector 144 displays a plurality of rectangular or substantially rectangular images (category display portions 145) that display the categories as icons 145*a*. As illustrated in FIG. 16, in the present example embodiment, the second category selector 144 displays the plurality of category display portions 145 such that the plurality of category display portions 145 are arranged in the left-right direction on the screen. The operator selects the category into which a function which the operator wants to allocate is classified by selecting any category display portion 145 (for example, by operating the fourth dial 48). In this way, the second display 90B receives selection of a predetermined category among the plurality of categories.

The second function selector 146 is a display image that receives selection of a predetermined function among a plurality of functions classified into the category selected by the second category selector 144. The second function selector 146 displays a plurality of rectangular or substantially rectangular images (fifth icon display portions 147) that display the functions as icons 147*a*. As illustrated in FIG. 16, in the present example embodiment, the second function selector 146 displays the plurality of fifth icon display portions 147 such that the plurality of fifth icon display portions 147 are arranged in the left-right direction on the screen.

Note that in the present example embodiment, the operation actuators 49 are tactile switches, and therefore the second function selector 146 displays at least a function that can be operated by a tactile switch among the plurality of functions classified into the category selected by the second category selector 144. The second function selector 146 displays a function that cannot be operated by a tactile switch among the plurality of functions classified into the category selected by the second category selector 144 in an non-selectable manner by graying out the function or hides the function.

Note that a mark 148 indicating whether or not a function has been already allocated to an operation of one of the operation actuators 49, that is, has been already allocated as an initial function or an updated function in the operation table is provided in the fifth icon display portion 147. The mark 148 is a circular figure, and a check mark is added to the fifth icon display portion 147 of a function that has been already allocated as an initial function or an updated function.

The operator selects the fifth icon display portion 147 of a function which the operator wants to allocate by selecting any fifth icon display portion 147 (for example, by operating the fourth dial 48). In this way, the second display 90B receives selection of a predetermined function among the plurality of functions as an updated function. The updater 80*a* updates (overwrites) the operation table stored in the storing unit 81 by allocating, as an updated function, a function corresponding to the selected fifth icon display portion 147 to the operation actuator 49 corresponding to the selected fourth icon display portion 142.

Note that the second changing screen M4 illustrated in FIG. 16 is merely an example, and the screen and a method of allocating an updated function in the operation table are not limited to the above example.

As illustrated in FIG. 9, each of the operation actuators 49 has an icon 49*a*1 representing an initial function. Specifically, the icon 49*a*1 is a figure that is a simple graphical representation of an initial function and is provided in a central portion of the operation surface 49*a* of the operation actuator 49. As illustrated in FIGS. 2 and 9, each of the operation actuators 49 includes a first indicator lamp 49*b*1, a second indicator lamp 49*b*2, and third indicator lamp(s) 49*b*3.

The first indicator lamp 49*b*1, the second indicator lamp 49*b*2, and the third indicator lamp 49*b*3 are light emitting devices that emit light. The first indicator lamp 49*b*1, the second indicator lamp 49*b*2, and the third indicator lamp 49*b*3 each include one or more light sources (e.g., LEDs). In the present example embodiment, the controller 80 turns on the first indicator lamp 49*b*1, the second indicator lamp 49*b*2, and the third indicator lamp 49*b*3 during a period where an operation instruction can be received, in other words, during a period where the working vehicle 1 is in operation. Note that the controller 80 may turn off the first indicator lamp 49*b*1, the second indicator lamp 49*b*2, and the third indicator lamp 49*b*3 in a case where an error is occurring in a function corresponding to the operation actuator 49 or in a case where execution of a function is restricted in accordance with the operation mode of the operating lever 41.

The following describes colors in which the first indicator lamp 49*b*1, the second indicator lamp 49*b*2, and the third indicator lamp 49*b*3 are lit.

The first indicator lamp **49*b*1 changes the manner in which it provides an indication depending on the category to which a function (updated function) updated by the updater 80*a* belongs. The first indicator lamp 49*b*1 is lit in a color that varies depending on the category to which the function updated by the updater 80*a* belongs. This allows the operator to easily know the category of the function updated by the updater 80*a*. This can prevent or reduce occurrence of an erroneous operation even in a case where function(s) to be performed in accordance with an instruction received by the operation actuator 49** is/are updated.

Specifically, in a case where the functions in the operation table stored in the storing unit 81 have not been updated, the first indicator lamp **49*b*1 of the operation actuator 49 for which an operation signal and an initial function are associated is lit in white. When the operation table is updated, the controller 80 causes the first indicator lamp 49*b*1 of the operation actuator 49 for which an operation signal and an updated function are associated to be lit in a color corresponding to a category into which the updated function is classified by changing a control signal output to the first indicator lamp 49*b*1** based on the acquired updated operation table.

Specifically, the controller 80 causes the first indicator lamp **49*b*1 to be lit in orange in a case where an updated function corresponding to the operation actuator 49 where the first indicator lamp 49*b*1 is provided is any one of the first to third categories in the updated operation table. The controller 80 causes the first indicator lamp 49*b*1 to be lit in yellow in a case where the updated function corresponding to the operation actuator 49 where the first indicator lamp 49*b*1 is provided is the fourth category in the updated operation table. The controller 80 causes the first indicator lamp 49*b*1 to be lit in blue in a case where the updated function corresponding to the operation actuator 49 where the first indicator lamp 49*b*1 is provided is any one of the fifth to seventh categories in the updated operation table. The controller 80 causes the first indicator lamp 49*b*1 to be lit in purple in a case where the function corresponding to the operation actuator 49 where the first indicator lamp 49*b*1 is provided is the eighth category in the updated operation table. The controller 80 causes the first indicator lamp 49*b*1 to be lit in green in a case where the updated function corresponding to the operation actuator 49 where the first indicator lamp 49*b*1** is provided is the ninth category in the updated operation table.

The second indicator lamp **49*b*2 changes the manner in which it provides an indication depending on whether a function allocated to the operation actuator 49 is enabled or disabled. Specifically, the controller 80 changes a control signal output to the second indicator lamp 49*b*2 of the operation actuator 49 depending on whether a function allocated to the operation actuator 49 is enabled or disabled. In the present example embodiment, the second indicator lamp 49*b*2 is lit in white in a case where function(s) to be performed in accordance with a received instruction is/are disabled. On the other hand, the second indicator lamp 49*b*2 is lit in green in a case where the function(s) to be performed in accordance with a received instruction is/are enabled. Note that in a case where the same function is allocated to a different operation actuator 49 or another operation member (not limited to a physical switch and includes a display image that is displayed on the display 90 and receives an operation), when this function is enabled by an operation of this different operation actuator 49 or the like irrespective of an operation of the operation actuator 49, the indication manner of the second indicator lamp 49*b*2 of the operation actuator 49** may be changed.

The third indicator lamp **49*b*3 is lit in white. In the present example embodiment, two third indicator lamps 49*b*3 are provided on each of the operation actuators 49, and the two third indicator lamps 49*b*3 are not lit in a color other than white. Note that the controller 80 may cause the third indicator lamps 49*b*3 to be lit in a color such as red or blink in a case where an error is occurring in a function corresponding to the operation actuator 49 where the third indicator lamps 49*b*3** are provided.

Next, the layout and shapes of the first indicator lamp **49*b*1, the second indicator lamp 49*b*2, and the third indicator lamp 49*b*3 are described. The first indicator lamp 49*b*1, the second indicator lamp 49*b*2, and the third indicator lamp 49*b*3 are positioned to surround the icon 49*a*1. Furthermore, the first indicator lamp 49*b*1, the second indicator lamp 49*b*2, and the third indicator lamp 49*b*3 extend along the inner periphery of the operation surface 49*a* of the operation actuator 49 and define a portion or an entirety of a contour of the inner periphery of the operation surface 49*a*. This allows the operator to not only easily know whether a function is enabled or disabled by checking the second indicator lamp 49*b*2, but also recognize the position of the operation actuator 49 easily and with certainty by the first indicator lamp 49*b*1, the second indicator lamp 49*b*2, and the third indicator lamps 49*b*3**.

Specifically, the first indicator lamp **49*b*1, the second indicator lamp 49*b*2, and the third indicator lamps 49*b*3 are located at corners of the operation surface 49*a*. The first indicator lamp 49*b*1 is located in a front left portion of the operation surface 49*a*, and the second indicator lamp 49*b*2 is located in a front right portion of the operation surface 49*a*. The third indicator lamps 49*b*3 are located in a rear left portion and rear right portion of the operation surface 49*a***.

The first indicator lamp **49*b*1 extends leftward from the central portion of the front edge of the operation surface 49*a* in the left-right direction and reaches the central portion of the left edge of the operation surface 49*a* in the front-rear direction. That is, the first indicator lamp 49*b*1** has a substantially inverse L shape.

The second indicator lamp **49*b*2 extends rightward from the central portion of the front edge of the operation surface 49*a* in the left-right direction and reaches the central portion of the right edge of the operation surface 49*a* in the front-rear direction. That is, the second indicator lamp 49*b*2** has a substantially L shape.

The third indicator lamp **49*b*3 located in the rear left portion of the operation surface 49*a* extends leftward from the central portion of the rear edge of the operation surface 49*a* in the left-right direction and reaches the central portion of the left edge of the operation surface 49*a* in the front-rear direction. That is, the third indicator lamp 49*b*3 located in the rear left portion of the operation surface 49*a*** has a substantially L shape.

The third indicator lamp **49*b*3 located in the rear right portion of the operation surface 49*a* extends rightward from the central portion of the rear edge of the operation surface 49*a* in the left-right direction and reaches the central portion of the right edge of the operation surface 49*a* in the front-rear direction. That is, the third indicator lamp 49*b*3 located in the rear right portion of the operation surface 49*a*** has a substantially inverse L shape.

In the present example embodiment, the first indicator lamp **49*b*1, the second indicator lamp 49*b*2, and the third indicator lamps 49*b*3** are positioned apart from one another.

Specifically, a right end of the first indicator lamp **49*b*1 and a left end of the second indicator lamp 49*b*2 are positioned apart from each other in the left-right direction. A rear end of the first indicator lamp 49*b*1 and a front end of the third indicator lamp 49*b*3 located in the rear left portion are positioned apart from each other in the front-rear direction. A rear end of the second indicator lamp 49*b*2 and a front end of the third indicator lamp 49*b*3 located in the rear right portion are positioned apart from each other in the front-rear direction. A right end of the third indicator lamp 49*b*3 located in the rear left portion and a left end of the third indicator lamp 49*b*3** located in the rear right portion are positioned apart from each other in the left-right direction.

Note that although the first indicator lamp **49*b*1, the second indicator lamp 49*b*2, and the third indicator lamps 49*b*3 are positioned apart from one another in the above example embodiment, the first indicator lamp 49*b*1, the second indicator lamp 49*b*2, and the third indicator lamps 49*b*3 may be positioned close to one another as long as indications (e.g., on and off) provided by the first indicator lamp 49*b*1, the second indicator lamp 49*b*2, and the third indicator lamps 49*b*3** are distinguishable.

Furthermore, the dial 44 can receive an operation to change a control parameter of a function. In other words, the dial 44 can receive an instruction to perform a function to change a parameter of a function such as the tenth function to change the first prime mover rotational speed of the ninth function or the twelfth function to change the second prime mover rotational speed of the eleventh function. The controller 80 changes a control parameter of each function stored in the storing unit 81 based on an operation signal output from the dial 44.

Figure 17:
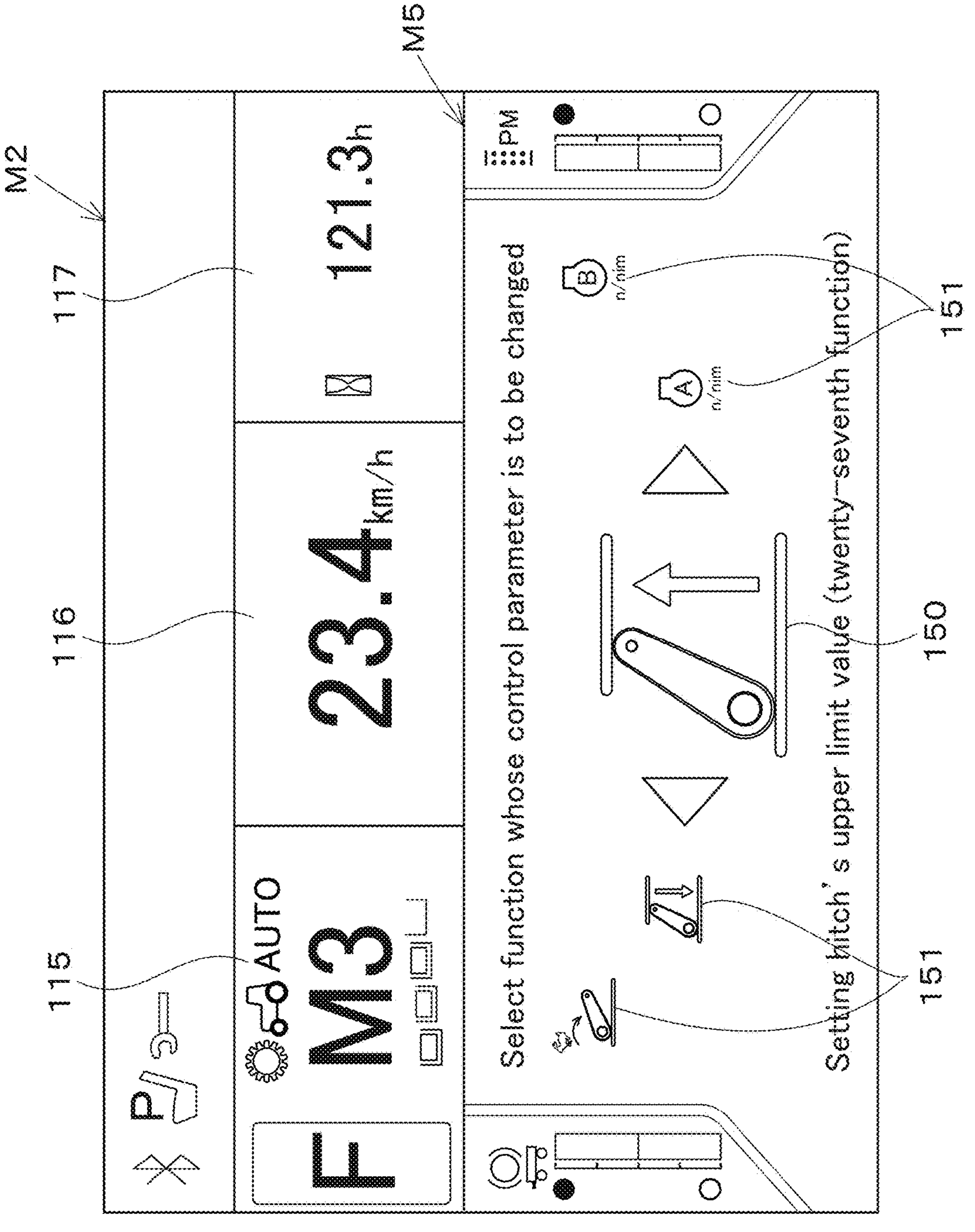
FIG. 17 illustrates an example of a third changing screen and an information display screen.

The first dial (first function operation actuator) 45 is an operation member (a physical dial switch in the present example embodiment) usable to select among a plurality of functions by a rotating operation. Functions that can be selected via (by the operation of) the first dial 45 (candidate functions) are stored in advance in the storing unit 81. When the first dial 45 is operated, the controller 80 acquires an operation signal output from the first dial 45 and causes a third changing screen M5 to be displayed on the display 90 (the first display 90A in the present example embodiment), as illustrated in FIG. 17. FIG. 17 illustrates an example of the third changing screen M5 and the information display screen M2. As illustrated in FIG. 17, the first display 90A displays the third changing screen M5 together with the information display screen M2, as with the operation display screen M1. The third changing screen M5 displays the functions that can be selected by the operation of the first dial 45. The display 90 displays a function selected via the first dial 45 and other functions in different display forms.

As illustrated in FIG. 17, the third changing screen M5 displays a selected function display portion 150 and candidate function display portions 151. The selected function display portion 150 is an image that displays one function selected via the first dial 45 as an icon. Each candidate function display portion 151 is an image that displays another function as an icon. In the example illustrated in FIG. 17, the candidate function display portions 151 are provided on one of opposite sides (left side) in the left-right direction and the other of the opposite sides (right side) in the left-right direction of the selected function display portion 150. The third changing screen M5 displays, in the selected function display portion 150, one of the functions that can be selected by the operation of the first dial 45 and, as the first dial 45 is operated, displays, in the selected function display portion 150, one of the functions displayed in the candidate function display portions 151 instead of the function previously displayed in the selected function display portion 150. That is, the function displayed in the selected function display portion 150 is sequentially changed as the first dial 45 is operated. In the example of the third changing screen M5 illustrated in FIG. 17, a state where the twenty-seventh function is being selected is illustrated.

Note that the candidate function display portions 151 are provided on one of the opposite sides (left side) and the other of the opposite sides (right side) of the selected function display portion 150 in the left-right direction and the candidate function display portions 151 display all the other functions except for the one function displayed in the selected function display portion 150 among the functions that can be selected by the operation of the first dial 45, in the example of the third changing screen M5 illustrated in FIG. 17. However, it is only necessary that at least one other function be displayed in the candidate function display portion(s) 151, and the manner in which function(s) is/are displayed is not limited to the example illustrated in FIG. 17.

Figure 18:
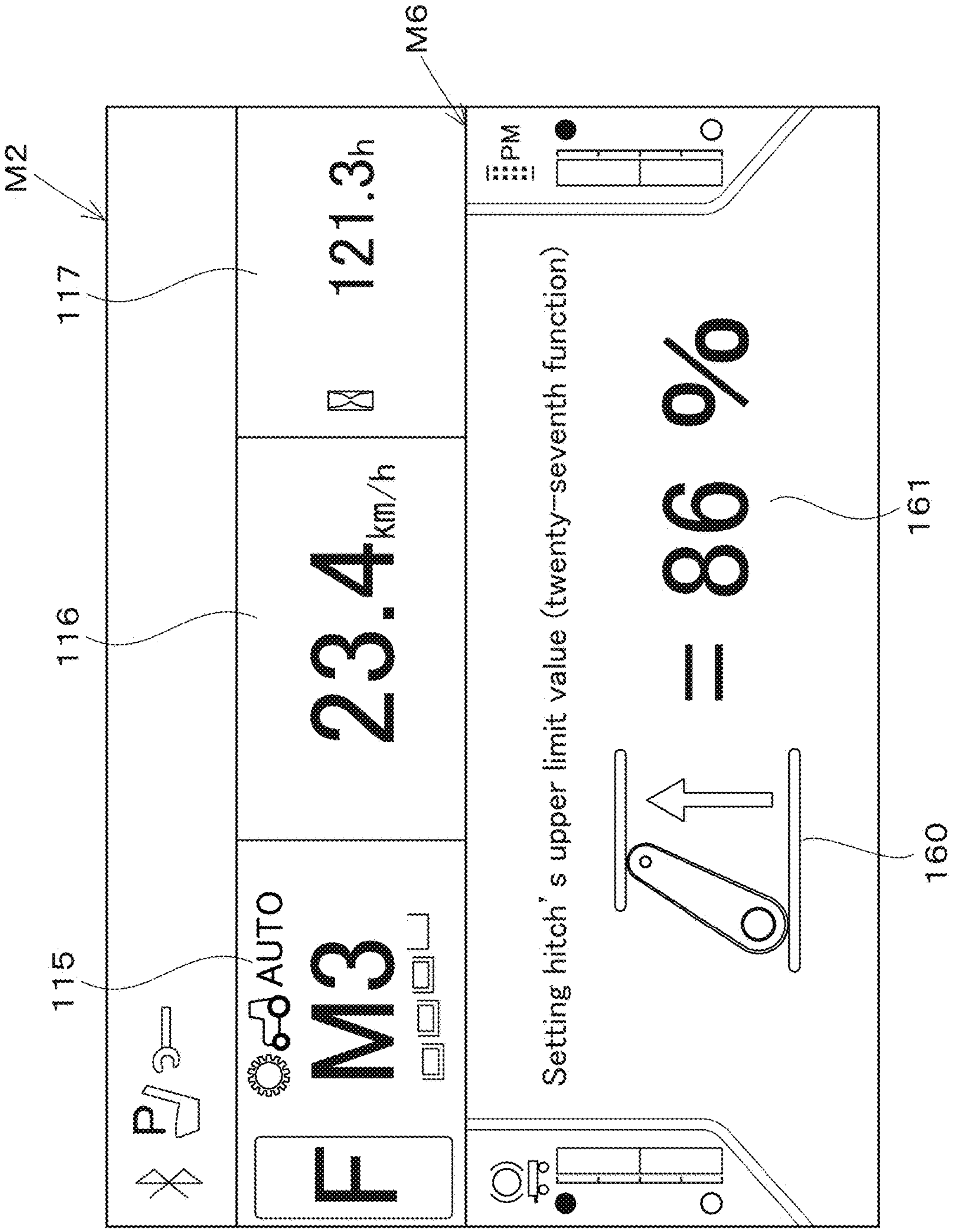
FIG. 18 illustrates an example of a fourth changing screen and an information display screen.

The second dial (second function operation actuator) 46 is an operation member (a physical dial switch in the present example embodiment) usable to change a control parameter of a function selected by the first dial 45 by a rotating operation. The display 90 (the first display 90A) can display the control parameter changed by the second dial 46. Specifically, when the second dial 46 is operated in a case where the third changing screen M5 is displayed by the first display 90A, the controller 80 confirms one function selected by an operation of the first dial 45 as a target function whose parameter is to be changed. When the target function whose parameter is to be changed is confirmed, the first display 90A shifts the display from the third changing screen M5 to a fourth changing screen M6 indicative of a control parameter, as illustrated in FIG. 18. FIG. 18 illustrates an example of the fourth changing screen M6 and the information display screen M2. Note that as illustrated in FIG. 18, the first display 90A displays the fourth changing screen M6 together with the information display screen M2, as with the operation display screen M1 and the third changing screen M5.

As illustrated in FIG. 18, the fourth changing screen M6 includes a target function display portion 160 and a parameter display portion 161. The target function display portion 160 is an image that displays a target function whose parameter is to be changed as an icon. The parameter display portion 161 is an image that displays a candidate (candidate parameter) of a changed parameter in response to an operation of the second dial 46. In the present example embodiment, the parameter display portion 161 displays the candidate parameter as a numerical value. Note that a display form of the parameter display portion 161 is not limited to a numerical value as long as the candidate parameter can be displayed, and can be, for example, a bar-shaped meter shape whose length varies depending on the candidate parameter.

When the second dial 46 is operated, the parameter display portion 161 changes the display of the candidate parameter in response to the operation. In the example illustrated in FIG. 18, the parameter display portion 161 increases the numerical value of the candidate parameter when the second dial 46 is rotated in one direction (clockwise direction) and decreases the numerical value of the candidate parameter when the second dial 46 is rotated in the opposite direction (counterclockwise direction).

The controller 80 confirms the candidate parameter displayed in the parameter display portion 161, for example, in a case where a predetermined period has elapsed from the operation of the second dial 46 or in a case where the first dial 45 is operated. The controller 80 changes the control parameter of the function that is stored in the storing unit 81 and displayed in the target function display portion 160 based on the confirmed candidate parameter.

Note that a method of confirming the candidate parameter displayed in the parameter display portion 161 is not limited to the above method. For example, in a case where the second dial 46 receives a pressing operation, the controller 80 may confirm the candidate parameter in response to the pressing operation of the second dial 46. Furthermore, in a case where the operating device 40 includes an operation member other than the first dial 45 and the second dial 46, the controller 80 may confirm the candidate parameter in response to an operation of this operation member.

With the above configuration, the operator can speedily change a parameter of a function by using the first dial 45 and the second dial 46 for different purposes.

Next, the arrangement of the first dial 45 and the second dial 46 is described. As illustrated in FIGS. 6 and 8, the axial direction of a rotary axis L1 of the first dial 45 is different from the axial direction of a rotary axis L2 of the second dial 46. The axial direction of the rotary axis L1 of the first dial 45 may be perpendicular or substantially perpendicular to the axial direction of the rotary axis L2 of the second dial 46. This allows the operator to easily distinguish which dial 44 is operated to select a function and which dial 44 is operated to select a parameter. This can achieve a speedy operation regarding a parameter of a function of the working vehicle 1.

In the present example embodiment, the rotary axis L1 of the first dial 45 extends in the up-down direction, and the rotary axis L2 of the second dial 46 extends in a substantially vehicle body width direction. The operator can rotate the first dial 45 in the clockwise direction about the axis thereof in the up-down direction or can rotate the first dial 45 in the counterclockwise direction about the axis thereof in the up-down direction. Furthermore, the operator can rotate the second dial 46 in the forward direction or the rearward direction about the axis thereof in the vehicle body width direction.

Furthermore, the first dial 45 and the second dial 46 are adjacent to each other in the front-rear direction. This allows the operator to speedily operate the second dial 46 by moving their wrist while keeping the posture to operate the first dial 45.

Note that the axis direction and position of the rotary axis L1 of the first dial 45 and the axis direction and position of the rotary axis L2 of the second dial 46 are not limited to the above directions and positions. For example, the first dial 45 and the second dial 46 may be adjacent to each other in the vehicle body width direction.

Furthermore, the controller 80 may include a changer 80*b*. The changer 80*b* changes the functions that can be selected via (by the operation of) the first dial 45 (candidate functions) among the plurality of functions. The changer 80*b* includes electric/electronic circuit(s) provided in the controller 80 and/or program(s) stored in CPU(s) and/or the like. The updater 80*a* (the controller 80) updates (overwrites) the candidate functions stored in the storing unit 81 based on function(s) which the display 90 (the second display 90B in the present example embodiment) receives on a fifth changing screen M7.

Figure 19:
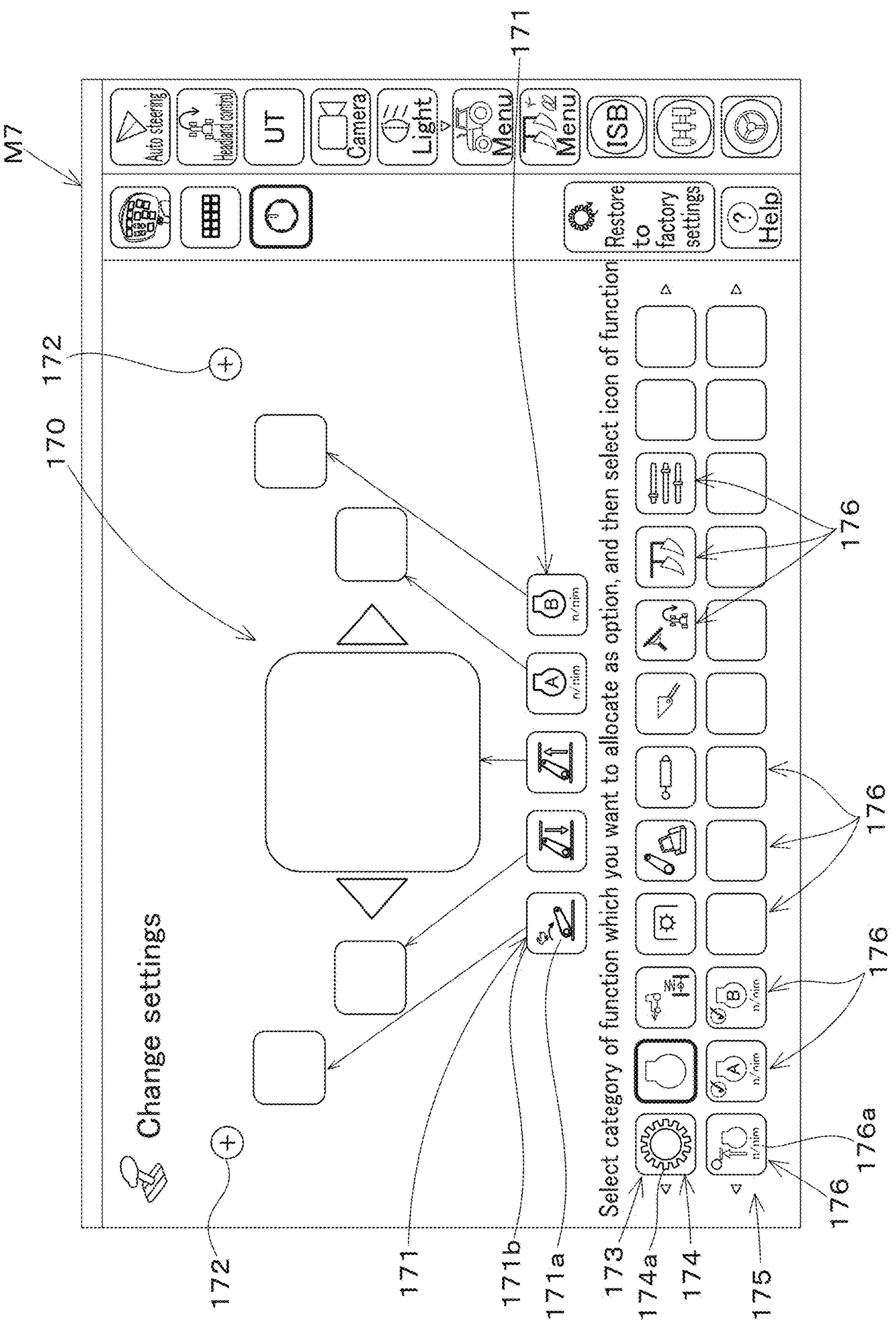
FIG. 19 illustrates an example of a fifth changing screen.

When a predetermined operation is performed on the display 90 (the second display 90B in the present example embodiment), the second display 90B displays the fifth changing screen M7 such as the one illustrated in FIG. 19 and receives selection of a candidate function. FIG. 19 illustrates an example of the fifth changing screen M7. As illustrated in FIG. 19, the fifth changing screen M7 displays a selection display portion 170, a third category selector 173, and a third function selector 175. The selection display portion 170 is a display image that displays a function that is being selected as a candidate function as an icon 171*a* that is a simple graphical representation of the function. The selection display portion 170 first displays a candidate function to be displayed in the selected function display portion 150 and candidate functions to be displayed in the candidate function display portions 151 when the fifth changing screen M7 is displayed, and includes rectangular or substantially rectangular image(s) (sixth icon display portion(s) 171) that displays the icon 171*a* in the example illustrated in FIG. 19. An outer frame (a fourth category display frame 171*b*) that indicates the outer shape of the sixth icon display portion 171 and surrounds the icon 171*a* may be displayed in a color that varies depending on the category into which a function corresponding to the icon 171*a* of the sixth icon display portion 171 is classified, as with the first category display frame 112*b*.

Note that the icon 171*a* is not displayed in the sixth icon display portion 171 for which a candidate function has not been selected. Although the selection display portion 170 displays five sixth icon display portions 171 and the fifth changing screen M7 can receive selection of five candidate functions in the example illustrated in FIG. 19, the number of sixth icon display portions 171, that is, the number of candidate functions, can be changed by addition or deletion as appropriate by operating an addition button 172 or the like of the fifth changing screen M7.

The operator selects a candidate function to be replaced with a new candidate function by selecting any sixth icon display portion 171 (for example, by operating the fourth dial 48). The third category selector 173 is a display image that receives selection of one of the categories (any one of the first to ninth categories) into which the plurality of functions concerning the working vehicle 1 are classified. The third category selector 173 displays a plurality of rectangular or substantially rectangular images (category display portions 174) that indicate the categories as icons 174*a*. As illustrated in FIG. 19, in the present example embodiment, the third category selector 173 displays the plurality of category display portions 174 such that the plurality of category display portions 174 are arranged in the left-right direction on the screen. The operator selects a category into which a function which the operator wants to allocate is classified by selecting any category display portion 174 (for example, by operating the fourth dial 48). In this way, the second display 90B receives selection of a predetermined category among the plurality of categories.

The third function selector 175 is a display image that receives selection of a predetermined function among a plurality of functions classified into the category selected by the third category selector 173. The third function selector 175 displays a plurality of rectangular or substantially rectangular images (seventh icon display portions 176) that indicate the functions as icons 176*a*. As illustrated in FIG. 19, in the present example embodiment, the third function selector 175 displays the plurality of seventh icon display portions 176 such that the plurality of seventh icon display portions 176 are arranged in the left-right direction on the screen. The plurality of seventh icon display portions 176 display functions such as the third function, the sixth function, the tenth function, the twelfth function, and/or the twenty-fifth to twenty-eighth functions as the icons 176*a*.

The operator selects a seventh icon display portion 176 of a function which the operator wants to allocate by selecting the seventh icon display portion 176 (for example, by operating the fourth dial 48). In this way, the second display 90B receives selection of a predetermined function among the plurality of functions as a candidate function. The changer 80*b* updates (overwrites) the candidate functions stored in the storing unit 81 by replacing the function corresponding to the selected sixth icon display portion 171 with the function corresponding to the selected seventh icon display portion 176 as a candidate function.

Note that the fifth changing screen M7 illustrated in FIG. 19 is merely an example, and the screen and a method of allocating a candidate function are not limited to the above example.

Although a case where both of the first function operation actuator 45 and the second function operation actuator 46 are physical dial switches has been described as an example in the above example embodiment, it is only necessary that at least the second function operation actuator 46 be a dial switch, and the first function operation actuator 45 is not limited to a dial switch. For example, the first function operation actuator 45 may include one or more tactile switches and/or the like or may be another operation actuator as long as the first function operation actuator 45 is an operation actuator to select among a plurality of functions. For example, in a case where the display (display screen) 90 is a touch panel, the first function operation actuator 45 may be a display image that is displayed on the display screen (display) 90 and receives a selecting operation.

For example, the selected function display portion 150 and the candidate function display portions 151 illustrated in FIG. 17 also serve as the first function operation actuator 45. When the selected function display portion 150 (or the vicinity thereof, for example) is swiped in a leftward direction or a rightward direction, the third changing screen M5 displays, in the selected function display portion 150, a function displayed in one of the candidate function display portions 151 instead of the function displayed in the selected function display portion 150 in response to the swiping operation.

Although a case where the operation mode is switched by operating the selector 51 has been described as an example in the above example embodiment, switching of the operation mode is not limited to a selecting operation using the selector 51. For example, the operation mode may be switched by changing the shape of the operating lever 41 instead of or in addition to the operation of the selector 51. This makes it possible to perform various kinds of control of the working vehicle 1 by changing the form of a switcher 55 even in a case where only a single operating lever 41 is provided. This makes it unnecessary for the operator to switch the operating lever 41 to another one every time an environment where the working vehicle 1 travels or work content changes, thus eliminating or reducing the likelihood that the operator will operate a wrong switch or a wrong lever.

Figure 20:
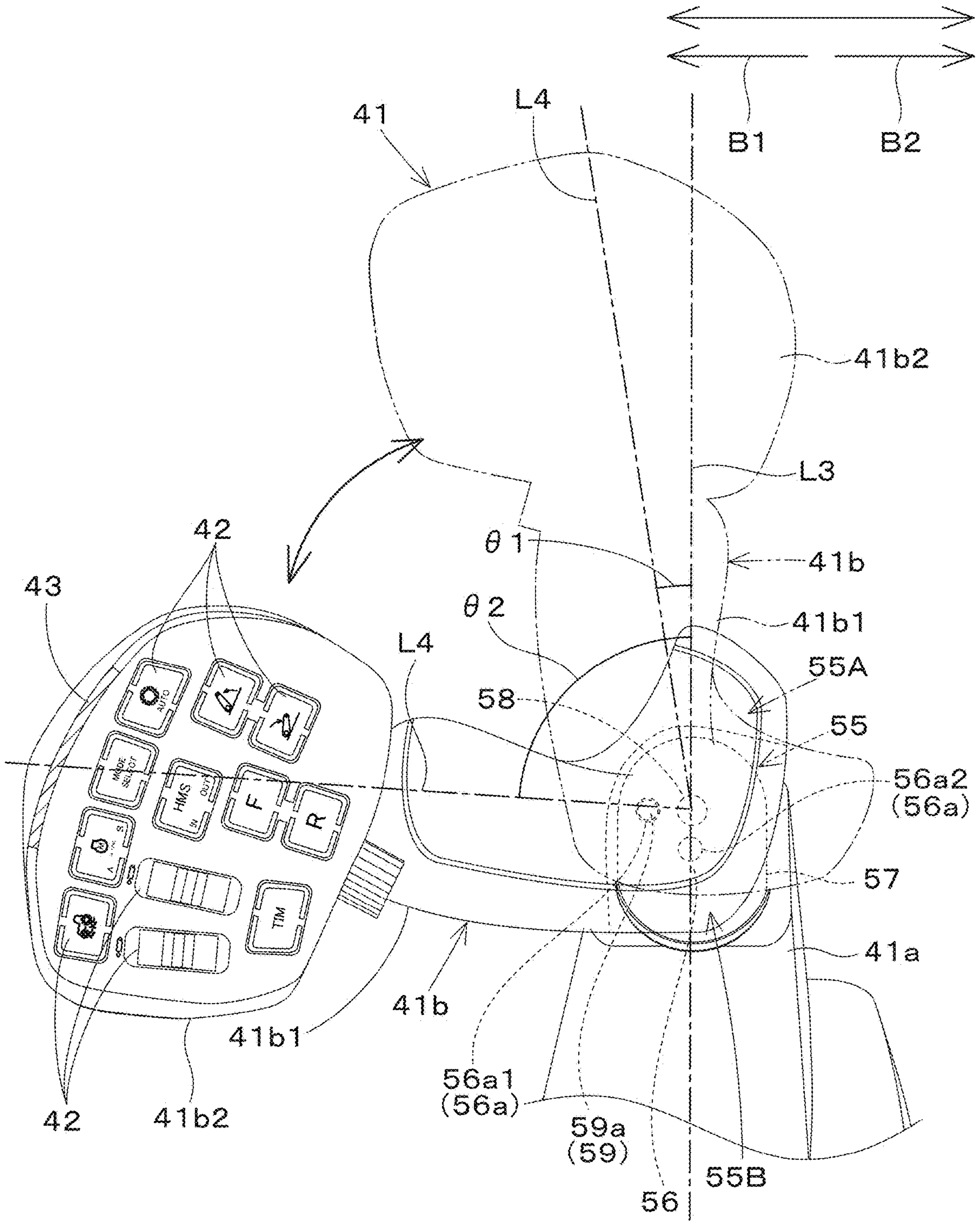
FIG. 20 illustrates an operating lever according to a variation of an example embodiment of the present invention as viewed from an operator's seat.

In such a case, the operating lever 41 includes the switcher 55, as in a variation illustrated in FIG. 20. FIG. 20 illustrates the operating lever 41 according to the variation as viewed from the operator's seat 4.

As illustrated in FIG. 20, the switcher 55 couples the grip 41*b* and the base portion 41*a*. The switcher 55 switches between a first form 55A in which the angle of the grip 41*b* with respect to the base portion 41*a* (e.g., the angle between a reference line L3 extending in a direction in which the base portion 41*a* illustrated in FIG. 20 extends and a reference line L4 extending in a direction in which the grip 41*b* extends) is a first angle θ1 and a second form 55B in which the angle is a second angle θ2 different from the first angle θ1. The second angle θ2 is an angle larger than the first angle θ1. Furthermore, in a case where the switcher 55 is in the first form 55A, the grip 41*b* extends from the switcher 55 along the direction in which the base portion 41*a* extends, and the operating lever 41 extends in a substantially linear manner. On the other hand, in a case where the switcher 55 is in the second form 55B, the grip 41*b* extends from the switcher 55 inward or outward along the width direction, and the operating lever 41 is bent at an intermediate portion.

Figure 21:
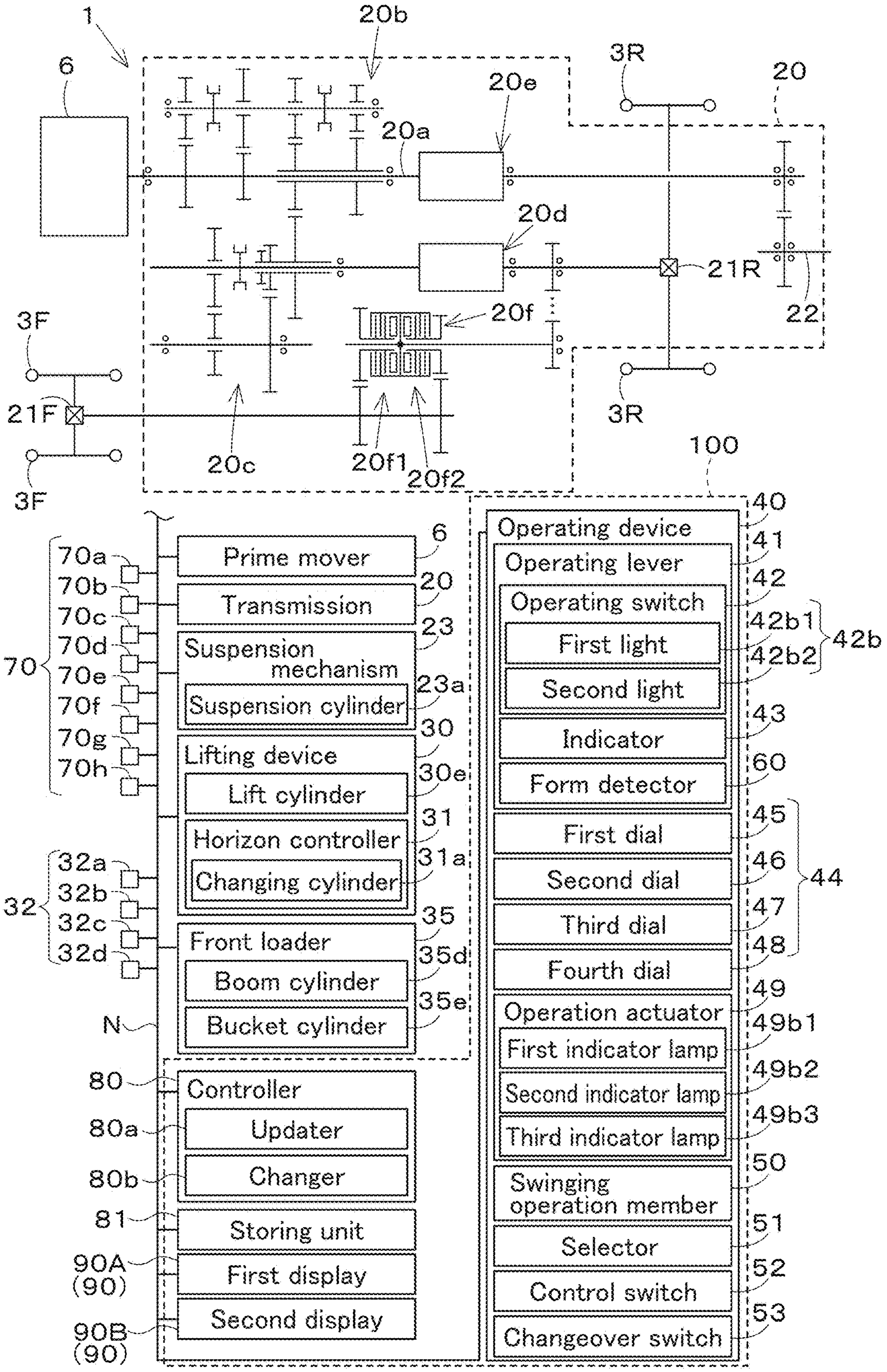
FIG. 21 illustrates a system of a working vehicle according to a variation of an example embodiment of the present invention.

More specifically, as illustrated in FIG. 20, the switcher 55 includes a first bracket 56, a second bracket 57, a rotary shaft 58, and a form keeper 59, and as illustrated in FIG. 21, the switcher 55 includes a form detector 60.

The first bracket 56 is provided at a proximal end of the grip 41*b*. The second bracket 57 is provided at a distal end of the base portion 41*a* and rotatably supports the first bracket 56 via the rotary shaft 58. The rotary shaft 58 extends in the front-rear direction. The first bracket 56 and the second bracket 57 have an insertion hole through which the rotary shaft 58 is inserted, and the grip 41*b* rotates about the rotary shaft 58 and thus the angle of the grip 41*b* with respect to the base portion 41*a* can be changed.

The form keeper 59 is configured to keep the state of the first form 55A and the state of the second form 55B. The form keeper 59 includes a lock member 59*a* and is attached to the second bracket 57. The lock member 59*a* is a lock ball and keeps the state of the first form 55A and the state of the second form 55B by being engaged with a lock recess 56*a* provided in the first bracket 56. More specifically, such lock recesses 56*a* are provided in a portion (a first recess 56*a*1) of the first bracket 56 where the lock member 59*a* makes contact in a case where the operation mode is the first form 55A and a portion (a second recess 56*a*2) of the first bracket 56 where the lock member 59*a* makes contact in a case where the operation mode is the second form 55B. Accordingly, in a case where the operator operates the operating lever 41 into the first form 55A, the lock member 59*a* is engaged with the first recess 56*a*1. In a case where the operator operates the operating lever 41 from the first form 55A into the second form 55B by rotating the grip 41*b* about the rotary shaft 58, the lock member 59*a* is disengaged from the first recess 56*a*1 and is engaged with the second recess 56*a*2. In this way, the form keeper 59 can keep the state of the first form 55A and the state of the second form 55B.

Note that the structure of the form keeper 59 is not limited to the above structure as long as the form keeper 59 can keep the state of the first form 55A and the state of the second form 55B.

The form detector 60 is a detection sensor that detects whether the operating lever 41 is in the first form 55A or in the second form 55B. The form detector 60 is, for example, a limit switch, and detects whether the operating lever 41 is in the first form 55A or in the second form 55B by detecting the position of the grip 41*b* with respect to the base portion 41*a*. The form detector 60 is connected to the controller 80 and outputs a detection signal to the controller 80. The controller 80 thus switches the operating lever 41 into the first mode in a case where the operating lever 41 is in the first form 55A and switches the operating lever 41 into the second mode in a case where the operating lever 41 is in the second form 55B. With this, the operating lever 41 is configured such that function(s) of the working vehicle 1 to be performed in accordance with an instruction received by the operating lever 41 can be changed depending on whether the switcher 55 is in the first form 55A or in the second form 55B. Furthermore, the operating lever 41 is configured such that function(s) of the working vehicle 1 to be performed in accordance with an instruction received by pivoting of the operating lever 41 can be changed depending on whether the switcher 55 is in the first form 55A or in the second form 55B.

Note that in a case where the operating lever 41 is changed in shape and the operation mode is switched based on such an operation, it is only necessary that the operating lever 41 can be switched between at least the first mode and the second mode. Furthermore, in a case where the operation mode is switched into another mode such as the third mode or the fourth mode in addition to the first mode and the second mode, the operation mode can be switched between the first mode and the fourth mode and can be switched between the second mode and the third mode using the selector 51.

That is, in a case where the operating lever 41 is in the first form 55A, the operating lever 41 can be switched into the first mode or the fourth mode, and switching between the first mode and the fourth mode is performed based on the operation of the selector 51. On the other hand, in a case where the operating lever 41 is in the second form 55B, the operating lever 41 can be switched into the second mode or the third mode, and switching between the second mode and the third mode is performed based on the operation of the selector 51.

In a case where the operating lever 41 is switched only into the first mode and the second mode in the above variation, the standard map and the expansion map of the third mode of the above example embodiment may be used as the standard map and the expansion map of the second mode.

Therefore, the operating lever 41 is configured such that function(s) of the working vehicle 1 to be performed in accordance with an instruction received by the operation of the operating switch 42 may be changed depending on whether the switcher 55 is in the first form 55A or in the second form 55B. Furthermore, since the indicator 43 changes the manner in which the indicator 43 provides an indication depending on the operation mode as described above, the indicator 43 changes the manner in which it provides an indication depending on whether the switcher 55 is in the first form 55A or in the second form 55B. More specifically, the indicator 43 changes its color depending on whether the switcher 55 is in the first form 55A or in the second form 55B.

Operating devices 40 for working vehicles 1, assistance apparatuses 100 for working vehicles 1, and working vehicles 1 as has been described achieve one or more of the following effects.

(Item A1) An operating device 40 for a working vehicle 1, the operating device 40 including an operating lever 41 to cause the working vehicle 1 to perform various functions, and a selector 51 to select an operation mode of the operating lever 41, wherein the operating lever 41 is configured such that one or more functions of the working vehicle 1 to be performed in accordance with an instruction received by the operating lever 41 vary depending on the operation mode selected via the selector 51.

With the operating device 40 for a working vehicle 1 according to item A1, various functions of the working vehicle 1 can be operated by operation of the operating lever 41 by switching the operation modes via the selector 51, even though only a single operating lever 41 is provided. This makes it unnecessary for the operator to switch the operating lever 41 to another one every time an environment where the working vehicle 1 travels or work content changes, thus eliminating or reducing the likelihood that the operator will operate a wrong switch or lever. Furthermore, it is unnecessary to increase the number of operating levers 41 in accordance with types of functions of the working vehicle 1. This can reduce the number of operation members on the operating device 40. It follows that it is possible to not only improve operability of the entire operating device 40, but also eliminate or reduce the likelihood that the operating lever 41 will hinder a field of view of the operator.

(Item A2) The operating device 40 according to item A1, wherein the operating lever 41 is pivotally supported, and is configured such that one or more functions of the working vehicle 1 to be performed in accordance with an instruction received by the operating lever 41 being pivoted vary depending on the operation mode selected via the selector 51.

With the operating device 40 for a working vehicle 1 according to item A2, a function to be performed in accordance with an instruction received by the operating lever 41 being pivoted can be freely changed by selecting an operation mode using the selector 51. This makes it possible to reduce the number of operation members on the operating device 40. It is therefore possible to not only secure a sufficient space for installation of the operating lever 41, but also eliminate or reduce the likelihood that the operation member will interfere with another operation member(s). It follows that it is possible to improve operability of the entire operating device 40.

(Item A3) The operating device 40 according to item A2, wherein a plurality of the operation modes include a first mode in which at least one or more work functions relating to work among the functions of the working vehicle 1 are performed and a second mode in which at least one or more traveling functions relating to travel among the functions of the working vehicle 1 are performed, the operating lever 41 is operable to, in the first mode, receive an instruction to perform the one or more work functions by being pivoted, and the operating lever 41 is operable to, in the second mode, receive an instruction to perform the one or more traveling functions by being pivoted.

With the operating device 40 for a working vehicle 1 according to item A3, the operator can successively perform a work function and a traveling function using the operating lever 41 without switching the operating lever 41 to another one.

(Item A4) The operating device 40 according to item A3, wherein the operating lever 41 includes at least one operating switch 42, and is configured such that a function of the working vehicle 1 to be performed in accordance with an instruction received by the operating lever 41 by an operation of the at least one operating switch 42 varies depending on the operation mode selected via the selector 51.

With the operating device 40 for a working vehicle 1 according to item A4, functions to be performed in accordance with instructions received by the plurality of operating switches 42 of the operating lever 41 can be freely changed by switching the operation modes via the operation of the selector 51. It is therefore unnecessary to provide as many operating switches 42 as the number of functions of the working vehicle 1 on the operating lever 41. It follows that it is possible to further improve the operability of the operating lever 41.

(Item A5) The operating device 40 according to item A4, wherein the plurality of operation modes include a third mode in which the one or more traveling functions and the one or more work functions are performed, the operating lever 41 is operable to, in the third mode, receive an instruction to perform the one or more traveling functions by being pivoted, and a function of the working vehicle 1 to be performed in accordance with an instruction received by the operation of the at least one operating switch 42 in the third mode is different from a function of the working vehicle 1 to be performed in accordance with an instruction received by the operation of the at least one operating switch 42 in the second mode.

With the operating device 40 for a working vehicle 1 according to item A5, control concerning travel can be performed by pivoting of the operating lever 41 continuously before and after switching between the second mode and the third mode, whereas different actions can be performed by operation of the same operating switch 42 by switching between the second mode and the third mode. Therefore, for example, in a case where the working vehicle 1 travels into and out of the agricultural field, content of an action concerning work and/or travel corresponding to an operation of the operating switch 42 can be changed by switching between the second mode and the second mode while continuing travelling. It is therefore possible to increase versatility of the operating lever 41.

(Item A6) The operating device 40 according to item A5, wherein the plurality of operation modes include a fourth mode, and the operating lever 41 is operable to, in the fourth mode, not receive an instruction to perform a function of the working vehicle 1 even when pivoted, and receive an instruction to perform a function of the working vehicle 1 when the at least one operating switch 42 is operated.

With the operating device 40 for a working vehicle 1 according to item A6, it is possible to eliminate or reduce the likelihood that the working vehicle 1 will unintentionally perform traveling and/or work, for example, even if the operator accidentally makes contact with the operating lever 41 and pivots the operating lever 41 when, for example, leaving the operator's seat 4 or sitting down on the operator's seat 4.

(Item A7) The operating device 40 according to any one of items A1 to A6, further including an indicator 43 to provide an indication differently based on the operation mode selected via the selector 51.

With the operating device 40 for a working vehicle 1 according to item A7, the operator can easily know a current operation mode selected by an operation of the selector 51.

(Item A8) The operating device 40 according to item A7, wherein the indicator 43 is provided on the operating lever 41.

With the operating device 40 for a working vehicle 1 according to item A8, the operator can easily check the indicator 43 when operating the operating lever 41.

(Item A9) The operating device 40 according to item A7 or A8, wherein the indicator 43 includes a lamp to change a color thereof according to the operation mode selected by an operation of the selector 51.

With the operating device 40 for a working vehicle 1 according to item A9, the operator can know the current operation mode selected by an operation of the selector 51 at a glance.

(Item A10) The operating device 40 according to any one of items A1 to A9, wherein the selector 51 includes a physical switch.

With the operating device 40 for a working vehicle 1 according to item A10, the operator can know the position of the selector 51 and operate the selector 51 with certainty without having to look at the selector 51.

(Item A11) The operating device 40 according to any one of items A1 to A9, wherein the selector 51 includes a display image displayed on a display screen (display) 90 to receive an instruction to perform an operation.

With the operating device 40 for a working vehicle 1 according to item A11, the above advantageous effect(s) achieved by the operating device 40 can be achieved by displaying the selector 51 on the existing display 90 without having to provide a selector 51 separately.

(Item A12) A working vehicle 1 including a vehicle body 2, an operator's seat 4 on the vehicle body 2, and the operating device 40 according to any one of items A1 to A11 provided in a vicinity of the operator's seat 4.

With the working vehicle 1 according to item A12, it is possible to provide a working vehicle 1 that can achieve the above advantageous effect(s) achieved by the operating device 40.

(Item B1) An operating device 40 for a working vehicle 1, the operating device 40 including an operating lever 41 to cause the working vehicle 1 to perform various functions, and an operable changeover switch 53, wherein the operating lever 41 includes at least one operating switch 42, and is operable to receive an instruction to perform a predetermined standard function among the functions when the at least one operating switch 42 is operated, and is operable to, when the changeover switch 53 is operated, receive an instruction to perform an expanded function of the working vehicle 1 that is different from the standard function instead of the standard function when the at least one operating switch 42 is operated.

With the operating device 40 for a working vehicle 1 according to item B1, one operating switch 42 can receive instructions to operate a plurality of functions in accordance with an operation of the changeover switch 53. This makes it unnecessary to provide as many operating switches 42 as the number of functions of the working vehicle 1 on the operating lever 41. This can make operations of the operating switches 42 less complicated, thus further improving the operability of the operating lever 41.

(Item B2) The operating device 40 according to item B1, wherein the operating lever 41 is operable to receive an instruction to perform the standard function when the at least one operating switch 42 is operated during a period when the changeover switch 53 is not operated, and receive an instruction to perform the expanded function when the at least one operating switch 42 is operated during a period when the changeover switch 53 is operated.

With the operating device 40 for a working vehicle 1 according to item B2, the operating switch 42 receives an instruction to perform an expanded function only during a period when the changeover switch 53 is being operated. This can eliminate or reduce the likelihood that the operator will erroneously operate an expanded function.

(Item B3) The operating device 40 according to item B1 or B2, wherein the at least one operating switch 42 includes a light 42*b* on an operation surface 42*a*, and the light 42*b* is operable to change a manner in which the light 42*b* provides an indication depending on whether the changeover switch 53 is operated or not.

With the operating device 40 for a working vehicle 1 according to item B3, the operator can easily know whether a current function to be performed in accordance with an instruction received by the operating switch 42 is a standard function or an expanded function by checking the light 42*b*. This can eliminate or reduce the likelihood that an operation to perform a standard function or an expanded function will be unintentionally performed, for example, in a case where the operator erroneously operates the changeover switch 53.

(Item B4) The operating device 40 according to item B3, wherein the light 42*b* includes a first light 42*b*1 provided on one of opposite portions of the operation surface 42*a* to indicate the standard function, and a second light 42*b*2 provided on the other of opposite portions of the operation surface 42*a* to indicate the expanded function, the first light 42*b*1 is operatable to turn on and the second light 42*b*2 is operable to turn off in a case that the changeover switch 53 is not operated, and the first light 42*b*1 is operable to turn off and the second light 42*b*2 is operable to turn on in a case that the changeover switch 53 is operated.

With the operating device 40 for a working vehicle 1 according to item B4, the operator can more easily know whether a current instruction received by the operating switch 42 is an instruction to perform a standard function or an instruction to perform an expanded function.

(Item B5) The operating device 40 according to item B4, wherein the first light 42*b*1 and the second light 42*b*2 extend along an inner periphery of the operation surface 42*a* and define a portion or an entirety of a contour of the inner periphery of the operation surface 42*a*.

With the operating device 40 for a working vehicle 1 according to item B5, the operator is able to, not only more easily know whether a current function to be performed in accordance with an instruction received by the operating switch 42 is a standard function or an expanded function by checking the indication provided by the first light 42*b*1 and the second light 42*b*2, but also more easily recognize the position of the operating switch 42 with certainty due to the first light 42*b*1 and the second light 42*b*2.

(Item B6) The operating device 40 according to any one of items B1 to B5, further including an indicator 43 to, when the changeover switch 53 is operated, indicate that the changeover switch 53 is operated.

With the operating device 40 for a working vehicle 1 according to item B6, the operator can easily know whether a current function to be performed in accordance with an instruction received by the operating switch 42 is a standard function or an expanded function. This can eliminate or reduce the likelihood that an operation to perform a standard function or an expanded function will be unintentionally performed, for example, in a case where the operator erroneously operates the changeover switch 53.

(Item B7) The operating device 40 according to item B6, wherein the indicator 43 is a lamp to blink to indicate that the changeover switch 53 is operated.

With the operating device 40 for a working vehicle 1 according to item B7, the operator can more easily know whether a current function to be performed in accordance with an instruction received by the operating switch 42 is a standard function or an expanded function.

(Item B8) The operating device 40 according to any one of items B1 to B7, wherein the operating lever 41 includes a base portion 41*a* that is pivotally supported in a vicinity of an operator's seat 4 of the working vehicle 1, and a grip 41*b* provided at a distal portion of the base portion 41*a*, a plurality of the operating switches 42 are provided on a surface of the grip 41*b* that faces the operator's seat 4, and the changeover switch 53 is provided on another surface of the grip 41*b* that is different from the surface on which the plurality of operating switches 42 are provided.

With the operating device 40 for a working vehicle 1 according to item B8, it is possible to eliminate or reduce the likelihood that the operator will mistakenly operate the changeover switch 53 instead of the operating switch 42.

(Item B9) The operating device 40 according to item B8, wherein the changeover switch 53 is provided on an upper surface located higher than the surface on which the plurality of operating switches 42 are provided or on an opposite surface opposite the surface on which the plurality of operating switches 42 are provided.

With the operating device 40 for a working vehicle 1 according to item B9, it is possible to eliminate or reduce, with certainty, the likelihood that the operator will mistakenly operate the changeover switch 53 instead of the operating switch 42.

(Item B10) A working vehicle 1 including a vehicle body 2, an operator's seat 4 on the vehicle body 2, and the operating device 40 according to any one of items B1 to B9 provided in a vicinity of the operator's seat 4.

With the working vehicle 1 according to item B10, it is possible to provide a working vehicle 1 that can achieve the above advantageous effect(s) achieved by the operating device 40.

(Item B11) The working vehicle 1 according to item B10, further including a display 90 to, when the changeover switch 53 is operated, display a relationship between an operation of each of the at least one operating switch 42 and content of a corresponding expanded function to be performed in accordance with an instruction received by the operation of the each of the at least one operating switch 42.

With the working vehicle 1 according to item B11, the operator can easily know the content of an expanded function and can easily know whether a current function to be performed in accordance with an instruction received by the operating switch 42 is a standard function or an expanded function.

(Item C1) An assistance apparatus 100 for a working vehicle 1, the assistance apparatus 100 including a controller 80 configured or programmed to control a plurality of functions relating to the working vehicle 1, a first function operation actuator 45 to be operated to select a function among the plurality of functions, and a second function operation actuator 46 to be operated to change a control parameter of the function selected via the first function operation actuator 45, wherein the second function operation actuator 46 includes a dial switch to change the control parameter by being rotated.

With the assistance apparatus 100 for a working vehicle 1 according to item C1, the operator can speedily change a parameter of a function by using the first function operation actuator 45 and the second function operation actuator 46 for different purposes. Furthermore, since the second function operation actuator 46 includes a dial switch, the operator can easily operate the second function operation actuator 46 without having to look at the second function operation actuator 46, for example, even during travel of the working vehicle 1.

(Item C2) The assistance apparatus 100 according to item C1, wherein the controller 80 is configured or programmed to include a changer 80*b* configured or programmed to change one or more functions each of which is selectable via the first function operation actuator 45 among the plurality of functions.

With the assistance apparatus 100 for a working vehicle 1 according to item C2, the operator can freely change functions each of which is selectable via the first function operation actuator 45. This allows the operator to speedily select a function using the first function operation actuator 45.

(Item C3) The assistance apparatus 100 according to item C1 or C2, further including a display 90 to display the one or more functions each of which is selectable via the first function operation actuator 45 among the plurality of functions, wherein the display 90 is operable to display one of the one or more functions that is selected via the first function operation actuator 45 and another one or more of the one or more functions differently.

With the assistance apparatus 100 for a working vehicle 1 according to item C3, the operator can easily know a function that is being selected via the first function operation actuator 45 and other selectable functions.

(Item C4) The assistance apparatus 100 according to any one of items C1 to C3, further including a display 90 to display the control parameter changed via the second function operation actuator 46.

With the assistance apparatus 100 for a working vehicle 1 according to item C4, the operator can easily know a changed control parameter by checking a control parameter displayed on the display 90.

(Item C5) The assistance apparatus 100 according to any one of items C1 to C4, wherein the first function operation actuator 45 includes a dial switch to select the function by being rotated.

With the assistance apparatus 100 for a working vehicle 1 according to item C5, the operator can easily operate the first function operation actuator 45 without having to look at the first function operation actuator 45, for example, even during travel of the working vehicle 1.

(Item C6) The assistance apparatus 100 according to item C5, wherein an axial direction of a rotary axis L1 of the first function operation actuator 45 is different from an axial direction of a rotary axis L2 of the second function operation actuator 46.

With the assistance apparatus 100 for a working vehicle 1 according to item C6, the operator can easily distinguish which of the operation actuators 45 and 46 is to be operated to select a function and which of the operation actuators 45 and 46 is to be operated to perform an operation with respect to a parameter. This can realize a speedy operation regarding a parameter of a function of the working vehicle 1.

(Item C7) The assistance apparatus 100 according to item C6, wherein the axial direction of the rotary axis L1 of the first function operation actuator 45 is perpendicular or substantially perpendicular to the axial direction of the rotary axis L2 of the second function operation actuator 46.

With the assistance apparatus 100 for a working vehicle 1 according to item C7, the operator can distinguish with more certainty which of the operation actuators 45 and 46 is to be operated to select a function and which of the operation actuators 45 and 46 is to be operated to perform an operation regarding a parameter.

(Item C8) The assistance apparatus 100 according to any one of items C1 to C4, wherein the first function operation actuator 45 includes a display image displayed on a display screen (display) 90 to receive an operation to make a selection.

With the assistance apparatus 100 for a working vehicle 1 according to item C8, the operator can intuitively select one or more of a plurality of functions.

(Item C9) A working vehicle 1 including a vehicle body 2, an operator's seat 4 on the vehicle body 2, and the assistance apparatus 100 according to any one of items C1 to C8.

With the working vehicle 1 according to item C9, it is possible to provide a working vehicle 1 that can achieve the above advantageous effect(s) achieved by the assistance apparatus 100.

(Item D1) An assistance apparatus 100 of a working vehicle 1, the assistance apparatus 100 including a controller 80 configured or programmed to control a plurality of functions relating to the working vehicle 1, an operation actuator 49 to receive an instruction to perform a predetermined function among the plurality of functions, wherein the controller 80 is configured or programmed to include an updater 80*a* configured or programmed to update the function allocated to the operation actuator 49 to a different function, and the operation actuator 49 includes a first indicator lamp 49*b*1 to change a manner in which the first indicator lamp 49*b*1 provides an indication according to a category in which the function updated by the updater 80*a* belongs.

With the assistance apparatus 100 for a working vehicle 1 according to item D1, the operator can easily know the category of the function updated by the updater 80*a*. This can prevent or reduce occurrence of an erroneous operation even in a case where a function to be performed in accordance with an instruction received by the operation actuator 49 is updated.

(Item D2) The assistance apparatus 100 according to item D1, wherein the first indicator lamp 49*b*1 is operable to be lit in a color that varies depending on the category to which the function updated by the updater 80*a* belongs.

With the assistance apparatus 100 for a working vehicle 1 according to item D2, the operator can know the category of the function updated by the updater 80*a* at a glance.

(Item D3) The assistance apparatus 100 according to item D1 or D2, wherein the operation actuator 49 is allocated a predetermined initial function among the plurality of functions in advance, the updater 80*a* is configured or programmed to update the function allocated to the operation actuator 49 to an updated function different from the initial function among the plurality of functions, and the first indicator lamp 49*b*1 is operable to change the manner in which the first indicator lamp 49*b*1 provides an indication according to a category to which the updated function updated by the updater 80*a* belongs.

With the assistance apparatus 100 for a working vehicle 1 according to item D3, the operator can easily know whether or not a function to be performed in accordance with an instruction received by the operation actuator 49 has been updated by the updater 80*a* by checking the indication provided by the first indicator lamp 49*b*1.

(Item D4) The assistance apparatus 100 according to item D3, wherein the operation actuator 49 includes an icon representing the initial function.

With the assistance apparatus 100 for a working vehicle 1 according to item D4, the operator can easily know the content of an initial function in a case where the operation actuator 49 receives an operation to perform the initial function by checking the indication provided by and an icon of the first indicator lamp **49*b*1**.

(Item D5) The assistance apparatus 100 according to item D4, wherein the operation actuator 49 includes a second indicator lamp **49*b*2 separate from the first indicator lamp 49*b*1, and the second indicator lamp 49*b*2 is operable to change a manner in which the second indicator lamp 49*b*2 provides an indication depending on whether the function allocated to the operation actuator 49** is enabled or disabled.

With the assistance apparatus 100 for a working vehicle 1 according to item D5, the operator can easily know whether a function enabled or disabled by checking the second indicator lamp **49*b*2**.

(Item D6) The assistance apparatus 100 according to item D5, wherein the first indicator lamp **49*b*1** and the second indicator lamp are positioned to surround the icon.

With the assistance apparatus 100 for a working vehicle 1 according to item D6, it is possible to easily recognize the position of the operation actuator 49 due to the first indicator lamp **49*b*1 and the second indicator lamp 49*b*2**.

(Item D7) The assistance apparatus 100 according to item D6, wherein the operation actuator 49 includes a third indicator lamp **49*b*3 to be lit, the third indicator lamp being separate from the first indicator lamp 49*b*1 and the second indicator lamp 49*b*2, the first indicator lamp 49*b*1, the second indictor lamp 49*b*2, and the third indicator lamp 49*b*3 extend along an inner periphery of an operation surface 49*a* of the operation actuator 49 and define a portion or an entirety of a contour of the inner periphery of the operation surface 49*a***.

With the assistance apparatus 100 for a working vehicle 1 according to item D7, the operator can not only easily know whether a function is enabled or disabled by checking the second indicator lamp **49*b*2, but also more easily recognize the position of the operation actuator 49 with certainty due to the first indicator lamp 49*b*1, the second indicator lamp 49*b*2, and the third indicator lamp 49*b*3**.

(Item D8) A working vehicle 1 including a vehicle body 2, an operator's seat 4 on the vehicle body 2, and the assistance apparatus 100 according to any one of items D1 to D7, wherein the operation actuator 19 is provided in a vicinity of the operator's seat 4.

With the working vehicle 1 according to item D8, it is possible to provide a working vehicle 1 that can achieve the above advantageous effect(s) achieved by the assistance apparatus 100.

(Item E1) An operating device 40 for a working vehicle 1, the operating device 40 including an operating lever 41 to receive an instruction to perform various functions of the working vehicle 1, wherein the operating lever 41 includes a base portion **41*a* pivotally supported in a vicinity of an operator's seat 4 of the working vehicle 1, a grip 41*b* provided at a distal portion of the base portion 41*a*, and a switcher 55 to couple the grip 41*b* and the base portion 41*a* and switch between a first form 55A in which an angle of the grip 41*b* with respect to the base portion 41*a* is a first angle θ1 and a second form 55B in which the angle is a second angle θ2 different from the first angle θ1, and the operating lever 41 is configured such that one or more functions of the working vehicle 1 to be performed in accordance with an instruction received by the operating lever 41 vary depending on whether the switcher 55 is in the first form 55A or in the second form 55**B.

With the operating device 40 for a working vehicle 1 according to item E1, various kinds of control of the working vehicle 1 can be performed by changing the form of the switcher 55 even though only a single operating lever 41 is provided. This makes it unnecessary for the operator to switch the operating lever 41 to another one every time an environment where the working vehicle 1 travels or work content changes, thus eliminating or reducing the likelihood that the operator will operate a wrong lever or switch. Furthermore, it is unnecessary to increase the number of operating levers 41 in accordance with types of functions of the working vehicle 1. This can reduce the number of operation members on the operating device 40. It follows that it is possible to not only improve operability of the entire operating device 40, but also eliminate or reduce the likelihood that the operating lever 41 will hinder a field of view of the operator.

(Item E2) The operating device 40 according to item E1, wherein the operating lever 41 is pivotally supported, and is operable such that one or more functions of the working vehicle 1 to be performed in accordance with an instruction received by the operating lever 41 being pivoted vary depending on whether the switcher 55 is in the first form 55A or in the second form 55B.

With the operating device 40 for a working vehicle 1 according to item E2, functions to be performed in accordance with an instruction received by the operating lever 41 being pivoted can be freely changed by changing the form of the operating lever 41. It is therefore possible to reduce the number of operation members on the operating device 40 although the operating lever 41 that can be pivoted needs a relatively wide operation range. It follows that it is possible to eliminate or reduce the likelihood that an operation member will interfere with another operation member and to improve operability of the entire operating device 40.

(Item E3) The operating device 40 according to item E2, wherein the operating lever 41 is operable to be switched to a first mode in which at least one or more work functions relating to work among the functions of the working vehicle 1 are performed in a case that the switcher 55 is in the first form 55A, and be switched to a second mode in which at least one or more traveling functions relating to travel among the functions of the working vehicle 1 are performed in a case that the switcher 55 is in the second form 55B, the operating lever 41 is operable to, in the first mode, receive an instruction to perform the one or more work functions by being pivoted, and the operating lever 41 is operable to, in the second mode, receive an instruction to perform the one or more traveling functions by being pivoted.

With the operating device 40 for a working vehicle 1 according to item E3, the operator can successively operate a work function and a traveling function using the operating lever 41 without switching the operating lever 41 to another one.

(Item E4) The operating device 40 according to item E3, wherein the second angle θ2 is larger than the first angle θ1, the grip **41*b* extends from the switcher 55 along a direction in which the base portion 41*a* extends in the case that the switcher 55 is in the first form 55A, and the grip 41***b* extends from the switcher 55 inward or outward along a width direction in the case that the switcher 55 is in the second form 55B.

With the operating device 40 for a working vehicle 1 according to item E4, the operator can stably grip the grip 41*b* in a case where the operator performs an operation to perform a traveling function and can perform a precise action using a wrist in a case where the operator performs an operation to perform a work function.

(Item E5) The operating device 40 according to item E4, wherein the operating lever 41 includes at least one operating switch 42, and a function of the working vehicle 1 to be performed in accordance with an instruction received by an operation of the at least one operating switch 42 varies depending on whether the switcher 55 is in the first form 55A or in the second form 55B.

With the operating device 40 for a working vehicle 1 according to item E5, functions to be performed in accordance with instructions received by the plurality of operating switches 42 of the operating lever 41 can be freely changed by changing the form of the operating lever 41. This makes it unnecessary to provide as many operating switches 42 as the number of functions of the working vehicle 1 on the operating lever 41, thus further improving the operability of the operating lever 41.

(Item E6) The operating device 40 according to any one of items E1 to E5, wherein the operating lever 41 includes an indicator 43 to change a manner in which the indicator 43 provides an indication depending on whether the switcher 55 is in the first form 55A or in the second form 55B.

With the operating device 40 for a working vehicle 1 according to item E6, the operator can easily know the state of the operating lever 41 due to the indicator 43 in addition to the form of the switcher 55.

(Item E7) The operating device 40 according to item E6, wherein the indicator 43 includes a lamp to change a color thereof depending on whether the switcher 55 is in the first form 55A or in the second form 55B.

With the operating device 40 for a working vehicle 1 according to item E7, the operator can know the state of the operating lever 41 at a glance due to the indicator 43 in addition to the form of the switcher 55.

(Item E8) A working vehicle 1 including a vehicle body 2, an operator's seat 4 on the vehicle body 2, and the operating device 40 according to any one of items E1 to E7 provided in a vicinity of the operator's seat 4.

With the working vehicle 1 according to item E8, it is possible to provide a working vehicle 1 that can achieve the above advantageous effect(s) achieved by the operating device 40.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An operating device for a working vehicle, the operating device comprising:

an operating lever to cause the working vehicle to perform various functions; and a selector to select an operation mode of the operating lever; wherein the operating lever is pivotally supported and is configured such that one or more functions of the working vehicle to be performed in accordance with an instruction received by the operating lever being pivoted vary depending on the operation mode selected via the selector.

2. The operating device according to claim 1, wherein a plurality of the operation modes include a first mode in which at least one or more work functions relating to work among the functions of the working vehicle are performed and a second mode in which at least one or more traveling functions relating to travel among the functions of the working vehicle are performed;

the operating lever is operable to, in the first mode, receive an instruction to perform the one or more work functions by being pivoted; and the operating lever is operable to, in the second mode, receive an instruction to perform the one or more traveling functions by being pivoted.

3. The operating device according to claim 2, wherein the operating lever includes at least one operating switch and is configured such that a function of the working vehicle to be performed in accordance with an instruction received by the operating lever by an operation of the at least one operating switch varies depending on the operation mode selected via the selector.

4. The operating device according to claim 3, wherein the plurality of operation modes include a third mode in which the one or more traveling functions and the one or more work functions are performed;

the operating lever is operable to, in the third mode, receive an instruction to perform the one or more traveling functions by being pivoted; and a function of the working vehicle to be performed in accordance with an instruction received by the operation of the at least one operating switch in the third mode is different from a function of the working vehicle to be performed in accordance with an instruction received by the operation of the at least one operating switch in the second mode.

5. The operating device according to claim 4, wherein the plurality of operation modes include a fourth mode; and the operating lever is operable to, in the fourth mode:

not receive an instruction to perform a function of the working vehicle even when pivoted; and receive an instruction to perform a function of the working vehicle when the at least one operating switch is operated.

6. The operating device according to claim 1, further comprising an indicator to provide an indication differently based on the operation mode selected via the selector.

7. The operating device according to claim 6, wherein the indicator is provided on the operating lever.

8. The operating device according to claim 6, wherein the indicator includes a lamp to change a color thereof according to the operation mode selected via the selector.

9. The operating device according to claim 1, wherein the selector includes a physical switch.

10. The operating device according to claim 1, wherein the selector includes a display image displayed on a display screen to receive an instruction to perform an operation.

11. An operating device for a working vehicle, the operating device comprising:

an operating lever to cause the working vehicle to perform various functions;

a selector to select an operation mode of the operating lever; and an operable changeover switch; wherein the operating lever:

is pivotally supported and includes at least one operating switch; and is configured such that one or more functions of the working vehicle to be performed in accordance with an instruction received by the operating lever being pivoted vary depending on the operation mode selected via the selector; and the operating lever is operable to, in the selected operation mode:

receive an instruction to perform a predetermined standard function among the functions when the at least one operating switch is operated; and when the changeover switch is operated, receive an instruction to perform an expanded function of the working vehicle that is different from the standard function instead of the standard function when the at least one operating switch is operated.

12. The operating device according to claim 11, wherein the operating lever is operable to:

receive an instruction to perform the standard function when the at least one operating switch is operated during a period when the changeover switch is not operated; and receive an instruction to perform the expanded function when the at least one operating switch is operated during a period when the changeover switch is operated.

13. The operating device according to claim 11, wherein the at least one operating switch includes a light on an operation surface; and the light is operable to change a manner in which the light provides an indication depending on whether the changeover switch is operated or not.

14. The operating device according to claim 13, wherein the light includes:

a first light provided on one of opposite portions of the operation surface to indicate the standard function; and a second light provided on the other of opposite portions of the operation surface to indicate the expanded function;

the first light is operatable to turn on and the second light is operable to turn off in a case that the changeover switch is not operated; and the first light is operable to turn off and the second light is operable to turn on in a case that the changeover switch is operated.

15. The operating device according to claim 14, wherein the first light and the second light extend along an inner periphery of the operation surface and define a portion or an entirety of a contour of the inner periphery of the operation surface.

16. The operating device according to claim 11, further comprising an indicator to, when the changeover switch is operated, indicate that the changeover switch is operated.

17. The operating device according to claim 16, wherein the indicator includes a lamp to blink to indicate that the changeover switch is operated.

18. The operating device according to claim 11, wherein the operating lever includes:

a base portion that is pivotally supported in a vicinity of an operator's seat of the working vehicle; and a grip provided at a distal portion of the base portion;

a plurality of the operating switches are provided on a surface of the grip that faces the operator's seat; and the changeover switch is provided on another surface of the grip that is different from the surface on which the plurality of operating switches are provided.

19. The operating device according to claim 18, wherein the changeover switch is provided on an upper surface located higher than the surface on which the plurality of operating switches are provided or on an opposite surface opposite the surface on which the plurality of operating switches are provided.

* * * * *